US012638717B2

(12) United States Patent (10) Patent No.: US 12,638,717 B2
Nagatomi et al. (45) Date of Patent: May 26, 2026

(54) DISPLAY DEVICE

(71) Applicant: Panasonic Automotive Systems Co., Ltd., Kanagawa (JP)

(72) Inventors: Kenji Nagatomi, Osaka (JP); Norihiro Imamura, Osaka (JP); Hirofumi Hoshida, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 130 days.

(21) Appl. No.: 18/594,803

(22) Filed: Mar. 4, 2024

(65) Prior Publication Data

US 2024/0310672 A1 Sep. 19, 2024

(30) Foreign Application Priority Data

| Mar. 13, 2023 | (JP) | 2023-039053 |
| Mar. 13, 2023 | (JP) | 2023-039059 |
| Mar. 13, 2023 | (JP) | 2023-039065 |
| Oct. 31, 2023 | (JP) | 2023-186783 |

(51) Int. Cl.
*G02F 1/1335* (2006.01)
*B60K 35/21* (2024.01)
*B60K 35/22* (2024.01)
*G02F 1/13363* (2006.01)

(52) U.S. Cl.
CPC ...... *G02F 1/133557* (2021.01); *B60K 35/211* (2024.01); *B60K 35/22* (2024.01); *G02F 1/133638* (2021.01)

(58) Field of Classification Search
CPC ......... G02F 1/133557; G02F 1/133638; B60K 35/211; B60K 35/22
USPC .......................................... 349/5–9; 359/629
See application file for complete search history.

(56) References Cited

U.S. PATENT DOCUMENTS 10,012,836 B2 * 7/2018 Kim ........................ B60K 35/22
2013/0265646 A1 * 10/2013 Sakai ...................... G02B 27/01
359/630

FOREIGN PATENT DOCUMENTS

JP 2005-119470 5/2005

* cited by examiner

*Primary Examiner* — David Y Chung
(74) *Attorney, Agent, or Firm* — Greenblum & Bernstein, P.L.C.

(57) ABSTRACT

A first configuration of a display device includes: a first display unit that emits first image light and second image light; a first polarizing half mirror that transmits one of the first or second image light and reflects the other; a first reflective mirror on an optical path of the first polarizing half mirror; and a first λ/4 plate between the first reflective mirror and the first polarizing half mirror. A second configuration includes: a second display unit that emits third image light and fourth image light; a half mirror; and a third reflective mirror that reflects, toward the half mirror, the third image light reflected by the half mirror. A third configuration includes: a second display element; and a first reflector that reflects fifth image light from the second display element. The first reflector includes reflective surfaces for forming display images based on the fifth image light.

4 Claims, 59 Drawing Sheets

DISPLAY DEVICE

CROSS REFERENCE TO RELATED APPLICATIONS

The present application is based on and claims priority of Japanese Patent Application No. 2023-039053 filed on Mar. 13, 2023, Japanese Patent Application No. 2023-039059 filed on Mar. 13, 2023, Japanese Patent Application No. 2023-039065 filed on Mar. 13, 2023, and Japanese Patent Application No. 2023-186783 filed on Oct. 31, 2023.

FIELD

The present disclosure relates to a display device.

BACKGROUND

In recent years, display devices for stereoscopically displaying images are known. For example, as an example of a display device, Patent Literature (PTL) 1 discloses a display device which performs a stereoscopic display with depth by causing a display surface to face one of an upper and lower direction and having a half mirror and a full mirror become a plurality of reflective mirror members along the display surface, each of the reflective mirror members being provided on a side of a panel display device to be stored in a storage formed on a vehicle body side and making vehicle information displayed on the display surface visible from inside a vehicle cabin by reflecting the vehicle information.

CITATION LIST

Patent Literature

PTL 1: Japanese Unexamined Patent Application Publication No. 2005-119470

SUMMARY

However, the display device according to the above related art can be improved upon.

In view of this, the present disclosure provides a display device capable of improving upon the above related art.

A display device according to an aspect of the present disclosure is a display device including at least one of a first configuration, a second configuration, or a third configuration, wherein the first configuration includes: a first display unit that emits first image light from a first region and second image light from a second region, the second image light being shifted from the first image light by half a phase; a first polarizing half mirror that transmits one of the first image light or the second image light and reflects an other of the first image light or the second image light; a first reflective mirror disposed on one of a transmissive optical path along which the one of the first image light or the second image light passes through the first polarizing half mirror or a reflective optical path along which the other of the first image light or the second image light reflects off the first polarizing half mirror; and a first λ/4 plate disposed between the first reflective mirror and the first polarizing half mirror on the one of the transmissive optical path or the reflective optical path, the second configuration includes: a second display unit that emits third image light from a third region and fourth image light from a fourth region; a half mirror including one end portion disposed at a boundary between the third region and the fourth region; and a third reflective mirror that reflects, toward the half mirror, the third image light emitted from the third region and reflected by the half mirror, the half mirror is oriented to direct the third image light and the fourth image light in a same direction when transmitting the third image light from the third reflective mirror and reflecting the fourth image light emitted from the fourth region, the third configuration includes: a second display element that emits fifth image light which forms a display image; and a first reflector that reflects the fifth image light, the first reflector includes a plurality of reflective surfaces for forming a plurality of display images having different viewing distances by dividing the fifth image light emitted by the second display element, the plurality of display images each being the display image, and at least one reflective surface among the plurality of reflective surfaces is a curved surface.

A display device according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 33 is a schematic view showing a schematic configuration of a display device according to Embodiment 20.

DESCRIPTION OF EMBODIMENTS

Figure 1:
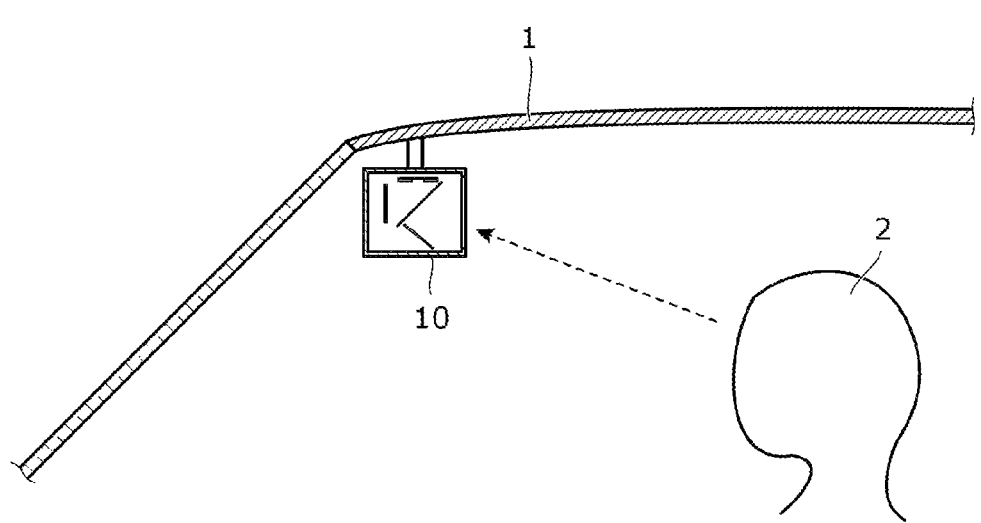
FIG. 1 is a schematic view showing a state where a display device according to Embodiment 1 is provided in a vehicle.

A display device according to an aspect of the present disclosure includes at least one of a first configuration, a second configuration, or a third configuration. The first configuration includes: a first display unit that emits first image light from a first region and second image light from a second region, the second image light being shifted from the first image light by half a phase; a first polarizing half mirror that transmits one of the first image light or the second image light and reflects the other of the first image light or the second image light; a first reflective mirror disposed on one of a transmissive optical path along which the one of the first image light or the second image light passes through the first polarizing half mirror or a reflective optical path along which the other of the first image light or the second image light reflects off the first polarizing half mirror; and a first λ/4 plate disposed between the first reflective mirror and the first polarizing half mirror on the one of the transmissive optical path or the reflective optical path. The second configuration includes: a second display unit that emits third image light from a third region and fourth image light from a fourth region; a half mirror including one end portion disposed at a boundary between the third region and the fourth region; and a third reflective mirror that reflects, toward the half mirror, the third image light emitted from the third region and reflected by the half mirror. The half mirror is oriented to direct the third image light and the fourth image light in the same direction when transmitting the third image light from the third reflective mirror and reflecting the fourth image light emitted from the fourth region. The third configuration includes: a second display element that emits fifth image light which forms a display image; and a first reflector that reflects the fifth image light. The first reflector includes a plurality of reflective surfaces for forming a plurality of display images having different viewing distances by dividing the fifth image light emitted by the second display element, the plurality of display images each being the display image. At least one reflective surface among the plurality of reflective surfaces is a curved surface.

First, a display device with a first configuration will be described. For example, when one beam of image light is considered second image light and another beam of image light is considered first image light, the first polarizing half mirror transmits the second image light and reflects the first image light. In this case, when a reflective optical path of the first image light is exemplified as one optical path, since the first reflective mirror is disposed on the reflective optical path, the first image light is reflected by the first reflective mirror. At this point, since the first $\lambda/4$ plate is disposed on the reflective optical path between the first reflective mirror and the first polarizing half mirror, the first image light passes through the first $\lambda/4$ plate before being reflected and also passes through the first $\lambda/4$ plate after being reflected. In other words, the first image light becomes shifted by half a phase by passing through the first $\lambda/4$ plate twice. The first image light having been shifted by half a phase becomes in-phase with the second image light and passes through the first polarizing half mirror. In this manner, each of the beams of first image light and the second image light passes through the first polarizing half mirror in a phase which enables the image light to pass through the first polarizing half mirror. Accordingly, a decline in an amount of light attributable to the first polarizing half mirror can be inhibited.

In a case of a display device with the second configuration, third image light having passed through a half mirror and fourth image light having been reflected by the half mirror can be directed in a same direction. In this case, the third image light passes through the half mirror by being once reflected by the half mirror and then further reflected by the third reflective mirror. On the other hand, the fourth image light is reflected by the half mirror without being reflected by the third reflective mirror. In this manner, since an optical path length of the third image light becomes longer than an optical path length of the fourth image light, an image formed of the third image light and an image formed of the fourth image light can be displayed while being significantly separated from each other in a depth direction. Therefore, a stereoscopic display with a large depth feel can be performed.

In a case of a display device with the third configuration, since the first reflector is provided with a plurality of reflective surfaces for dividing fifth image light emitted by the second display element and forming a plurality of display images with different viewing distances, an image expression which differentiates the viewing distance (depth) of respective display images can be performed. In particular, since at least one of the plurality of reflective surfaces is a curved surface, other image expressions can also be performed due to the curved reflective surface. Combining such image expressions enables a dramatic impact to be enhanced.

The display device according to an aspect of the present disclosure may include the first configuration, and may include a second reflective mirror disposed on the other of the transmissive optical path or the reflective optical path.

For example, when a transmissive optical path of the second image light is exemplified as another optical path, since the second reflective mirror is disposed on the transmissive optical path, a reflection destination (display position) of the second image light can be readily adjusted by adjusting an attitude of the second reflective mirror.

In the display device according to an aspect of the present disclosure, at least one of the first reflective mirror or the second reflective mirror may be a concave mirror or a convex mirror.

Accordingly, since at least one of the first reflective mirror or the second reflective mirror is a concave mirror or a convex mirror, an image range formed by the first image light and the second image light can be enlarged or reduced. As a result, a wide variety of image expressions can be performed.

The display device according to an aspect of the present disclosure may include a driver that causes at least one of the first polarizing half mirror, the first reflective mirror, or the second reflective mirror to operate.

Accordingly, at least one of the first polarizing half mirror, the first reflective mirror, or the second reflective mirror can be operated (slide movement, rotational movement, or the like) by the driver. As a result, a display position or a viewing distance of image light having been reflected by the first polarizing half mirror can be adjusted by operating the first polarizing half mirror. In a similar manner, a display position or a viewing distance of image light having been reflected by the first reflective mirror can be adjusted by operating the first reflective mirror. Furthermore, a display position or a viewing distance of image light having been reflected by the second reflective mirror can be adjusted by operating the second reflective mirror. Accordingly, an image display in accordance with a difference in physique and preferences of a user can be performed.

The display device according to an aspect of the present disclosure may include the first configuration, and the first display unit may include: a display element including a display surface; and a first $\lambda/2$ plate stacked only on part of the display surface.

Accordingly, of the display surface, a region on which a first $\lambda/2$ plate is not stacked is the first region and a region on which a first $\lambda/2$ plate is stacked is the second region. In other words, in light emitted from the display surface, light that does not pass through the first $\lambda/2$ plate becomes first image light and light that passes through the first $\lambda/2$ plate becomes second image light. In this manner, since the display element and the first $\lambda/2$ plate are integrated in the first display unit, the first display unit can be readily handled.

The display device according to an aspect of the present disclosure may include a second $\lambda/4$ plate disposed on the other of the transmissive optical path or the reflective optical path.

Accordingly, since the second $\lambda/4$ plate is disposed on the other optical path, image light traveling along the other optical path is shifted by half a phase by passing through the second $\lambda/4$ plate twice. The image light passing through the first polarizing half mirror in a state before passing through the second $\lambda/4$ plate twice is reflected by the first polarizing half mirror due to the shift by half a phase according to the two transmissions. Therefore, image light not having passed through the second $\lambda/4$ plate (for example, the first image light) and image light having passed through the second $\lambda/4$ plate (for example, the second image light) can be superimposed on each other.

The display device according to an aspect of the present disclosure may include the first configuration. The first image light and the second image light emitted by the first display unit may be circularly polarized light shifted from each other by half a phase. The first $\lambda/4$ plate may be stacked on a first surface of the first polarizing half mirror, the first surface being located on a side of the first polarizing half mirror on which the first display unit is disposed.

Accordingly, since the first $\lambda/4$ plate is stacked on the first surface of the first polarizing half mirror, the first polarizing half mirror and the first $\lambda/4$ plate can be integrated and the device as a whole can be downsized.

The display device according to an aspect of the present disclosure may include a third $\lambda/4$ plate stacked on a second surface of the first polarizing half mirror, the second surface being on an opposite side of the first polarizing half mirror from the first surface.

Accordingly, since the first $\lambda/4$ plate is stacked on the first surface of the first polarizing half mirror and the third $\lambda/4$ plate is stacked on the second surface of the first polarizing half mirror, the first polarizing half mirror, the first $\lambda/4$ plate, and the third $\lambda/4$ plate can be integrated and the device as a whole can be downsized.

The display device according to an aspect of the present disclosure may include the first configuration, and the first display unit may be a first display unit that does not allow emission of the first image light and the second image light from a boundary between the first region and the second region.

In this case, there is a possibility that polarized light is not shaped and image quality may decline at a boundary between the first region and the second region. In the present aspect, since the first image light and the second image light are not emitted from the boundary between the first region and the second region, a decline in image quality can be inhibited.

The display device according to an aspect of the present disclosure may include the first configuration, and the first image light and the second image light may be arranged side by side in the horizontal direction as viewed from a user.

Accordingly, since the first image light and the second image light are side by side in the horizontal direction as viewed from the user, the superposition of images can be made less likely to change even if a height of an eye line of the user changes.

The display device according to an aspect of the present disclosure may include the first configuration, and the first image light and the second image light may be arranged side by side in the vertical direction as viewed from a user.

Accordingly, since the first image light and the second image light are side by side in the vertical direction as viewed from the user, the superposition of images can be made less likely to change even if the eye line of the user changes in a left-right direction.

In the display device according to an aspect of the present disclosure, the first region and the second region may each have a width of at least one pixel and at most five pixels, and may be alternately arranged.

Accordingly, since the first region and the second region which are alternately arranged each have a width of at least one pixel and at most five pixels, an entire screen can be duplexed. As a result, a wide variety of image expressions can be performed.

The display device according to an aspect of the present disclosure may include the first configuration, and one of the first image light or the second image light may be disposed surrounding the other of the first image light or the second image light as viewed from a user.

Accordingly, since one of the first image light and the second image light is disposed surrounding the other as viewed from the user, a wider variety of expressions can be performed.

The display device according to an aspect of the present disclosure may include: the first configuration; and a second polarizing half mirror disposed facing the first display unit and the first reflective mirror at an angle intersecting the first polarizing half mirror in a side view. The first display unit may further emit the first image light from a fifth region different from the first region and the second region. The first image light emitted from the fifth region may pass through the second polarizing half mirror, and may then be reflected by the first reflective mirror and further reflected by the second polarizing half mirror.

Accordingly, since the first image light emitted from the fifth region and having passed through the second polarizing half mirror is reflected by the first reflective mirror and further reflected by the second polarizing half mirror, the first image light emitted from the fifth region has an optical path length that differs from both that of the first image light emitted from the first region and that of the second image light emitted from the second region. Therefore, a wider variety of stereoscopic displays can be performed.

In the display device according to an aspect of the present disclosure, the first image light emitted from the first region may be displayed at the farthest position as viewed from a user by passing through the first polarizing half mirror, then being reflected by the first reflective mirror and the first polarizing half mirror, and further passing through the first polarizing half mirror. The second image light emitted from the second region may be displayed at the nearest position as viewed from the user by being reflected by the first polarizing half mirror. The first image light emitted from the fifth region may be displayed at an intermediate position between the farthest position and the nearest position as viewed from the user by passing through the second polarizing half mirror, then being reflected by the first reflective mirror, and further being reflected by the second polarizing half mirror.

Accordingly, the first image light emitted from the first region can be displayed at a farthest position, the second image light emitted from the second region can be displayed at a nearest position, and the first image light emitted from the fifth region can be displayed at an intermediate position.

In the display device according to an aspect of the present disclosure, the display device may present at least one of a first display mode in which warning display is presented at the nearest position, meter display is presented at the intermediate position, and alert display is presented at the farthest position or a second display mode in which road information display is presented at the nearest position, meter display is presented at the intermediate position, and navigation display is presented at the farthest position.

Accordingly, since at least one of the first display mode or the second display mode can be displayed by the display device, a wider variety of expressions can be performed.

In the display device according to an aspect of the present disclosure, the first display mode and the second display mode may be switched based on a predetermined condition.

Accordingly, since the first display mode and the second display mode are switched based on a predetermined condition, a display mode in accordance with each condition can be adopted.

The display device according to an aspect of the present disclosure may include the second configuration. The half mirror may be a polarizing half mirror, and a fourth $\lambda/4$ plate may be disposed between the third reflective mirror and the polarizing half mirror.

Accordingly, since the fourth $\lambda/4$ plate is disposed between the third reflective mirror and the polarizing half mirror, the third image light reflected by the polarizing half mirror passes through the fourth $\lambda/4$ plate before being reflected by the third reflective mirror and also passes through the fourth $\lambda/4$ plate after being reflected by the third reflective mirror. In other words, the third image light becomes shifted by half a phase by passing through the fourth $\lambda/4$ plate twice. In this case, using the polarizing half mirror which reflects the third image light before being shifted by half a phase and which transmits the third image light after being shifted by half a phase, escape of the third image light when being reflected by the polarizing half mirror can be inhibited. Accordingly, a decline in an amount of light attributable to the half mirror can be inhibited.

The display device according to an aspect of the present disclosure may include a fourth reflective mirror that reflects, toward the polarizing half mirror, the third image light emitted from the third region.

Accordingly, since the third image light is reflected by the fourth reflective mirror before reaching the polarizing half mirror, the optical path length of the third image light can be made even longer. As a result, an image formed of the third image light and an image formed of the fourth image light can be displayed while being significantly separated from each other in a depth direction.

The display device according to an aspect of the present disclosure may include a fifth λ/4 plate stacked on the third region. The third reflective mirror may be a concave mirror or a convex mirror. The fourth λ/4 plate may be stacked on a surface of the polarizing half mirror, the surface of the polarizing half mirror facing the third reflective mirror.

Accordingly, since the third reflective mirror is a concave mirror or a convex mirror, an image range formed by the third image light can be enlarged or reduced. As a result, a wide variety of image expressions can be performed. Since it is difficult to stack a retardation plate on a surface of a concave mirror or a convex mirror, a retardation plate can be readily manufactured by stacking the fourth λ/4 plate on a surface opposing the third reflective mirror of the polarizing half mirror.

The display device according to an aspect of the present disclosure may include a fifth reflective mirror that reflects the fourth image light before the fourth image light is reflected by the polarizing half mirror.

Accordingly, since the fourth image light is reflected by the fifth reflective mirror before being reflected by the polarizing half mirror, the optical path length of the fourth image light can be made longer. Accordingly, a focal point can be set at a distant position even in the fourth image light and an image formed of the fourth image light can be made more readily visible.

The display device according to an aspect of the present disclosure may include the second configuration, and may include a driver that causes at least one of the half mirror or the third reflective mirror to operate.

Accordingly, at least one of the half mirror or the third reflective mirror can be operated (slide movement, rotational movement, or the like) by the driver. As a result, a display position or a viewing distance of image light having been reflected by the half mirror can be adjusted by operating the half mirror. In a similar manner, a display position or a viewing distance of image light having been reflected by the third reflective mirror can be adjusted by operating the third reflective mirror. Accordingly, an image display in accordance with a difference in physique and preferences of a user can be performed.

The display device according to an aspect of the present disclosure may include the second configuration. The second display unit may be a second display unit that does not allow emission of the third image light and the fourth image light from the boundary between the third region and the fourth region.

In this case, there is a possibility that polarized light is not shaped and image quality may decline at a boundary between the third region and the fourth region. In the present aspect, since the third image light and the fourth image light are not emitted from the boundary between the third region and the fourth region, a decline in image quality can be inhibited.

The display device according to an aspect of the present disclosure may include the third configuration. The first reflector may include a plurality of support bodies that support the plurality of reflective surfaces, and one of the plurality of support bodies may support at least two of the plurality of reflective surfaces.

Accordingly, since at least two reflective surfaces are supported by one support body, the reflective surfaces are integrated by the support body. As a result, positioning of the reflective surfaces can be made easier.

The display device according to an aspect of the present disclosure may include the third configuration. The first reflector may include a support body that collectively supports all the plurality of reflective surfaces.

Accordingly, since the support body collectively supports the plurality of reflective surfaces, all of the plurality of reflective surfaces included in the first reflector are integrated by the support body. As a result, in addition to making positioning of all reflective surfaces easier, the total number of components can also be reduced and downsizing can be achieved.

In the display device according to an aspect of the present disclosure, the support body that supports the at least one reflective surface which is the curved surface may include a second main surface that is the at least one reflective surface which is the curved surface, the second main surface being on an opposite side of the support body from a first main surface of the support body, the first main surface facing the second display element.

Accordingly, since the reflective surface being a curved surface is the second main surface of the support body, image light emitted by the second display element is first incident to the first main surface of the support body and then reflected by the second main surface (reflective surface) and emitted from the first main surface. In this manner, since three timings where aberration is correctable can be secured, a display image formed of image light following the path can be made clear.

The display device according to an aspect of the present disclosure may include the third configuration, and may include a second reflector that is different from the first reflector and reflects the fifth image light.

Accordingly, since the second reflector reflects the fifth image light, the optical path length of image light can be increased by the reflection. Accordingly, a depth feel of a display image can be further enhanced.

The display device according to an aspect of the present disclosure may include the third configuration. The second display element may emit the fifth image light including single polarized light. The display device may include: a third polarizing half mirror that is disposed facing the second display element and the first reflector and reflects the fifth image light; and a sixth λ/4 plate disposed between the third polarizing half mirror and the first reflector.

Accordingly, the sixth λ/4 plate is disposed between the third polarizing half mirror which reflects the fifth image light emitted from the second display element and the first reflector. Due to such a layout, a polarization state of the fifth image light formed of a single beam of polarized light is converted by passing through the sixth λ/4 plate a plurality of times before passing through the third polarizing half mirror and the fifth image light becomes capable of passing through the third polarizing half mirror. In addition, since the fifth image light is once reflected by the third polarizing half mirror and further reflected by the first reflector before passing through the third polarizing half mirror, an optical path length of the fifth image light can be increased.

The display device according to an aspect of the present disclosure may include the third configuration. The second display element may emit the fifth image light including single polarized light. The display device may include: a third polarizing half mirror that is disposed between the second display element and the first reflector and transmits the fifth image light; and a sixth λ/4 plate disposed between the third polarizing half mirror and the first reflector.

Accordingly, the sixth λ/4 plate is disposed between the third polarizing half mirror which transmits the fifth image light emitted from the second display element and the first reflector. Due to such a layout, the fifth image light formed of a single beam of polarized light passes through the sixth λ/4 plate a plurality of times after passing through the third polarizing half mirror once and before reaching the third polarizing half mirror by being reflected by the first reflector. Accordingly, the fifth image light becomes capable of being reflected by the third polarizing half mirror. Next, after being reflected by the third polarizing half mirror, the fifth image light passes through the sixth λ/4 plate a plurality of times before reaching the third polarizing half mirror by being reflected by the first reflector. Accordingly, since the fifth image light becomes capable of passing through the third polarizing half mirror, the fifth image light passes through the third polarizing half mirror. Therefore, the optical path length of the fifth image light can be increased.

In the display device according to an aspect of the present disclosure, the third polarizing half mirror may include a plurality of regions having mutually different polarization properties.

Accordingly, since the third polarizing half mirror includes a plurality of regions having mutually different polarization properties, an optical path length (viewing distance) of image light which passes through each region can be differentiated. As a result, a wider variety of image expressions can be performed.

The display device according to an aspect of the present disclosure may include a second λ/2 plate stacked only on part of the second display element.

Accordingly, since the second λ/2 plate is stacked only in a part of the second display element, image light having passed through the second λ/2 plate is directed toward the third polarizing half mirror while being shifted by half a phase. For example, when the third polarizing half mirror transmits image light emitted by the second display element, image light having been shifted by half a phase by the second λ/2 plate is reflected by the third polarizing half mirror. On the other hand, when the third polarizing half mirror reflects image light emitted by the second display element, image light having been shifted by half a phase by the second λ/2 plate passes through the third polarizing half mirror. In this manner, image light emitted from the second display element can be branched into different optical paths between image light having passed through the second λ/2 plate and image light not having passed through the second λ/2 plate. Therefore, the optical path length of each beam of image light can be differentiated and a wider variety of image expressions can be performed.

The display device according to an aspect of the present disclosure may include the third configuration. At least one reflective surface among the plurality of reflective surfaces may be a flat surface.

Accordingly, since at least one of a plurality of reflective surfaces is a flat surface, a display image via a reflective surface being a curved surface can be subjected to an image expression that differs from that of a display image via a reflective surface being a flat surface. As a result, a dramatic impact can be further enhanced.

The display device according to an aspect of the present disclosure may include the third configuration. The plurality of reflective surfaces may include at least three reflective surfaces, and the at least three reflective surfaces may have different curvatures.

Accordingly, since respective curvatures of the at least three reflective surfaces differ from one another, a different image expression can be performed by a display image via each reflective surface. Therefore, a wider variety of image expressions can be performed and a dramatic impact can be further enhanced.

The display device according to an aspect of the present disclosure may include the third configuration. The plurality of reflective surfaces may include at least three reflective surfaces, and the at least three reflective surfaces may have different distances from the second display element.

Accordingly, since the at least three reflective surfaces have different distances from the second display element, a viewing distance of a display image via each reflective surface can be differentiated. Therefore, a wider variety of image expressions can be performed and a dramatic impact can be further enhanced.

The display device according to an aspect of the present disclosure may include the third configuration, and the plurality of display images may be arranged side by side in the horizontal direction as viewed from a user.

Accordingly, since the plurality of display images are side by side in the horizontal direction as viewed from the user, the superposition of display images can be made less likely to change even if a height of an eye line of the user changes.

The display device according to an aspect of the present disclosure may include the third configuration, and the plurality of display images may be arranged side by side in the vertical direction as viewed from a user.

Accordingly, since the plurality of display images are side by side in the vertical direction as viewed from the user, the superposition of images can be made less likely to change even if the eye line of the user changes in a left-right direction.

The display device according to an aspect of the present disclosure may include the third configuration, and the second display element may emit the fifth image light to provide at least a predetermined spacing between adjacent display images among the plurality of display images.

Accordingly, since at least a predetermined spacing is provided between adjacent display images, overlapping of the adjacent display images caused by a change in the eye line of the user can be inhibited.

The display device according to an aspect of the present disclosure may include the third configuration, and may include: a viewpoint detector that detects a viewpoint of a user; and a controller that controls the second display element. The controller may control display content displayed by the second display element, based on a detection result of the viewpoint detector.

Accordingly, since the controller controls display content of the second display element based on a detection result of the viewpoint detector, a display image in accordance with the point of view of the user can be formed. Therefore, even if the point of view changes, a display image with few defects as viewed from the user can be formed.

The display device according to an aspect of the present disclosure may include the third configuration, and may include a controller that controls the second display element. The controller may control a luminance of each of the plurality of display images based on viewing distances of the plurality of display images.

Accordingly, since the controller controls a luminance of each of a plurality of display images based on viewing distances of the display images, an appropriate luminance can be set to each display image. In particular, although the luminance of a display image enlarged by a reflective surface can decline, the decline in luminance can be complemented on the side of the second display element due to control by the controller.

The display device according to an aspect of the present disclosure may include the third configuration, and may include a controller that controls the second display element. The controller may determine whether or not to invert display content displayed by the second display element, according to a total number of times the fifth image light forming each of the plurality of display images is reflected.

Accordingly, since the controller determines whether or not to invert display content of the second display element in accordance with the total number of times image light forming each of the plurality of display images is reflected, an appropriate display image as viewed from the user can be formed regardless of the total number of times the image light is reflected.

The display device according to an aspect of the present disclosure may include the third configuration, and may include a third driver that causes at least one of the first reflector or the second display element to operate.

Accordingly, at least one of the first reflector or the second display element can be operated (slide movement, rotational movement, or the like) by the third driver. As a result, a display position or a viewing distance of at least one of respective display images formed of image light emitted by the second display element and display light reflected by the first reflector can be adjusted by an operation of at least one of the first reflector or the second display element. Accordingly, an image display in accordance with a difference in physique and preferences of a user can be performed.

The display device according to an aspect of the present disclosure may include the third configuration, and one of the plurality of display images may be disposed surrounding an other one of the plurality of display images as viewed from a user.

Accordingly, since one of the plurality of display images is disposed surrounding another display image as viewed from the user, a wider variety of expressions can be performed.

EMBODIMENTS

Note that each of the embodiments described below shows a specific example of the present disclosure. The numerical values, shapes, materials, constituent elements, the arrangement and connection of the constituent elements etc. illustrated in the embodiments described below are mere examples, and are not intended to limit the present disclosure. In addition, among the constituent elements in the embodiments described below, those not recited in any one of the independent claims will be described as optional constituent elements.

While expressions indicating relative attitudes of two directions such as parallel and orthogonal are to be used in the following embodiments, the expressions include cases where such attitudes are not strictly assumed. For example, unless otherwise noted, a case where two directions are described as being parallel will not only mean that the two directions are completely parallel but will also mean that the two directions are substantially parallel or, in other words, the two directions include a difference of around several percent.

While optical paths illustrated in each drawing in the embodiments described below represent a concept in principle, the optical paths do not necessarily reflect actual optical paths.

In the following description and in the drawings, a width direction or a left-right direction of optical elements will be defined as an X-axis direction, a height direction or a vertical direction of the optical elements will be defined as a Y-axis direction, and a direction orthogonal to both the X-axis direction and the Y-axis direction will be defined as a Z-axis direction. In the following direction, a positive X-axis direction refers to an arrow direction of the X axis and a negative X-axis direction refers to an opposite direction to the positive X-axis direction. A direction simply referred to as the X-axis direction refers to either both of or one of the positive X-axis direction and the negative X-axis direction. A similar description will apply to the Y-axis direction and the Z-axis direction.

Embodiment 1

With the conventional display device described above, in reality, an amount of light of image light including vehicle information becomes lost when the image light passes through a half mirror. Improving performance of a display device also includes inhibiting such a loss of an amount of light. Display devices designed to inhibit loss of an amount of light will be described in Embodiments 1 to 17.

FIG. 1 is a schematic view showing a state where display device 10 according to Embodiment 1 is provided in vehicle 1. In FIG. 1, cross sections of vehicle 1 and enclosure 20 are shown.

As shown in FIG. 1, display device 10 is a device for displaying images. In the present embodiment, display device 10 is provided inside a cabin of vehicle 1. For example, display device 10 displays vehicle information related to vehicle 1. User 2 who is a driver of vehicle 1 can visually recognize the vehicle information by looking at display device 10 (refer to a dashed arrow in FIG. 1). Examples of vehicle information include a vehicle speed of vehicle 1, the total number of revolutions of an engine, a detection result of an object in proximity of vehicle 1, navigation information from a current position to a destination of vehicle 1, and information on an image taken by a camera for imaging the rear of vehicle 1. While FIG. 1 shows an example where display device 10 is disposed in the vicinity of an upper end of a windshield of vehicle 1, display device 10 is not limited to this position and, for example, display device 10 may be disposed in a portion of a dashboard where meters are disposed or on a center console.

Figure 2:
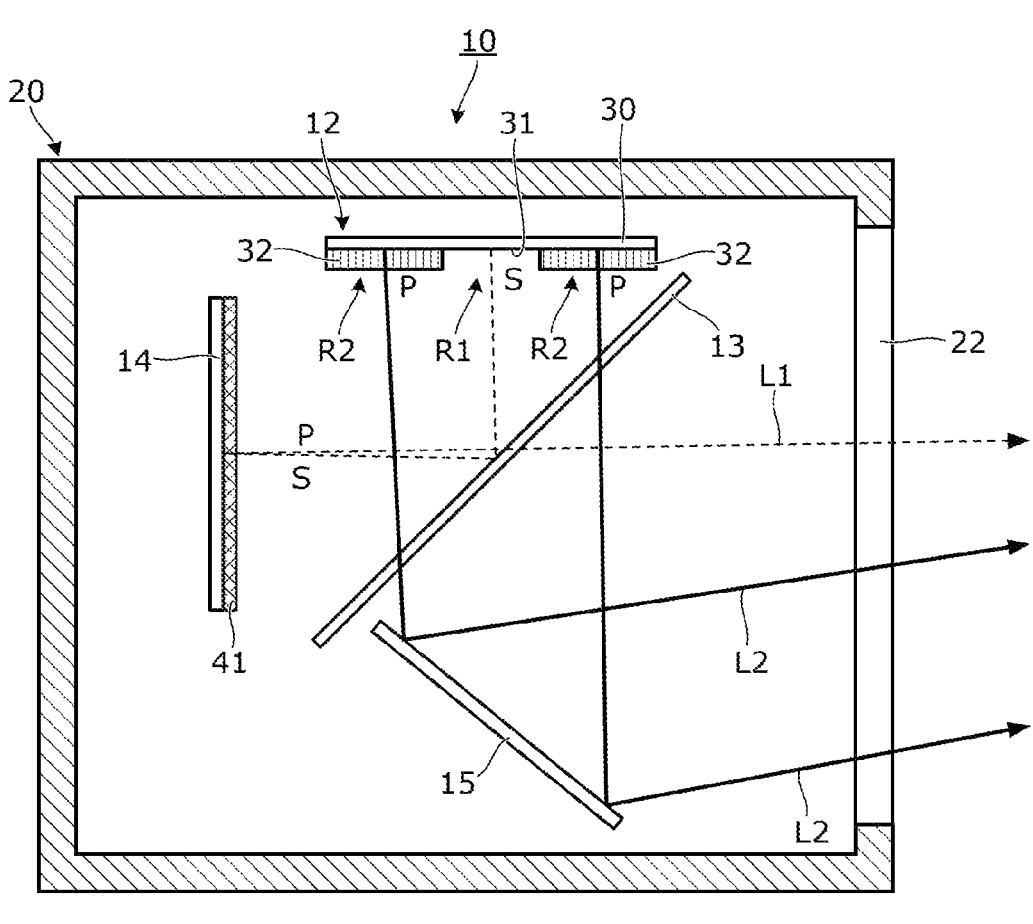
FIG. 2 is a schematic view showing a schematic configuration of the display device according to Embodiment 1.
Figure 2:
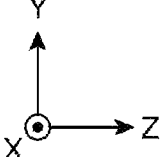

FIG. 2 is a schematic view showing a schematic configuration of display device 10 according to Embodiment 1. In FIG. 2, a cross section of enclosure 20 is shown. As shown in FIG. 2, display device 10 includes enclosure 20, first display unit 12, first polarizing half mirror 13, first reflective mirror 14, second reflective mirror 15, and first λ/4 plate 41.

Enclosure 20 houses first display unit 12, first polarizing half mirror 13, first reflective mirror 14, second reflective mirror 15, and first λ/4 plate 41. In the present embodiment, enclosure 20 is suspended from a ceiling of vehicle 1. Enclosure 20 includes emitter 22 for emitting light generated from first display unit 12 to the outside of enclosure 20.

Emitter 22 is provided on a wall section in the positive Z-axis direction in enclosure 20. Emitter 22 is a through-hole which communicates an internal space and an external space of enclosure 20. A transparent plate for dust protection may be disposed in emitter 22. In enclosure 20, first display unit 12 is disposed in the vicinity of an inside surface (inside top surface) in the positive Y-axis direction. In enclosure 20, first reflective mirror 14 and first λ/4 plate 41 are disposed in the vicinity of an inside surface in the negative Z-axis direction. In enclosure 20, second reflective mirror 15 is disposed in the vicinity of an inside surface (inside bottom surface) in the negative Y-axis direction. In enclosure 20, first polarizing half mirror 13 is disposed in a central part. Second reflective mirror 15, first polarizing half mirror 13, and first display unit 12 are disposed side by side in this order from the negative Y-axis direction toward the positive Y-axis direction. First reflective mirror 14, first λ/4 plate 41, first polarizing half mirror 13, and emitter 22 are disposed retardation plate in this order from the negative Z-axis direction toward the positive Z-axis direction.

Figure 3:
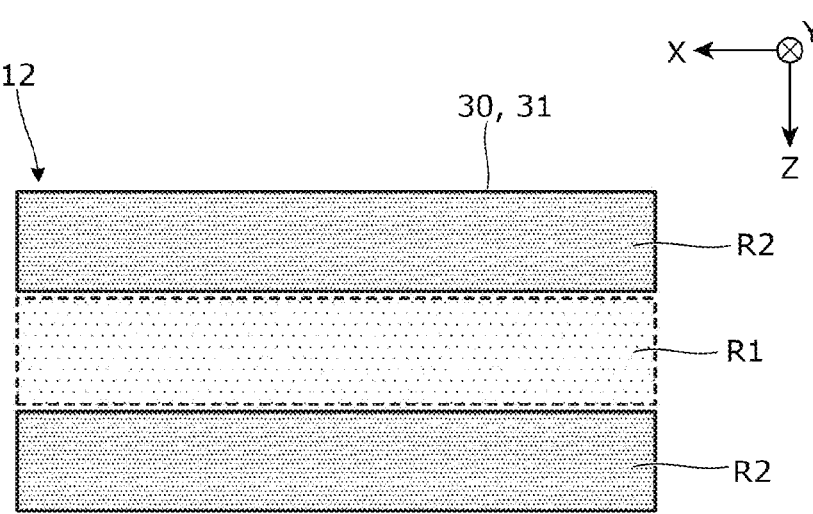
FIG. 3 is a plan view showing a first display unit according to Embodiment 1.

FIG. 3 is a plan view showing first display unit 12 according to Embodiment 1. As shown in FIGS. 2 and 3, first display unit 12 is disposed in an attitude along an XZ plane. First display unit 12 has display element 30 including display surface 31 and a pair of first λ/2 plates 32 that are only stacked in a part of display surface 31. Display element 30 emits light representing an image from display surface 31. For example, display element 30 is realized by including an LCD (Liquid Crystal Display), an organic EL (Electro Luminescence) display, a micro LED (Light Emitting Diode) display, or the like. Display element 30 is formed so that display surface 31 assumes a flat shape as a whole.

First λ/2 plate 32 is a λ/2 retardation plate which creates a phase difference of ½ of a wavelength λ in light incident to first λ/2 plate 32. For example, when light emitted from display surface 31 is linearly polarized light that is S polarized light, the light is converted into linearly polarized light that is P polarized light by passing through first λ/2 plate 32. In the following description, linearly polarized light that is S polarized light may be simply referred to as "S polarized light" and linearly polarized light that is P polarized light may be simply referred to as "P polarized light". The pair of first λ/2 plates 32 is disposed in a band shape at both ends in the Z-axis direction of display surface 31. Therefore, display surface 31 is in a state where a central part in the Z-axis direction is exposed. In this case, in first display unit 12, a region where display surface 31 is exposed will be referred to as first region R1 and regions covered by respective first λ/2 plates 32 will be referred to as second regions R2. First region R1 and the pair of second regions R2 are arranged side by side in the Z-axis direction as viewed from the negative Y-axis direction with first region R1 being sandwiched between two second regions R2.

First image light L1 formed of S polarized light is emitted from first region R1 and second image light L2 formed of P polarized light is emitted from second regions R2. In FIG. 2, an optical path of first image light L1 is depicted by a dashed arrow and an optical path of second image light L2 is depicted by a bold arrow. In addition, in FIG. 2, each beam of image light is denoted by "S" when the image light is S polarized light and denoted by "P" when the image light is P polarized light. A similar description will apply to the other drawings.

First polarizing half mirror 13 is an optical member which transmits one of first image light L1 and second image light L2 and which reflects the other of first image light L1 and second image light L2. In the present embodiment, first polarizing half mirror 13 reflects S polarized light and transmits P polarized light. Specifically, first polarizing half mirror 13 is structured such that a reflective polarizing plate is disposed on a flat plate-shaped glass base material (in this case, the reflective polarizing plate is disposed on a side of first display unit 12 in the glass base material). First polarizing half mirror 13 is disposed in an attitude in which first image light L1 emitted from first display unit 12 is reflected toward first reflective mirror 14 and first λ/4 plate 41.

First reflective mirror 14 is a plane mirror. First reflective mirror 14 is disposed at a position opposing first polarizing half mirror 13 in the negative Z-axis direction of first polarizing half mirror 13. First reflective mirror 14 is disposed in an attitude in which first image light L1 from first polarizing half mirror 13 is reflected and the reflected light passes through first polarizing half mirror 13 and is directed toward emitter 22. In other words, first reflective mirror 14 is disposed on a reflective optical path of first image light L1 having been reflected by first polarizing half mirror 13.

First λ/4 plate 41 is stacked on an entire surface of first reflective mirror 14. First λ/4 plate 41 is a λ/4 retardation plate for converting linearly polarized light incident to first λ/4 plate 41 into circularly polarized light and for converting circularly polarized light incident to first λ/4 plate 41 into linearly polarized light. In other words, first image light L1 having been reflected by first polarizing half mirror 13 is incident to first λ/4 plate 41 and converted into circularly polarized light, subsequently reflected by first reflective mirror 14, and once again incident to first λ/4 plate 41 and converted into linearly polarized light. In this manner, first image light L1 acquires a phase difference of ½ by passing through first λ/4 plate 41 twice. Specifically, first image light L1 of S polarized light having been reflected by first polarizing half mirror 13 is converted into P polarized light by passing through first λ/4 plate 41 twice. Since first image light L1 has been converted into P polarized light, first image light L1 can pass through first polarizing half mirror 13. First image light L1 having passed through first polarizing half mirror 13 is emitted from emitter 22.

Second reflective mirror 15 is a plane mirror. Second reflective mirror 15 is disposed at a position opposing first polarizing half mirror 13 in the negative Y-axis direction of first polarizing half mirror 13. Second reflective mirror 15 is disposed in an attitude in which second image light L2 from first polarizing half mirror 13 is reflected and the reflected light is directed toward emitter 22. More specifically, second reflective mirror 15 is disposed in an attitude in which the pair of reflected beams of second image light L2 becomes lower (negative Y-axis direction) than first image light L1.

Figure 4:
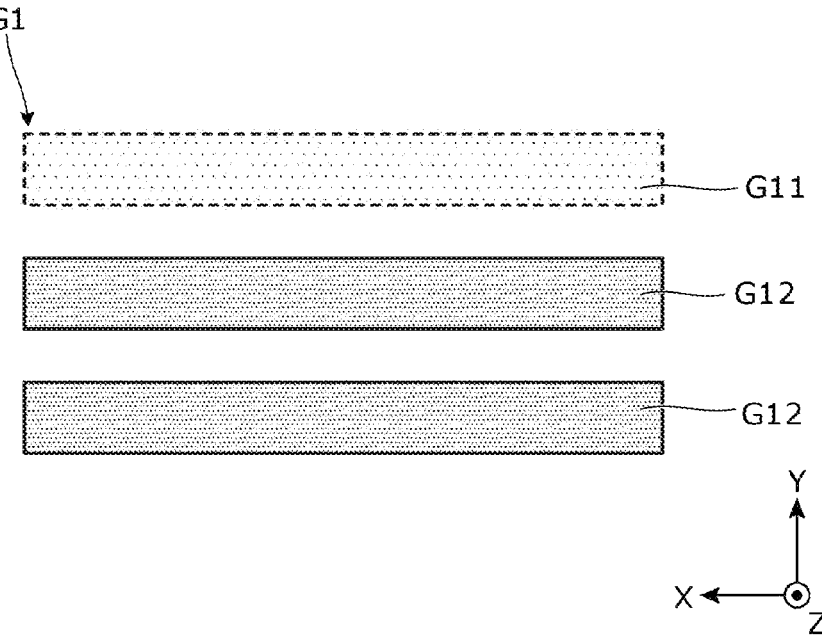
FIG. 4 is a plan view showing a display image displayed by the display device according to Embodiment 1.

FIG. 4 is a plan view showing display image G1 displayed by display device 10 according to Embodiment 1. FIG. 4 represents a state as viewed from user 2. As shown in FIG. 4, in display image G1 from display device 10, image G11 formed of first image light L1 and images G12 formed of the pair of beams of second image light L2 are arranged side by side in the Y-axis direction (vertical direction) so that image G11 is at an uppermost position. At this point, since the optical path length of first image light L1 and the optical path length of each of the beams of second image light L2 differ from one another, image G11 and each image G12 are displayed at different depth positions (positions in the Z-axis direction) as viewed from user 2. For example, the optical path length of first image light L1 can be adjusted by adjusting a distance from first polarizing half mirror 13 to first reflective mirror 14 and the optical path length of each of the beams of second image light L2 can be adjusted by adjusting a distance from first polarizing half mirror 13 to second reflective mirror 15.

As described above, with display device 10 according to the present embodiment, first polarizing half mirror 13 reflects first image light L1 and transmits second image light L2. In this case, since first reflective mirror 14 is disposed on the reflective optical path of first image light L1, first image light L1 is reflected by first reflective mirror 14. At this point, since first λ/4 plate 41 is disposed on the reflective optical path between first reflective mirror 14 and first polarizing half mirror 13, first image light L1 passes through first λ/4 plate 41 before being reflected and also passes through first λ/4 plate 41 after being reflected. In other words, first image light L1 becomes shifted by half a phase by passing through first λ/4 plate 41 twice. First image light L1 having been shifted by half a phase becomes in-phase with second image light L2 and passes through first polarizing half mirror 13. In this manner, each of the beams of first image light L1 and second image light L2 passes through first polarizing half mirror 13 in a phase which enables the image light to pass through first polarizing half mirror 13. Accordingly, a decline in an amount of light attributable to first polarizing half mirror 13 can be inhibited.

In this manner, in order to inhibit a decline in an amount of light, display device 10 has a first configuration which includes first display unit 12, first polarizing half mirror 13, first reflective mirror 14, and first λ/4 plate 41.

For example, since second reflective mirror 15 is disposed on a transmissive optical path of second image light L2 that is another optical path, a reflection destination (display position) of second image light L2 can be readily adjusted by adjusting an attitude of second reflective mirror 15.

Of display surface 31, a region on which first λ/2 plate 32 is not stacked is first region R1 and a region on which first λ/2 plate 32 is stacked is second region R2. In other words, in light emitted from display surface 31, light that does not pass through first λ/2 plate 32 becomes first image light L1 and light that passes through first λ/2 plate 32 becomes second image light L2. In this manner, since display element 30 and first λ/2 plate 32 are integrated in first display unit 12, first display unit 12 can be readily handled.

Since first image light L1 and second image light L2 are side by side in the vertical direction as viewed from user 2, the superposition of images can be made less likely to change even if the eye line of user 2 changes in a left-right direction.

Embodiment 2

Display device 10A according to Embodiment 2 will be described. Note that in the following description, the same portions as in Embodiment 1 will be denoted by the same reference signs and descriptions thereof may be omitted.

Figure 5:
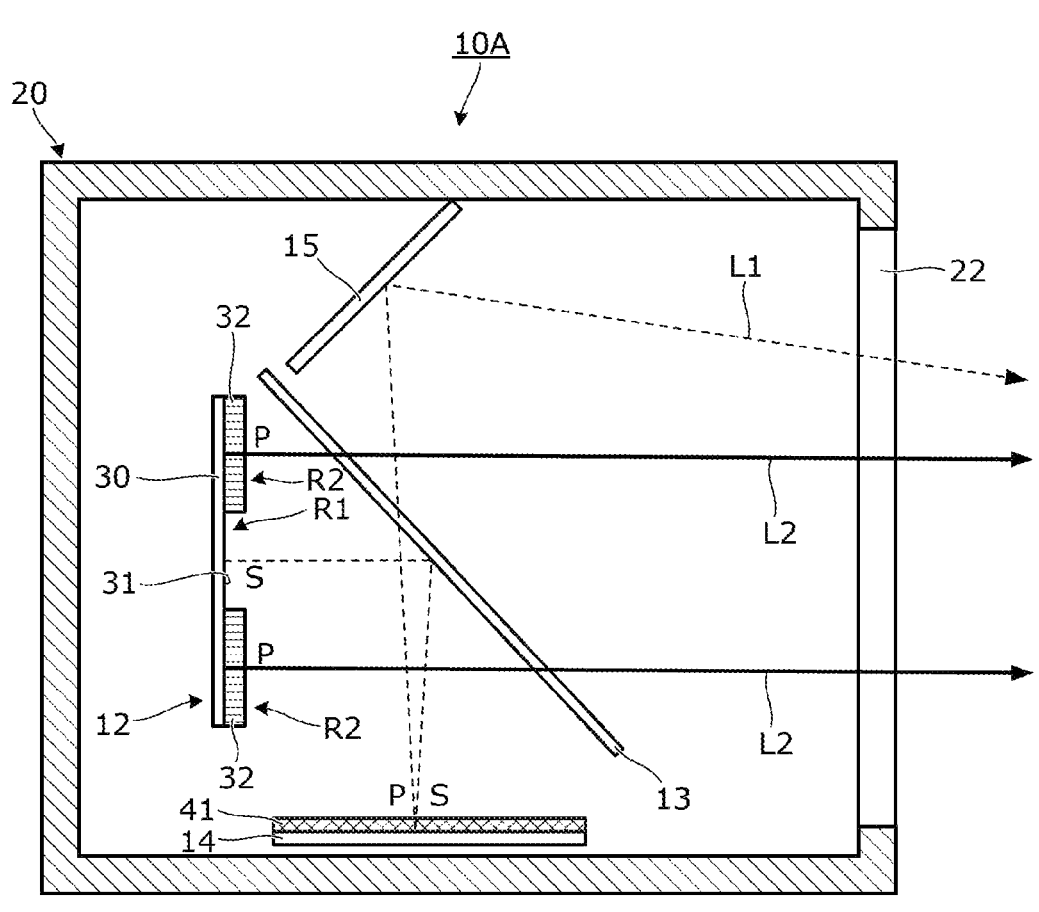
FIG. 5 is a schematic view showing a schematic configuration of a display device according to Embodiment 2.
Figure 5:
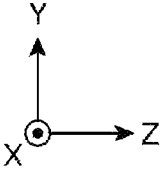

FIG. 5 is a schematic view showing a schematic configuration of display device 10A according to Embodiment 2. FIG. 5 is a diagram corresponding to FIG. 2. As shown in FIG. 5, display device 10A includes enclosure 20, first display unit 12, first polarizing half mirror 13, first reflective mirror 14, second reflective mirror 15, and first λ/4 plate 41, and a layout thereof differs from that of display device 10 according to Embodiment 1.

Specifically, in enclosure 20, first display unit 12 is disposed in the vicinity of an inside surface in the negative Z-axis direction. In enclosure 20, first reflective mirror 14 and first λ/4 plate 41 are disposed in the vicinity of an inside surface (inside bottom surface) in the negative Y-axis direction. In enclosure 20, second reflective mirror 15 is disposed in the vicinity of an inside surface (inside top surface) in the positive Y-axis direction. In enclosure 20, first polarizing half mirror 13 is disposed in a central part. First display unit 12, first polarizing half mirror 13, and emitter 22 are disposed side by side in this order from the negative Z-axis direction toward the positive Z-axis direction. First reflective mirror 14, first λ/4 plate 41, first polarizing half mirror 13, and second reflective mirror 15 are disposed side by side in this order from the negative Y-axis direction toward the positive Y-axis direction.

First display unit 12 is disposed in an attitude along an XY plane. First polarizing half mirror 13 is disposed in an attitude in which first image light L1 emitted from first display unit 12 is reflected toward first reflective mirror 14 and first λ/4 plate 41. Therefore, second image light L2 emitted from first display unit 12 passes through first polarizing half mirror 13 and reaches emitter 22. First reflective mirror 14 is disposed in an attitude in which first image light L1 from first polarizing half mirror 13 is reflected and the reflected light passes through first polarizing half mirror 13 and is directed toward second reflective mirror 15. Second reflective mirror 15 is disposed in an attitude in which first image light L1 having passed through first polarizing half mirror 13 is reflected and the reflected light is directed toward emitter 22.

Even in Embodiment 2, first polarizing half mirror 13 reflects S polarized light and transmits P polarized light. In this case, since first reflective mirror 14 is disposed on the reflective optical path of first image light L1, first image light L1 is reflected by first reflective mirror 14. At this point, since first λ/4 plate 41 is disposed on the reflective optical path between first reflective mirror 14 and first polarizing half mirror 13, first image light L1 passes through first λ/4 plate 41 before being reflected and also passes through first λ/4 plate 41 after being reflected. In other words, first image light L1 becomes shifted by half a phase by passing through first λ/4 plate 41 twice. First image light L1 having been shifted by half a phase becomes in-phase with second image light L2 and passes through first polarizing half mirror 13. In this manner, each of the beams of first image light L1 and second image light L2 passes through first polarizing half mirror 13 in a phase which enables the image light to pass through first polarizing half mirror 13. Accordingly, a decline in an amount of light attributable to first polarizing half mirror 13 can be inhibited.

Embodiment 3

Display device 10B according to Embodiment 3 will be described. Note that in the following description, the same portions as in Embodiment 1 will be denoted by the same reference signs and descriptions thereof may be omitted.

Figure 6:
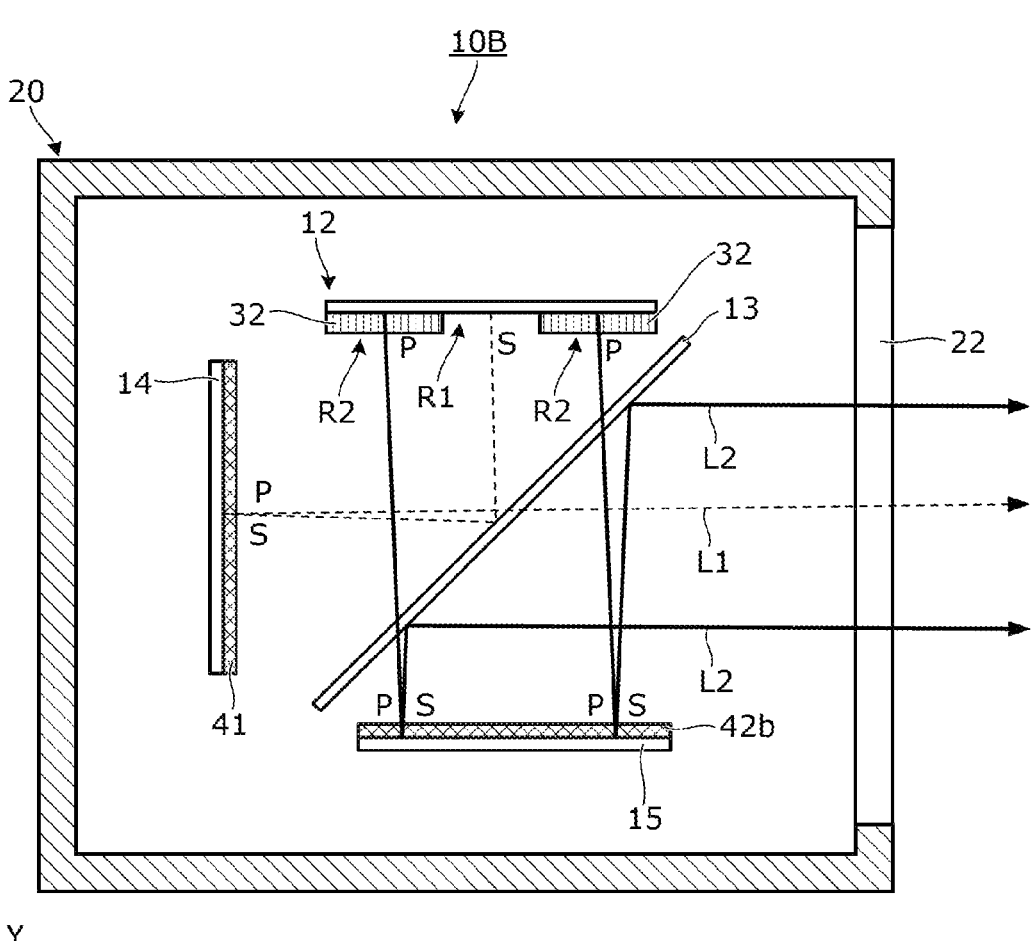
FIG. 6 is a schematic view showing a schematic configuration of a display device according to Embodiment 3.
Figure 6:
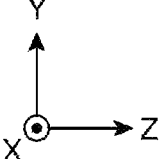

FIG. 6 is a schematic view showing a schematic configuration of display device 10B according to Embodiment 3. FIG. 6 is a diagram corresponding to FIG. 2. As shown in FIG. 6, in display device 10B, second λ/4 plate 42b is stacked on a front surface of second reflective mirror 15. In other words, second λ/4 plate 42b is disposed on a transmissive optical path of second image light L2 having passed through first polarizing half mirror 13.

Second λ/4 plate 42b is a λ/4 retardation plate for converting linearly polarized light incident to second λ/4 plate 42b into circularly polarized light and for converting circularly polarized light incident to second λ/4 plate 42b into linearly polarized light. In other words, second image light L2 having passed through first polarizing half mirror 13 is incident to second λ/4 plate 42b and converted into circularly polarized light, subsequently reflected by second reflective mirror 15, and once again incident to second λ/4 plate 42b and converted into linearly polarized light. In this manner, second image light L2 acquires a phase difference of ½ by passing through second λ/4 plate 42b twice. Specifically, second image light L2 of P polarized light having passed through first polarizing half mirror 13 is converted into S polarized light by passing through second λ/4 plate 42b twice. Since second image light L2 has been converted into S polarized light, second image light L2 is reflected by first polarizing half mirror 13. Second image light L2 reflected by first polarizing half mirror 13 is emitted from emitter 22.

Figure 7:
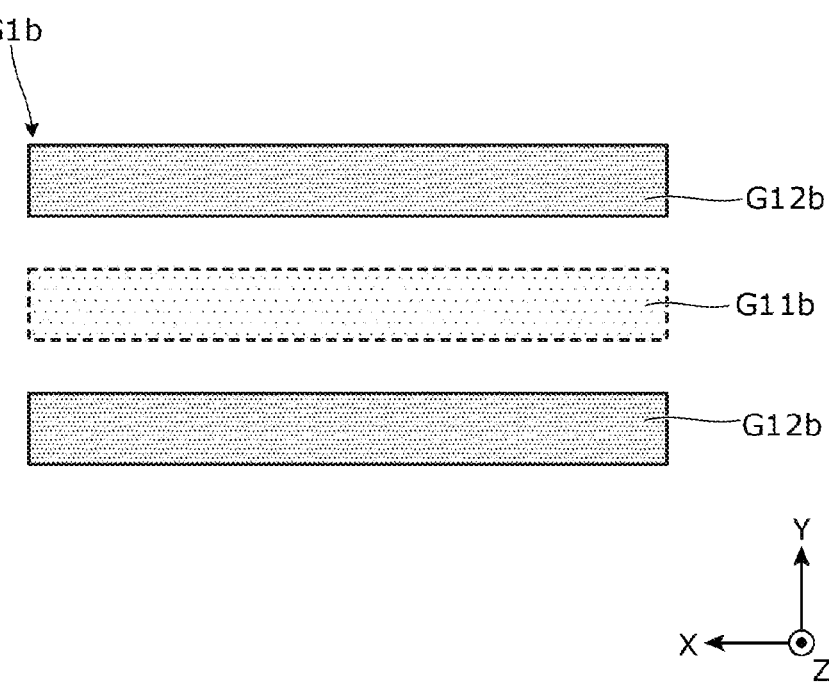
FIG. 7 is a plan view showing a display image displayed by the display device according to Embodiment 3.

In this case, second reflective mirror 15 is disposed in an attitude in which first image light L1 is between the pair of reflected beams of second image light L2 in the Y-axis direction. FIG. 7 is a plan view showing display image G1b displayed by display device 10B according to Embodiment 3. FIG. 7 is a diagram corresponding to FIG. 4. As shown in FIG. 7, in display image G1b from display device 10B, image G11b formed of first image light L1 and images G12b formed of the pair of beams of second image light L2 are arranged side by side in the Y-axis direction (vertical direction) so that image G11b is at center in the Y-axis direction. At this point, since the optical path length of first image light L1 and the optical path length of the pair of beams of second image light L2 differ from one another due to a difference between a distance between first reflective mirror 14 and first polarizing half mirror 13 and a distance between second reflective mirror 15 and first polarizing half mirror 13, image G11 and each image G12 are displayed at different depth positions (positions in the Z-axis direction) as viewed from user 2.

In this manner, since second λ/4 plate 42b is disposed on the transmissive optical path of second image light L2 having passed through first polarizing half mirror 13, second image light L2 traveling along the transmissive optical path is shifted by half a phase by passing through second λ/4 plate 42b twice. Second image light L2 passing through first polarizing half mirror 13 in a state before passing through second λ/4 plate 42b twice is reflected by first polarizing half mirror 13 due to the shift by half a phase according to the two transmissions. Therefore, first image light L1 not having passed through second λ/4 plate 42b and second image light L2 having passed through second λ/4 plate 42b can be superimposed on each other. Furthermore, since second image light L2 is to be reflected by first polarizing half mirror 13, the optical path length can be increased by a corresponding amount. Accordingly, since a difference in depths can be created due to a difference in optical path lengths between image G11b formed of first image light L1 and image G12b formed of second image light L2 while providing a depth feel, a wider variety of image expressions can be performed.

Embodiment 4

Display device 10C according to Embodiment 4 will be described. Note that in the following description, the same portions as in Embodiment 1 will be denoted by the same reference signs and descriptions thereof may be omitted.

Figure 8:
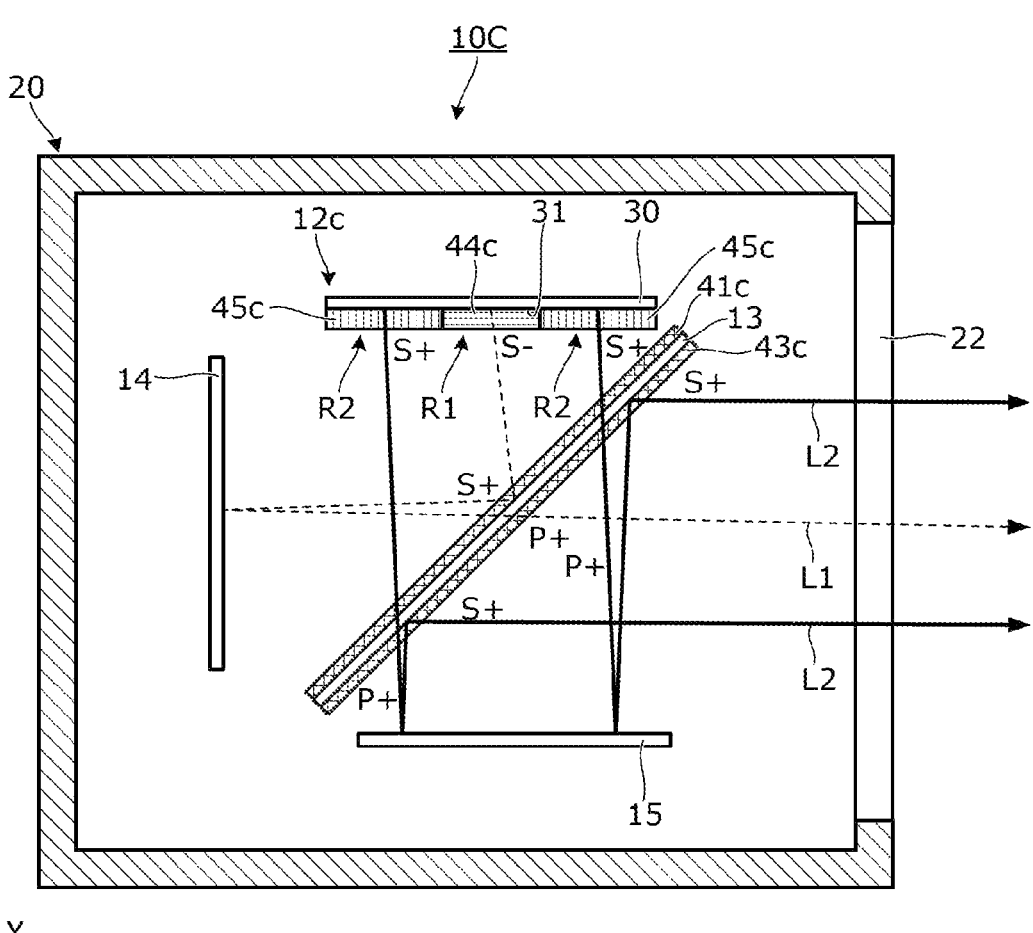
FIG. 8 is a schematic view showing a schematic configuration of a display device according to Embodiment 4.
Figure 8:
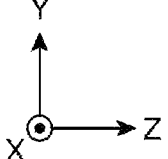

FIG. 8 is a schematic view showing a schematic configuration of display device 10C according to Embodiment 4. FIG. 8 is a diagram corresponding to FIG. 2. As shown in FIG. 8, in display device 10C, first λ/4 plate 41c, and third λ/4 plate 43c are stacked on both surfaces of first polarizing half mirror 13. Specifically, first λ/4 plate 41c is stacked on a first surface that faces first display unit 12c in first polarizing half mirror 13. Third λ/4 plate 43c is stacked on a second surface on an opposite side to first λ/4 plate 41c in first polarizing half mirror 13. First λ/4 plate 41c and third λ/4 plate 43c are λ/4 retardation plates for converting linearly polarized light incident thereto into circularly polarized light and for converting circularly polarized light incident thereto into linearly polarized light.

A retardation plate is not stacked on first reflective mirror 14 and second reflective mirror 15 according to the present embodiment. In other words, entire surfaces of first reflective mirror 14 and second reflective mirror 15 are respectively exposed.

In first display unit 12c according to the present embodiment, first image light L1 and second image light L2 emitted from first display unit 12c are beams of circularly polarized light which are shifted by half a phase from each other. On display surface 31 of display element 30 included in first display unit 12c, λ/4 plate 44c is stacked in a portion to become first region R1 and λ/4 plate 45c is stacked in a portion to become second region R2. λ/4 plate 44c and λ/4 plate 45c may be separated from display surface 31 and provided separately from display element 30.

λ/4 plate 44c and λ/4 plate 45c are λ/4 retardation plates for converting linearly polarized light incident thereto into circularly polarized light and for converting circularly polarized light incident thereto into linearly polarized light. In this case, first λ/4 plate 41c, third λ/4 plate 43c, and λ/4 plate 45c differ from λ/4 plate 44c in an orientation of circularly polarized light. For example, the orientation of circularly polarized light of first λ/4 plate 41c, third λ/4 plate 43c, and λ/4 plate 45c is clockwise while the orientation of circularly polarized light of λ/4 plate 44c is counterclockwise. Hereinafter, S polarized light converted into clockwise circularly polarized light will be referred to as S+ polarized light and S polarized light converted into counterclockwise circularly polarized light will be referred to as S– polarized light. In a similar manner, P polarized light converted into clockwise circularly polarized light will be referred to as P+ polarized light and P polarized light converted into counterclockwise circularly polarized light will be referred to as P– polarized light. Note that S+ polarized light and P– polarized light are the same and S– polarized light and P+ polarized light are the same.

In first display unit 12c described above, for example, when S polarized light is emitted from display surface 31 of display element 30, in first region R1, S polarized light is converted by λ/4 plate 44c and first image light L1 formed of S– polarized light is emitted. In second region R2, S polarized light is converted by λ/4 plate 45c and second image light L2 formed of S+ polarized light is emitted.

First, a transition of first image light L1 will be described. First image light L1 that is S– polarized light is converted into S polarized light by passing through first λ/4 plate 41c. First image light L1 having become S polarized light is reflected by first polarizing half mirror 13 and once again passes through first λ/4 plate 41c. Accordingly, first image light L1 is converted into S+ polarized light (P– polarized light). Subsequently, first image light L1 is reflected by first reflective mirror 14 and once again passes through first λ/4 plate 41c. Accordingly, since first image light L1 is converted into P polarized light, first image light L1 passes through first polarizing half mirror 13 and passes through third λ/4 plate 43c. Due to the transmission, first image light L1 is directed toward emitter 22 in a state of having been converted into P+ polarized light.

Next, a transition of second image light L2 will be described. Second image light L2 that is S+ polarized light is converted into P polarized light by passing through first λ/4 plate 41c. Second image light L2 having become P polarized light passes through first polarizing half mirror 13 and then passes through third λ/4 plate 43c. Accordingly, second image light L2 is converted into P+ polarized light (S− polarized light). Subsequently, second image light L2 is reflected by second reflective mirror 15 and once again passes through third λ/4 plate 43c. Accordingly, since second image light L2 is converted into S polarized light, second image light L2 is reflected by first polarizing half mirror 13 and once again passes through third λ/4 plate 43c. Therefore, second image light L2 is directed toward emitter 22 in a state of having been converted from S polarized light into S+ polarized light (P− polarized light).

In this manner, since first λ/4 plate 41c is stacked on the first surface of first polarizing half mirror 13, first polarizing half mirror 13 and first λ/4 plate 41c can be integrated and the device as a whole can be downsized.

In addition, since third λ/4 plate 43c is stacked on the second surface of first polarizing half mirror 13, first polarizing half mirror 13 and first λ/4 plate 41c and third λ/4 plate 43c can be integrated and the device as a whole can be downsized.

Embodiment 5

Display device 10D according to Embodiment 5 will be described. Note that in the following description, the same portions as in Embodiment 3 will be denoted by the same reference signs and descriptions thereof may be omitted.

Figure 9:
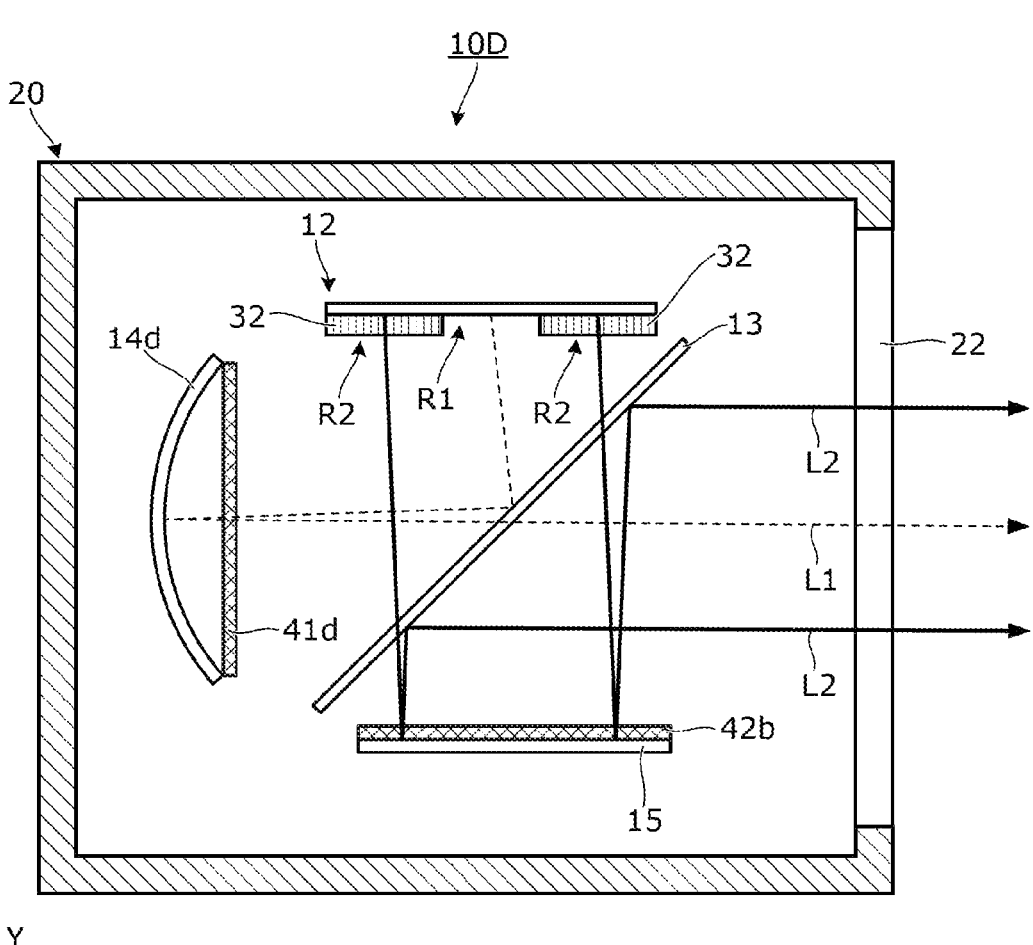
FIG. 9 is a schematic view showing a schematic configuration of a display device according to Embodiment 5.
Figure 9:
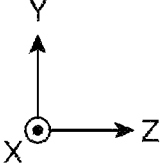

FIG. 9 is a schematic view showing a schematic configuration of display device 10D according to Embodiment 5. FIG. 9 is a diagram corresponding to FIG. 6. As shown in FIG. 9, display device 10D differs from display device 10B according to Embodiment 3 in that first reflective mirror 14d is a concave mirror. First λ/4 plate 41d is disposed so as to be separated from first reflective mirror 14d in a state of being stacked on a transparent member such as glass. This is due to the fact that stacking a λ/4 retardation plate on a concave curved surface of first reflective mirror 14d is difficult in terms of manufacturing. In other words, separately providing first reflective mirror 14d and first λ/4 plate 41d is suitable in terms of manufacturing. Note that first reflective mirror 14d and first λ/4 plate 41d may be integrated with each other.

Figure 10:
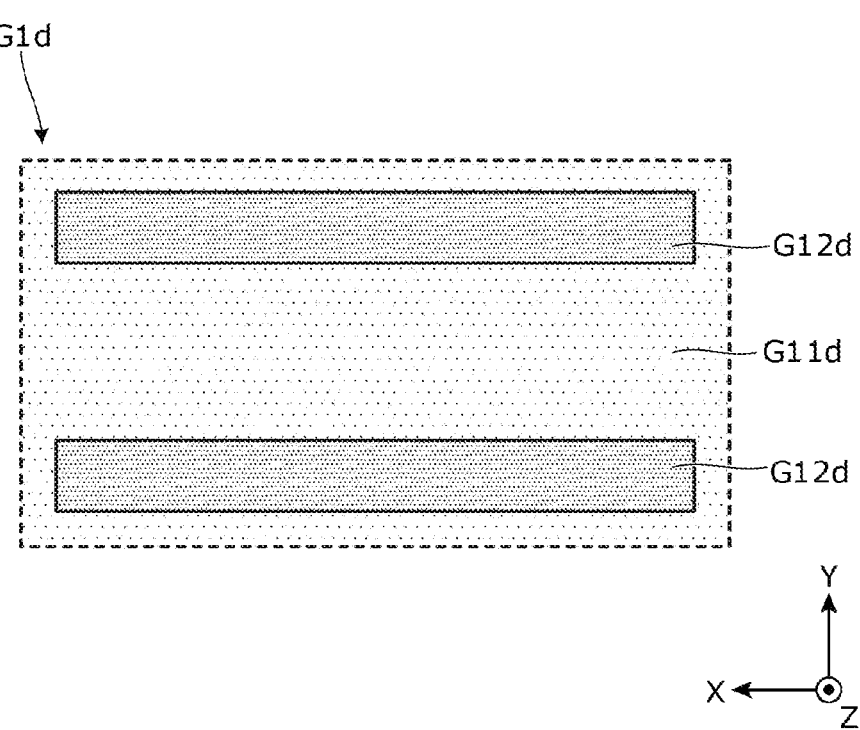
FIG. 10 is a plan view showing a display image displayed by the display device according to Embodiment 5.

FIG. 10 is a plan view showing display image G1d displayed by display device 10D according to Embodiment 5. FIG. 10 is a diagram corresponding to FIG. 7. As described above, since first reflective mirror 14d is a concave mirror, an image range of first image light L1 is enlarged by being reflected by first reflective mirror 14d. In other words, as shown in FIG. 10, in display image G1d from display device 10D, image G11d formed of first image light L1 is enlarged and images G12d formed of the pair of beams of second image light L2 are to be included in image G11d.

In this manner, since first reflective mirror 14d is a concave mirror, the image range formed by first image light L1 can be enlarged. As a result, a wide variety of image expressions can be performed.

Embodiment 6

Display device 10E according to Embodiment 6 will be described. Note that in the following description, the same portions as in Embodiment 5 will be denoted by the same reference signs and descriptions thereof may be omitted.

Figure 11:
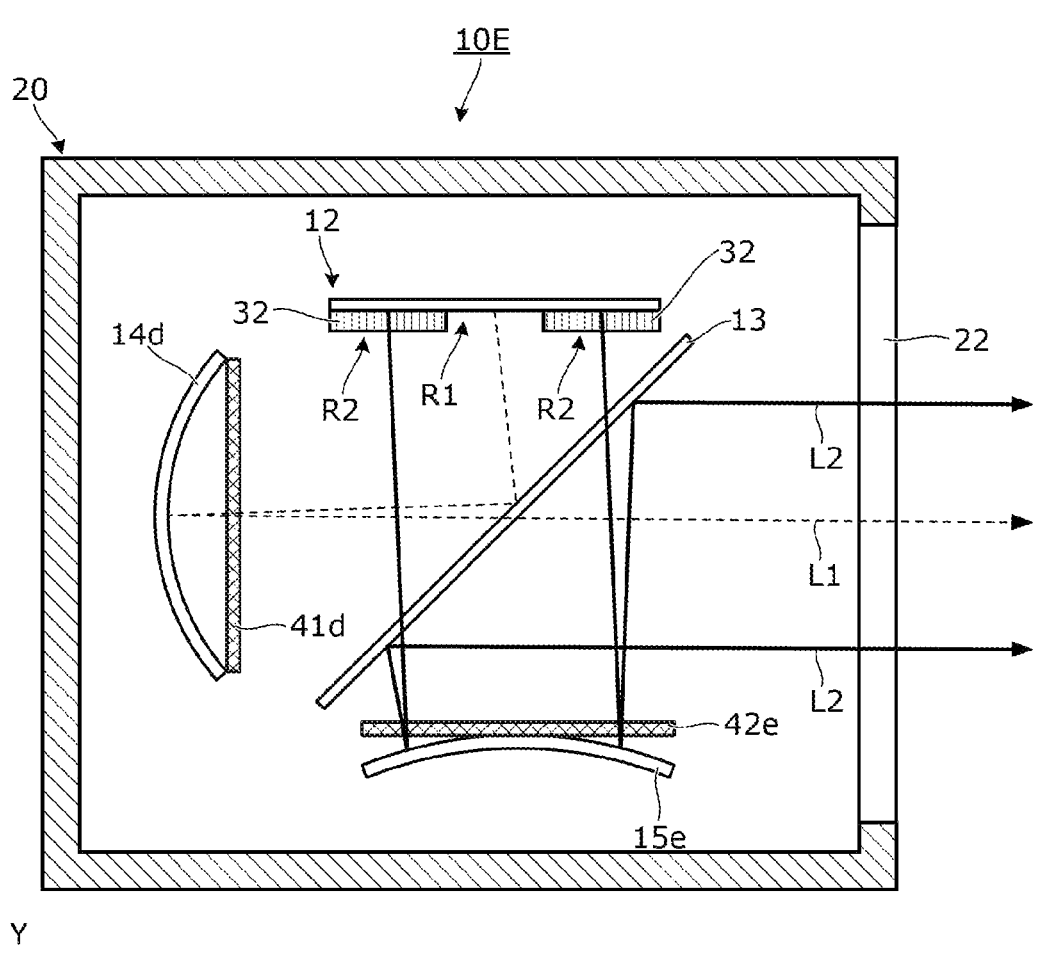
FIG. 11 is a schematic view showing a schematic configuration of a display device according to Embodiment 6.
Figure 11:
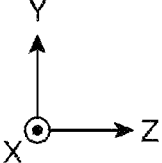

FIG. 11 is a schematic view showing a schematic configuration of display device 10E according to Embodiment 6. FIG. 11 is a diagram corresponding to FIG. 9. As shown in FIG. 11, display device 10E differs from display device 10D according to Embodiment 5 in that second reflective mirror 15e is a convex mirror. Second reflective mirror 15e and second λ/4 plate 42e are separated from each other. This is due to the fact that stacking a λ/4 retardation plate on a convex curved surface of second reflective mirror 15e is difficult in terms of manufacturing. In other words, separately providing second reflective mirror 15e and second λ/4 plate 42e is suitable in terms of manufacturing. Note that second reflective mirror 15e and second λ/4 plate 42e may be integrated with each other.

Figure 12:
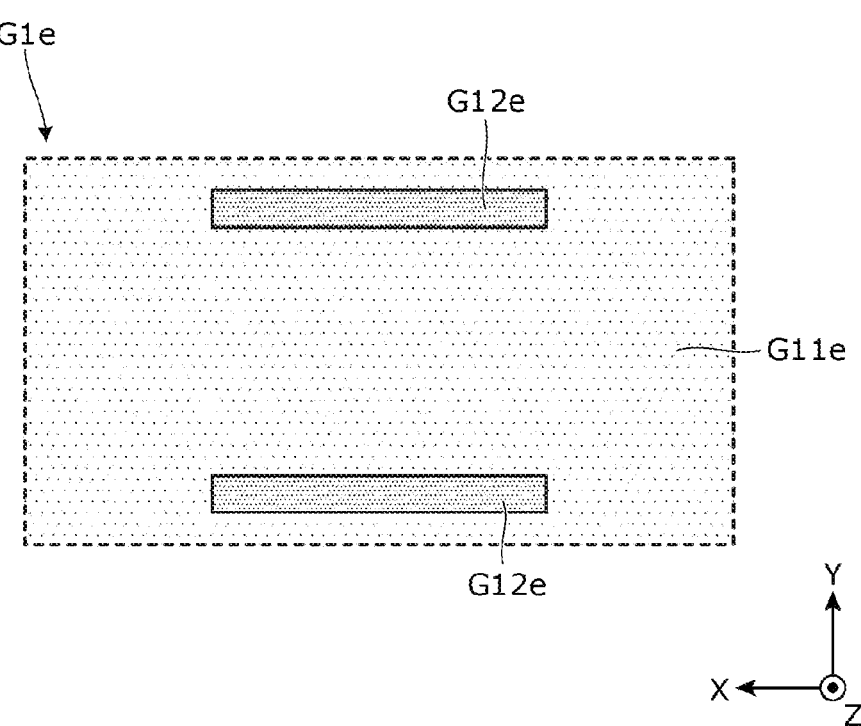
FIG. 12 is a plan view showing a display image displayed by the display device according to Embodiment 6.

FIG. 12 is a plan view showing display image G1e displayed by display device 10E according to Embodiment 6. FIG. 12 is a diagram corresponding to FIG. 10. As described above, since second reflective mirror 15e is a convex mirror, an image range of second image light L2 is reduced by being reflected by second reflective mirror 15e. In other words, as shown in FIG. 12, in display image G1e from display device 10E, image G11e formed of first image light L1 is enlarged and images G12e formed of the pair of beams of second image light L2 are to be reduced in image G11e.

In this manner, since second reflective mirror 15e is a convex mirror, the image range formed by second image light L2 can be reduced. As a result, a wide variety of image expressions can be performed. Note that the first reflective mirror may be a plane mirror. In addition, the first reflective mirror may be a convex mirror and the second reflective mirror may be a concave mirror. Furthermore, the convex mirror and the concave mirror may be a spherical surface or a free curved surface.

Embodiment 7

Figure 13:
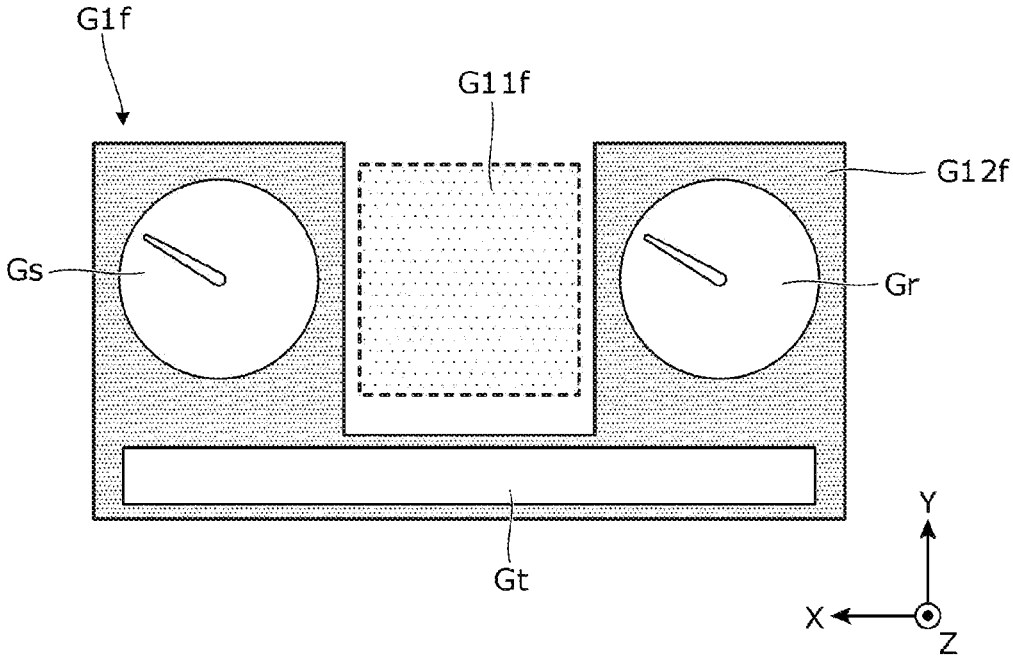
FIG. 13 is a plan view showing a display image according to Embodiment 7.

A display image according to Embodiment 7 will be described. FIG. 13 is a plan view showing display image Gif according to Embodiment 7. FIG. 13 is a diagram corresponding to FIG. 4. In display image G1f shown in FIG. 13, image G11f formed of first image light L1 is provided in a rectangular shape in a central part of display image G1f. Warning information and the like are displayed on image G11f. Image G12f formed of second image light L2 has a shape in which both ends in the X-axis direction protrude in the positive Y-axis direction, and image G11f is disposed in a depressed portion in a central part of image G12f in the X-axis direction. In FIG. 13, speedometer Gs and tachometer Gr are displayed at both ends in the X-axis direction of image G12f and display field Gt displaying various kinds of information is provided at an end in the negative Y-axis direction of image G12f. There is no limit to contents displayed on images G11f and G12f and another example includes an image of the rear of the vehicle, an image of the side of the vehicle, and a navigation image.

In display image G1f, while image G12f is wholly provided at the end in the negative Y-axis direction, image G12f and image G11f are arranged side by side in the X-axis direction (horizontal direction) in a portion more toward the positive Y-axis direction than the end. In other words, first image light L1 and second image light L2 are arranged side by side in the horizontal direction. In this manner, since first image light L1 and second image light L2 are side by side in the horizontal direction as viewed from the user, the superposition of images can be made less likely to change, even if a height of an eye line of the user changes. Note that first image light L1 and second image light L2 may be arranged side by side in the horizontal direction over entire image G12f.

Embodiment 8

Display device 10G according to Embodiment 8 will be described. Note that in the following description, the same portions as in Embodiment 1 will be denoted by the same reference signs and descriptions thereof may be omitted.

Figure 14:
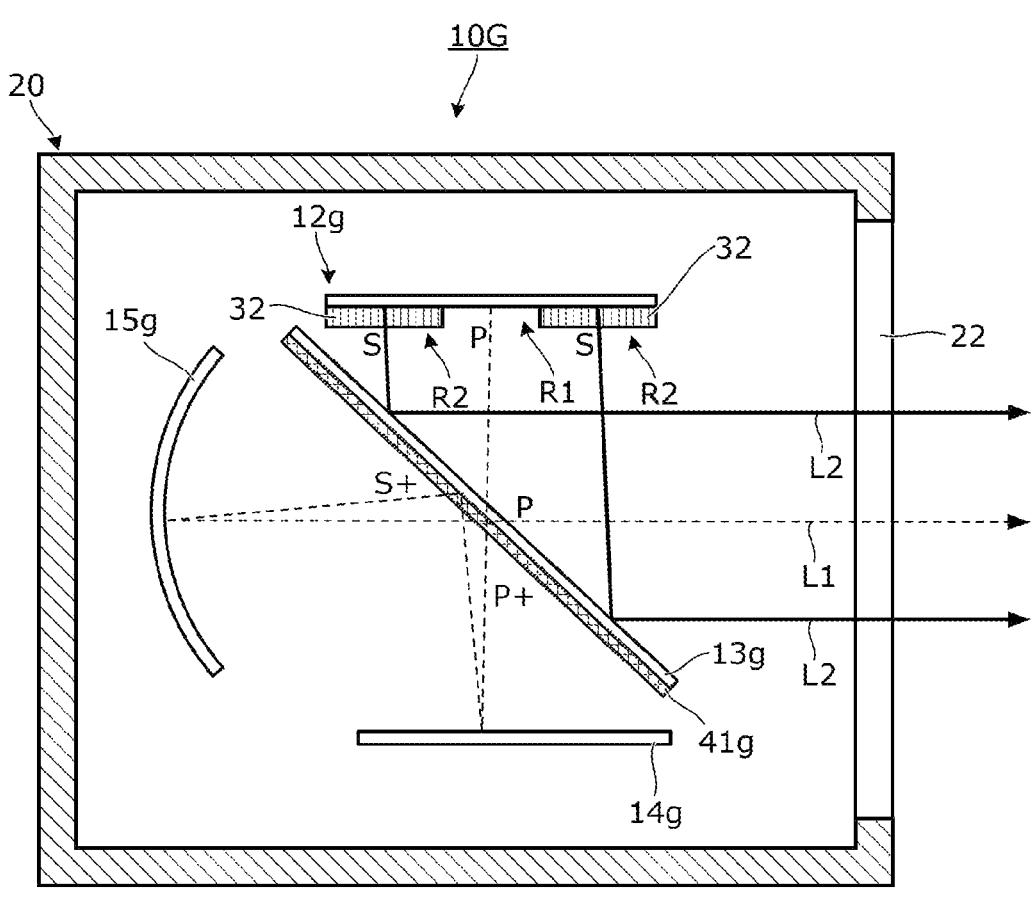
FIG. 14 is a schematic view showing a schematic configuration of a display device according to Embodiment 8.
Figure 14:
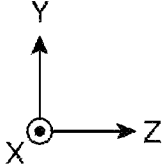

FIG. 14 is a schematic view showing a schematic configuration of display device 10G according to Embodiment 8. FIG. 14 is a diagram corresponding to FIG. 2. As shown in FIG. 14, in display device 10G, an end in the negative Z-axis direction of first polarizing half mirror 13g is disposed close to first display unit 12g while an end in the positive Z-axis direction of first polarizing half mirror 13g is disposed so as to be separated from first display unit 12g. In first polarizing half mirror 13g, first λ/4 plate 41g is stacked only on a second surface. In the present embodiment, first image light L1 formed of P polarized light is emitted from first region R1 of first display unit 12g and second image light L2 formed of S polarized light is emitted from second region R2 of first display unit 12g. In the present embodiment, first reflective mirror 14g that is a plane mirror is disposed in the negative Y-axis direction of first polarizing half mirror 13g and second reflective mirror 15g that is a concave mirror is disposed in the negative Z-axis direction of first polarizing half mirror 13g. A retardation plate is not stacked on first reflective mirror 14g and second reflective mirror 15g.

First image light L1 formed of P polarized light emitted from first region R1 of first display unit 12g passes through first polarizing half mirror 13g and subsequently passes through first λ/4 plate 41g. In this manner, first λ/4 plate 41g is disposed on a transmissive optical path of first image light L1 having passed through first polarizing half mirror 13g. First image light L1 is converted into P+ polarized light by passing through first λ/4 plate 41g. First image light L1 having become P+ polarized light is reflected by first reflective mirror 14g. In this manner, first reflective mirror 14g is disposed on a transmissive optical path of first image light L1 having passed through first polarizing half mirror 13g. First image light L1 having been reflected by first reflective mirror 14g once again passes through first λ/4 plate 41g. Accordingly, since first image light L1 is converted into S polarized light, first image light L1 is reflected by first polarizing half mirror 13g. First image light L1 having been reflected by first polarizing half mirror 13g is further converted into S+ polarized light by passing through first λ/4 plate 41g and is then reflected by second reflective mirror 15g. First image light L1 having been reflected by second reflective mirror 15g is converted into P polarized light by once again passing through first λ/4 plate 41g, passes through first polarizing half mirror 13g, and is directed toward emitter 22.

On the other hand, second image light L2 formed of S polarized light emitted from second region R2 of first display unit 12g is reflected by first polarizing half mirror 13g and is directed toward emitter 22. As described above, while first image light L1 is reflected three times, second image light L2 is reflected only once. In other words, the optical path length of first image light L1 can be made longer than the optical path length of second image light L2. If the optical path length can be extended, a curvature of second reflective mirror 15g can also be reduced.

Embodiment 9

Display device 10H according to Embodiment 9 will be described. Note that in the following description, the same portions as in Embodiment 1 will be denoted by the same reference signs and descriptions thereof may be omitted.

Figure 15:
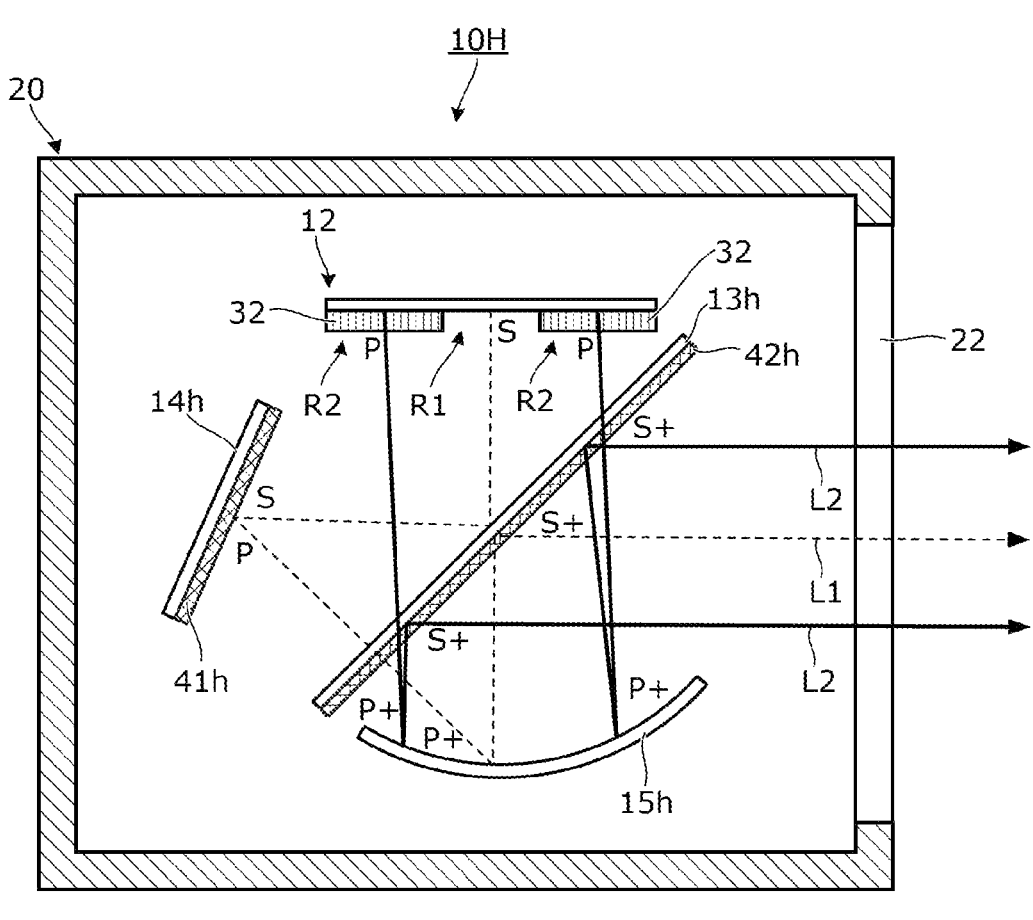
FIG. 15 is a schematic view showing a schematic configuration of a display device according to Embodiment 9.
Figure 15:
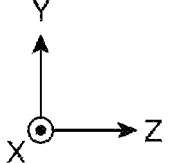

FIG. 15 is a schematic view showing a schematic configuration of display device 10H according to Embodiment 9. FIG. 15 is a diagram corresponding to FIG. 2. As shown in FIG. 15, in display device 10H, an end in the negative Z-axis direction of first polarizing half mirror 13h is disposed so as to be separated from first display unit 12 while an end in the positive Z-axis direction of first polarizing half mirror 13h is disposed close to first display unit 12. In first polarizing half mirror 13h, second λ/4 plate 42h is stacked only on a second surface. In the present embodiment, first image light L1 formed of S polarized light is emitted from first region R1 of first display unit 12 and second image light L2 formed of P polarized light is emitted from second region R2 of first display unit 12. In the present embodiment, first reflective mirror 14h that is a plane mirror is disposed in the negative Z-axis direction of first polarizing half mirror 13h and second reflective mirror 15h that is a concave mirror is disposed in the negative Y-axis direction of first polarizing half mirror 13h. Although first λ/4 plate 41h is stacked on first reflective mirror 14h, a retardation plate is not stacked on second reflective mirror 15h.

First image light L1 formed of S polarized light emitted from first region R1 of first display unit 12 is reflected by first polarizing half mirror 13h and subsequently passes through first λ/4 plate 41h. In this manner, first λ/4 plate 41h is disposed on a reflective optical path of first image light L1 having been reflected by first polarizing half mirror 13h. First image light L1 is converted into S+ polarized light by passing through first λ/4 plate 41h. First image light L1 having become S+ polarized light is reflected by first reflective mirror 14h. In this manner, first reflective mirror 14h is disposed on a reflective optical path of first image light L1 having been reflected by first polarizing half mirror 13h. First image light L1 having been reflected by first reflective mirror 14h once again passes through first λ/4 plate 41h. Accordingly, since first image light L1 is converted into P polarized light, first image light L1 passes through first polarizing half mirror 13h. First image light L1 having passed through first polarizing half mirror 13h is converted into P+ polarized light by passing through second λ/4 plate 42h and is reflected by second reflective mirror 15h. First image light L1 having been reflected by second reflective mirror 15h is converted into S polarized light by passing through second λ/4 plate 42h and is reflected by first polarizing half mirror 13h. First image light L1 having been reflected by first polarizing half mirror 13h is further converted into S+ polarized light by passing through second λ/4 plate 42h and is directed toward emitter 22. As described above, first image light L1 is reflected a total of four times between being emitted from first display unit 12 and reaching emitter 22. Since the total number of times first image light L1 is reflected is larger than the total number of times first image light L1 in FIG. 14 according to Embodiment 8 is reflected (a total of three), an optical path length can be made longer. As a result, an image displayed by first image light L1 according to present Embodiment 9 can impart a greater depth feel than an image displayed by first image light L1 according to Embodiment 8.

Embodiment 10

Display device 10I according to Embodiment 10 will be described. Note that in the following description, the same portions as in Embodiment 1 will be denoted by the same reference signs and descriptions thereof may be omitted.

Figure 16:
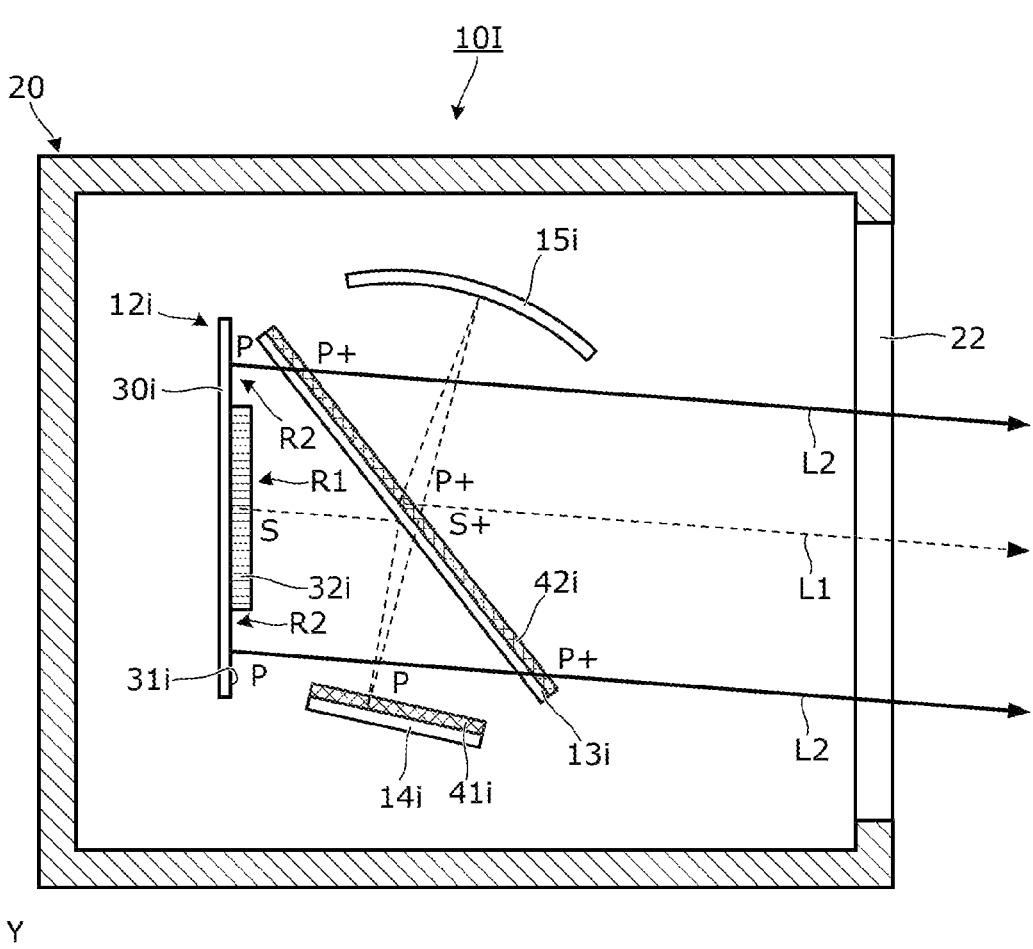
FIG. 16 is a schematic view showing a schematic configuration of a display device according to Embodiment 10.
Figure 16:
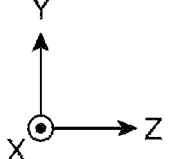

FIG. 16 is a schematic view showing a schematic configuration of display device 10I according to Embodiment 10. FIG. 16 is a diagram corresponding to FIG. 2. As shown in FIG. 16, in display device 10I, first display unit 12*i* is disposed in the negative Z-axis direction of first polarizing half mirror 13*i*. Display element 30*i* included in first display unit 12*i* emits P polarized image light from display surface 31*i*. First λ/2 plate 32*i* is stacked in first region R1 of display surface 31*i*. Due to first λ/2 plate 32*i*, first image light L1 of S polarized light is emitted from first region R1. Since a retardation plate is not stacked in second region R2, second region R2 emits second image light L2 of P polarized light.

An end in the negative Z-axis direction of first polarizing half mirror 13*i* is disposed close to first display unit 12*i* while an end in the positive Z-axis direction of first polarizing half mirror 13*i* is disposed so as to be separated from first display unit 12*i*. In first polarizing half mirror 13*i*, second λ/4 plate 42*i* is stacked only on a second surface. In the present embodiment, first reflective mirror 14*i* that is a plane mirror is disposed in the negative Y-axis direction of first polarizing half mirror 13*i* and second reflective mirror 15*i* that is a concave mirror is disposed in the positive Y-axis direction of first polarizing half mirror 13*i*. While first λ/4 plate 41*i* is stacked on first reflective mirror 14*i*, a retardation plate is not stacked on second reflective mirror 15*i*.

First image light L1 formed of S polarized light emitted from first region R1 of first display unit 12*i* is reflected by first polarizing half mirror 13*i* and subsequently passes through first λ/4 plate 41*i*. In this manner, first λ/4 plate 41*i* is disposed on a reflective optical path of first image light L1 having been reflected by first polarizing half mirror 13*i*. First image light L1 is converted into S+ polarized light by passing through first λ/4 plate 41*i*. First image light L1 having become S+ polarized light is reflected by first reflective mirror 14*i*. In this manner, first reflective mirror 14*i* is disposed on a reflective optical path of first image light L1 having been reflected by first polarizing half mirror 13*i*. First image light L1 having been reflected by first reflective mirror 14*i* once again passes through first λ/4 plate 41*i*. Accordingly, since first image light L1 is converted into P polarized light, first image light L1 passes through first polarizing half mirror 13*i*. First image light L1 having passed through first polarizing half mirror 13*i* is converted into P+ polarized light by passing through second λ/4 plate 42*i* and is reflected by second reflective mirror 15*i*. First image light L1 having been reflected by second reflective mirror 15*i* is converted into S polarized light by passing through second λ/4 plate 42*i* and is reflected by first polarizing half mirror 13*i*. First image light L1 having been reflected by first polarizing half mirror 13*i* is once again converted into S+ polarized light by passing through second λ/4 plate 42*i* and is directed toward emitter 22.

On the other hand, second image light L2 formed of P polarized light emitted from second region R2 of first display unit 12*i* passes through first polarizing half mirror 13*i* and subsequently passes through second λ/4 plate 42*i*. Accordingly, second image light L2 is converted into P+ polarized light and is directed toward emitter 22. In this manner, since second image light L2 is never reflected, an image formed of second image light L2 can be made clear. In addition, since first image light L1 is reflected four times, the optical path length of first image light L1 can be made longer than the optical path length of second image light L2.

Embodiment 11

Display device 10J according to Embodiment 11 will be described. Note that in the following description, the same portions as in Embodiment 1 will be denoted by the same reference signs and descriptions thereof may be omitted.

Figure 17:
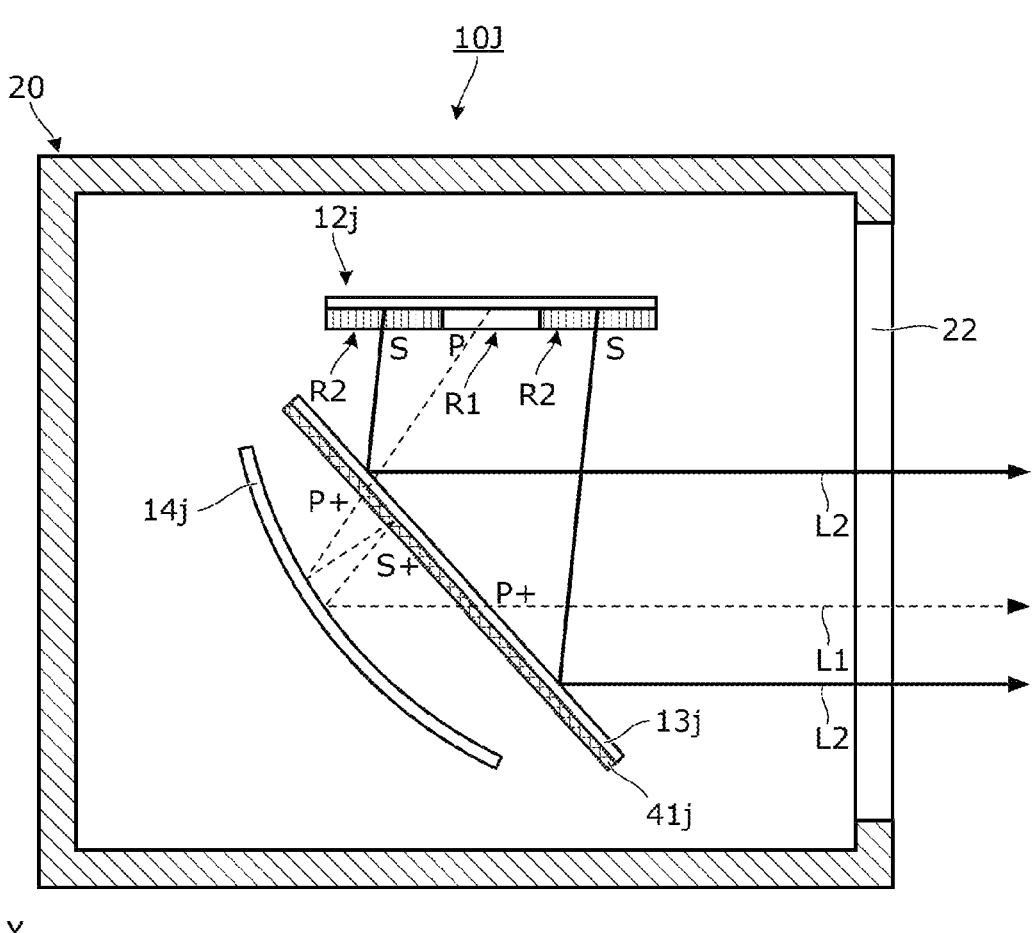
FIG. 17 is a schematic view showing a schematic configuration of a display device according to Embodiment 11.
Figure 17:
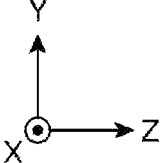

FIG. 17 is a schematic view showing a schematic configuration of display device 10J according to Embodiment 11. FIG. 17 is a diagram corresponding to FIG. 2. As shown in FIG. 17, display device 10J includes only one reflective mirror (first reflective mirror 14*j*).

An end in the negative Z-axis direction of first polarizing half mirror 13*j* is disposed close to first display unit 12*j* while an end in the positive Z-axis direction of first polarizing half mirror 13*j* is disposed so as to be separated from first display unit 12*j*. In first polarizing half mirror 13*j*, first λ/4 plate 41*j* is stacked only on a second surface. In the present embodiment, first image light L1 formed of P polarized light is emitted from first region R1 of first display unit 12*j* and second image light L2 formed of S polarized light is emitted from second region R2 of first display unit 12*j*. In the present embodiment, first reflective mirror 14*j* that is a concave mirror is disposed in the negative Y-axis direction of first polarizing half mirror 13*j*. A retardation plate is not stacked on first reflective mirror 14*j*.

First image light L1 formed of P polarized light emitted from first region R1 of first display unit 12*j* passes through first polarizing half mirror 13*j* and subsequently passes through first λ/4 plate 41*j*. In this manner, first λ/4 plate 41*j* is disposed on a transmissive optical path of first image light L1 having passed through first polarizing half mirror 13*j*. First image light L1 is converted into P+ polarized light by passing through first λ/4 plate 41*j*. First image light L1 having become P+ polarized light is reflected by first reflective mirror 14*j*. In this manner, first reflective mirror 14*j* is disposed on a transmissive optical path of first image light L1 having passed through first polarizing half mirror 13*j*. First image light L1 having been reflected by first reflective mirror 14*j* passes through first λ/4 plate 41*j*. Accordingly, since first image light L1 is converted into S polarized light, first image light L1 is reflected by first polarizing half mirror 13*j*. Due to the reflection, first image light L1 is converted into S+ polarized light by passing through first λ/4 plate 41*j* and is subsequently reflected by first reflective mirror 14*j*. Since first image light L1 having been reflected by first reflective mirror 14*j* is converted into P polarized light by passing through first λ/4 plate 41*j*, first image light L1 passes through first polarizing half mirror 13*j* and is directed toward emitter 22.

On the other hand, second image light L2 formed of S polarized light emitted from second region R2 of first display unit 12*j* is reflected by first polarizing half mirror 13*j* and is directed toward emitter 22. As described above, while first image light L1 is reflected three times, second image light L2 is reflected only once. In other words, the optical path length of first image light L1 can be made longer than the optical path length of second image light L2. In addition, since there is only one reflective mirror, the device itself can be downsized.

Embodiment 12

Display device 10K according to Embodiment 12 will be described. Note that in the following description, the same portions as in Embodiment 3 will be denoted by the same reference signs and descriptions thereof may be omitted.

Figure 18:
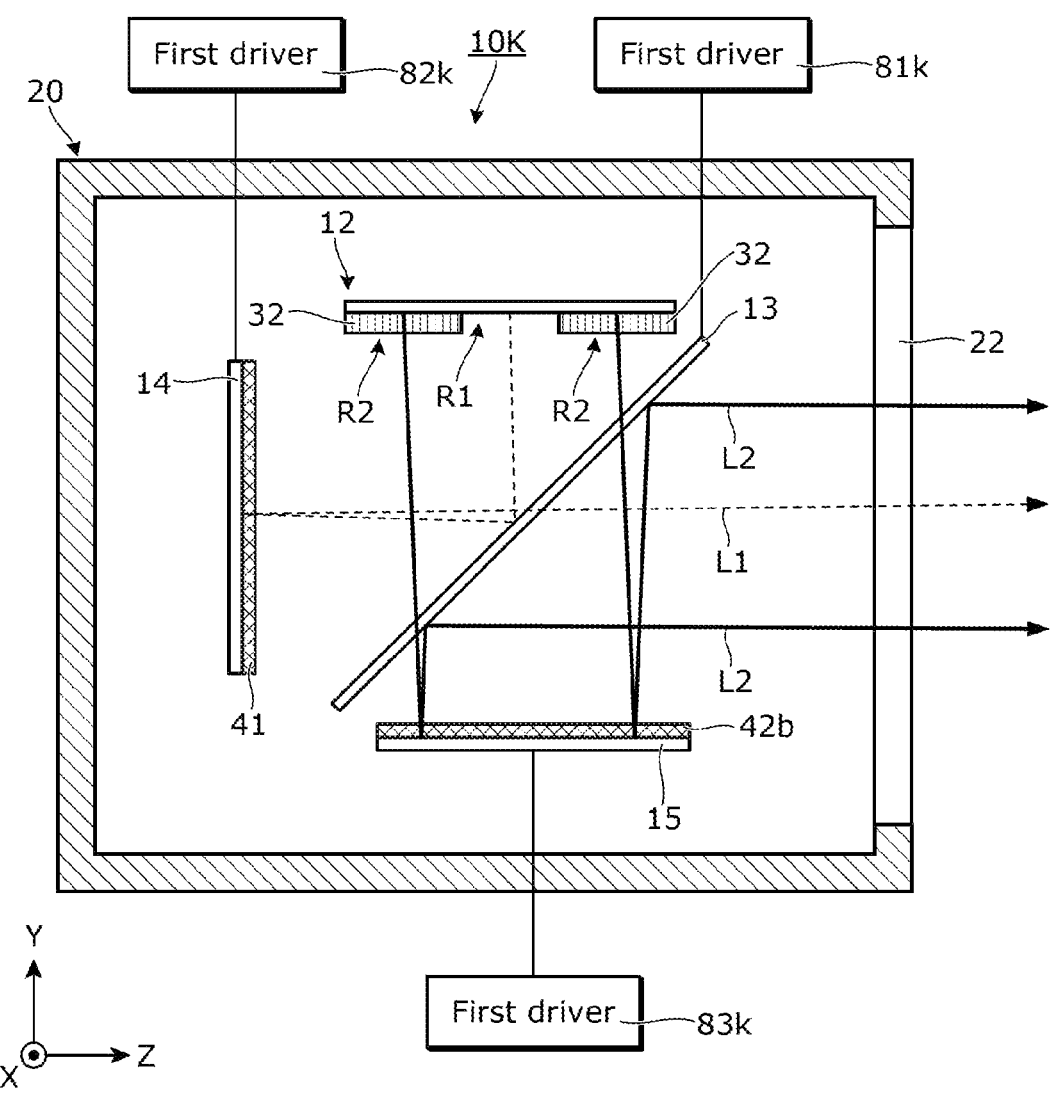
FIG. 18 is a schematic view showing a schematic configuration of a display device according to Embodiment 12.

FIG. 18 is a schematic view showing a schematic configuration of display device 10K according to Embodiment 12. FIG. 18 is a diagram corresponding to FIG. 6. As shown in FIG. 18, display device 10K includes first driver 81k, first driver 82k, and first driver 83k.

First driver 81k is an example of the first driver which operates first polarizing half mirror 13. For example, first driver 81k includes a drive source such as a motor and a power-transmitting mechanism which operates first polarizing half mirror 13 using power from the drive source. Based on the power of the drive source, first driver 81k moves first polarizing half mirror 13 (a slide operation in the Y-axis direction or a slide operation in the Z-axis direction) and changes an attitude of first polarizing half mirror 13 (for example, a rotation operation). Accordingly, orientations of optical paths of first image light L1 and second image light L2 which are to be reflected by first polarizing half mirror 13 can be adjusted.

First driver 82k is an example of the first driver which operates first reflective mirror 14. For example, first driver 82k includes a drive source such as a motor and a power-transmitting mechanism which operates first reflective mirror 14 using power from the drive source. Based on the power of the drive source, first driver 82k moves first reflective mirror 14 (for example, a slide operation in the Z-axis direction) and changes an attitude of first reflective mirror 14 (for example, a rotation operation). Accordingly, the orientation of the optical path and the optical path length of first image light L1 which is to be reflected by first reflective mirror 14 can be adjusted.

First driver 83k is an example of the first driver which operates second reflective mirror 15. For example, first driver 83k includes a drive source such as a motor and a power-transmitting mechanism which operates second reflective mirror 15 using power from the drive source. Based on the power of the drive source, first driver 83k moves second reflective mirror 15 (for example, a slide operation in the Y-axis direction) and changes an attitude of second reflective mirror 15 (for example, a rotation operation). Accordingly, the orientation of the optical path and the optical path length of second image light L2 which is to be reflected by second reflective mirror 15 can be adjusted.

Accordingly, first polarizing half mirror 13, first reflective mirror 14, and second reflective mirror 15 can be operated by first driver 81k, first driver 82k, and first driver 83k. As a result, a display position or a viewing distance of image light having been reflected by first polarizing half mirror 13 can be adjusted by operating first polarizing half mirror 13. In a similar manner, a display position or a viewing distance of image light having been reflected by first reflective mirror 14 can be adjusted by operating first reflective mirror 14. Furthermore, a display position or a viewing distance of image light having been reflected by second reflective mirror 15 can be adjusted by operating second reflective mirror 15. Accordingly, an image display in accordance with a difference in physique and preferences of a user can be performed. Note that it suffices so long as at least one of first driver 81k, first driver 82k, or first driver 83k is provided.

Embodiment 13

Display device 10M according to Embodiment 13 will be described. Note that in the following description, the same portions as in Embodiment 3 will be denoted by the same reference signs and descriptions thereof may be omitted.

Figure 19:
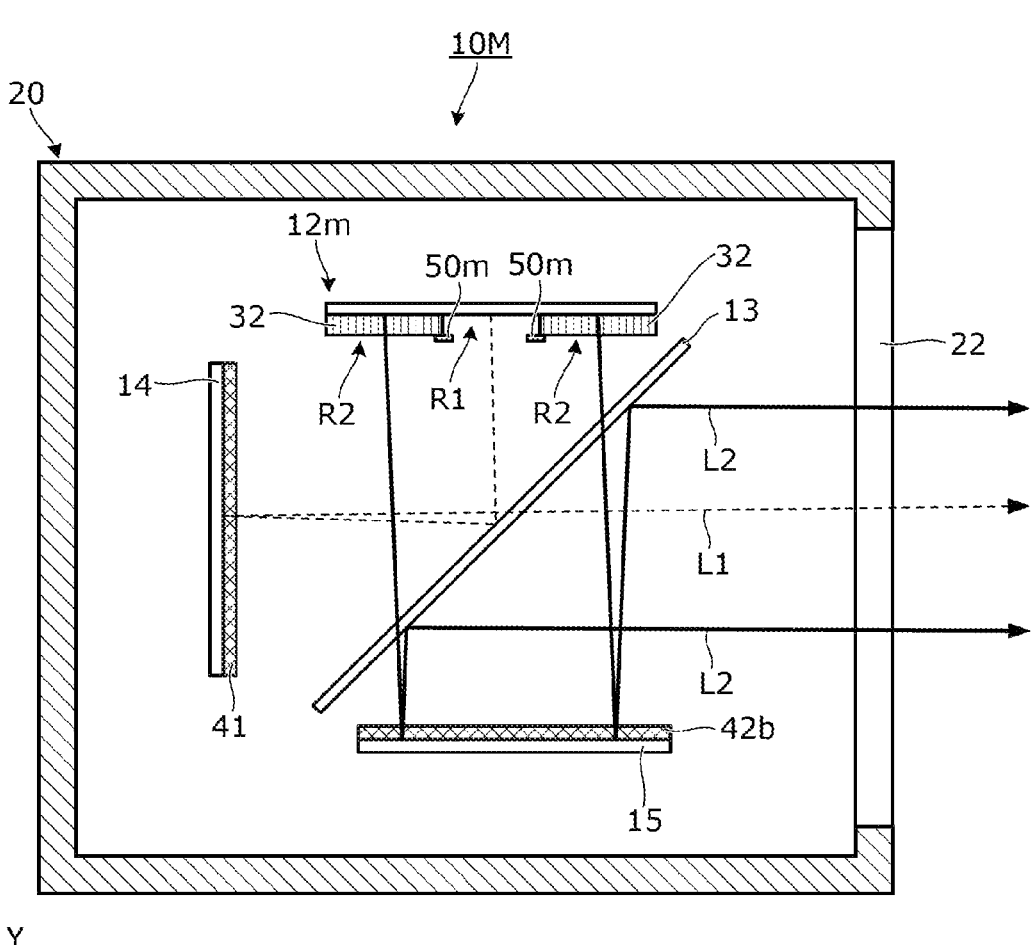
FIG. 19 is a schematic view showing a schematic configuration of a display device according to Embodiment 13.
Figure 19:
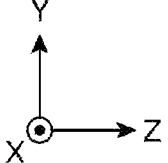

FIG. 19 is a schematic view showing a schematic configuration of display device 10M according to Embodiment 13. FIG. 19 is a diagram corresponding to FIG. 6. In this case, in display element 30, there is a possibility that polarized light is not shaped and image quality declines at a boundary between first region R1 and second region R2. In order to inhibit such a decline in image quality, a pair of light-shielding plates 50m is disposed on the boundary between first region R1 and second region R2 in first display unit 12m included in display device 10M. Each light-shielding plate 50m has a width corresponding to a predetermined number of pixels (for example, several pixels to around a dozen pixels) including the boundary between first region R1 and second region R2. Due to each light-shielding plate 50m, first image light L1 and second image light L2 emitted from regions including the boundary can be shielded and a decline in image quality can be inhibited. Other methods include a method of controlling display element 30 so that image light is not emitted from the boundary between first region R1 and second region R2.

Embodiment 14

Figure 20:
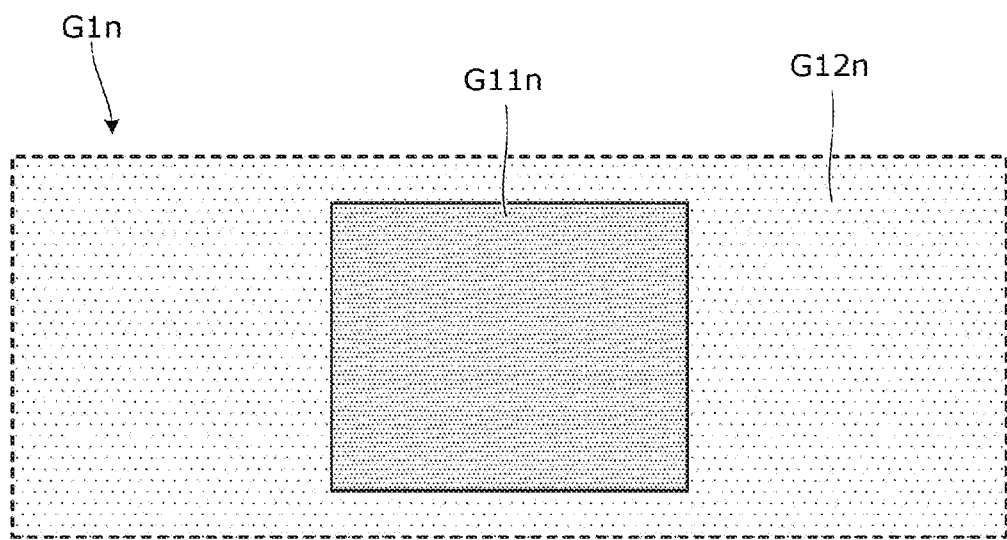
FIG. 20 is a plan view showing a display image according to Embodiment 14.

A display image according to Embodiment 14 will be described. FIG. 20 is a plan view showing display image Gin according to Embodiment 14. In display image Gin shown in FIG. 20, image G11n formed of first image light L1 is provided in a rectangular shape in a central part of display image Gin. Image G12n formed of second image light L2 is provided in a rectangular shape and disposed so as to surround image G11n.

Accordingly, since image G12n formed of the second image light is disposed so as to surround image G11n formed of the first image light as viewed from the user, a wider variety of expressions can be performed. Note that an image formed of the first image light may be disposed so as to surround an image formed of the second image light.

Embodiment 15

Figure 21:
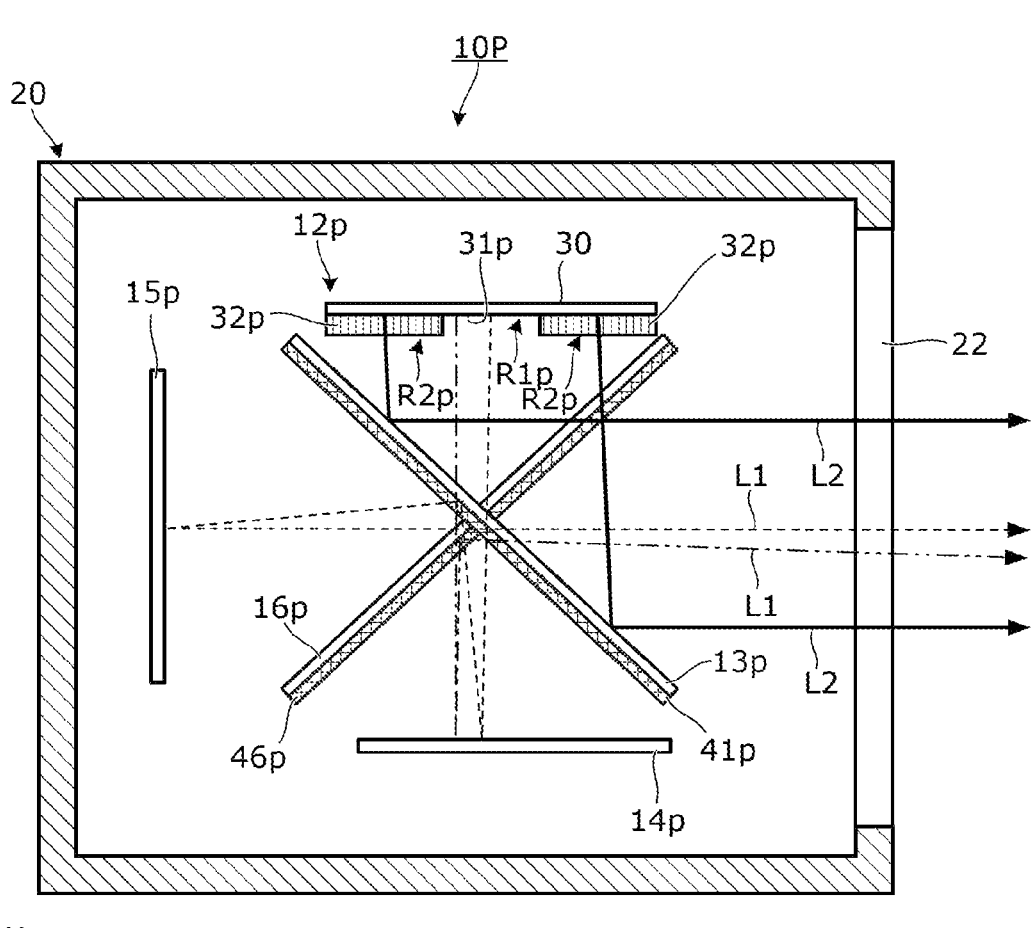
FIG. 21 is a schematic view showing a schematic configuration of a display device according to Embodiment 15.
Figure 21:
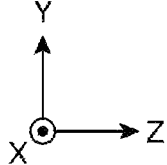
Figure 22:
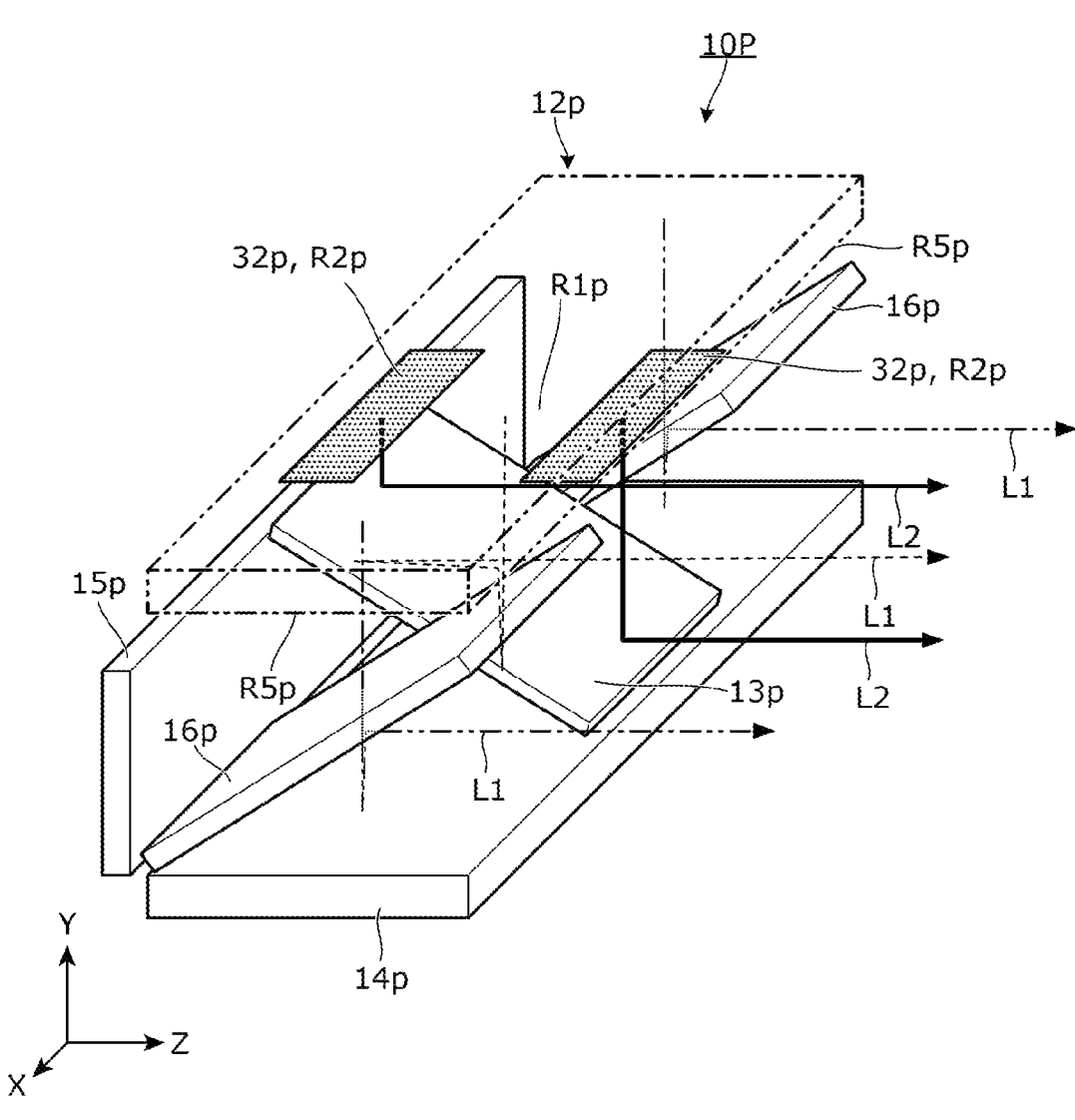
FIG. 22 is a perspective view showing a schematic configuration of the display device according to Embodiment 15.

A display device according to Embodiment 15 will be described. FIG. 21 is a schematic view showing a schematic configuration of display device 10P according to Embodiment 15. FIG. 22 is a perspective view showing a schematic configuration of display device 10P according to Embodiment 15.

As shown in FIGS. 21 and 22, display device 10P includes enclosure 20, first display unit 12p, first polarizing half mirror 13p, a pair of second polarizing half mirrors 16p, first reflective mirror 14p, second reflective mirror 15p, and first λ/4 plate 41p.

An end in the negative Z-axis direction of first polarizing half mirror 13p is disposed close to first display unit 12p while an end in the positive Z-axis direction of first polarizing half mirror 13p is disposed so as to be separated from first display unit 12p. In first polarizing half mirror 13p, first λ/4 plate 41p (not shown in FIG. 22) is stacked only on a second surface.

The pair of second polarizing half mirrors 16p is disposed at positions between which first polarizing half mirror 13p is interposed in the X-axis direction. Each second polarizing half mirror 16p is disposed so as to oppose first display unit 12p and first reflective mirror 14p at an angle (in the present embodiment, 90 degrees) that intersects first polarizing half mirror 13p in a side view (a view in the X-axis direction). Each second polarizing half mirror 16p has similar optical properties to first polarizing half mirror 13p. In other words, each second polarizing half mirror 16*p* reflects S polarized light and transmits P polarized light. In each second polarizing half mirror 16*p*, λ/4 plate 46*p* (not shown in FIG. 22) is stacked only on a second surface.

First display unit 12*p* is disposed in the positive Y-axis direction of first polarizing half mirror 13*p* and each second polarizing half mirror 16*p*. First display unit 12*p* has a shape which is elongated in the X-axis direction and a size which entirely covers first polarizing half mirror 13*p* and each second polarizing half mirror 16*p* in the X-axis direction in a Y-axis direction view. An intermediate portion in the X-axis direction of first display unit 12*p* is a portion that corresponds to first polarizing half mirror 13*p*. Both ends in the X-axis direction of first display unit 12*p* are portions that correspond to respective second polarizing half mirrors 16*p*.

A center of display surface 31*p* in the Z-axis direction is exposed at an intermediate portion of first display unit 12*p* and first λ/2 plate 32*p* is stacked on portions between which the center is interposed in the Z-axis direction. At the intermediate portion, a region where display surface 31*p* is exposed is first region R1*p*, a region where first λ/2 plate 32*p* is stacked is second region R2*p*, and a region at both ends of first display unit 12*p* where display surface 31*p* is wholly exposed is fifth region R5*p*.

First reflective mirror 14*p* is a plane mirror and is disposed in the negative Y-axis direction of first polarizing half mirror 13*p* and each second polarizing half mirror 16*p*. A reflective surface of first reflective mirror 14*p* faces the positive Y-axis direction. First reflective mirror 14*p* has a shape which is elongated in the X-axis direction and a size which entirely covers first polarizing half mirror 13*p* and each second polarizing half mirror 16*p* in the X-axis direction in a Y-axis direction view.

Second reflective mirror 15*p* is a plane mirror and is disposed in the negative Z-axis direction of first polarizing half mirror 13*p* and each second polarizing half mirror 16*p*. A reflective surface of second reflective mirror 15*p* faces the positive Z-axis direction. Second reflective mirror 15*p* has a shape which is elongated in the X-axis direction and a size which entirely covers first polarizing half mirror 13*p* and each second polarizing half mirror 16*p* in the X-axis direction in a Z-axis direction view.

First image light L1 formed of P polarized light emitted from first region R1*p* of first display unit 12*p* passes through first polarizing half mirror 13*p* and subsequently passes through first λ/4 plate 41*p*. First image light L1 is converted into P+ polarized light by passing through first λ/4 plate 41*p*. First image light L1 having become P+ polarized light is reflected by first reflective mirror 14*p*. First image light L1 having been reflected by first reflective mirror 14*p* once again passes through first λ/4 plate 41*p*. Accordingly, since first image light L1 is converted into S polarized light, first image light L1 is reflected by first polarizing half mirror 13*p*. First image light L1 having been reflected by first polarizing half mirror 13*p* is converted into S+ polarized light by further passing through first λ/4 plate 41*p* and is reflected by second reflective mirror 15*p*. First image light L1 having been reflected by second reflective mirror 15*p* is converted into P polarized light by once again passing through first λ/4 plate 41*p*, passes through first polarizing half mirror 13*p*, and is directed toward emitter 22.

Second image light L2 formed of S polarized light emitted from second region R2*p* of first display unit 12*p* is reflected by first polarizing half mirror 13*p* and is directed toward emitter 22.

First image light L1 (two-dot-dash lines in FIGS. 21 and 22) formed of P polarized light emitted from fifth region R5*p* of first display unit 12*p* passes through second polarizing half mirror 16*p* and subsequently passes through λ/4 plate 46*p*. First image light L1 is converted into P+ polarized light by passing through λ/4 plate 46*p*. First image light L1 having become P+ polarized light is reflected by first reflective mirror 14*p*. First image light L1 having been reflected by first reflective mirror 14*p* once again passes through λ/4 plate 46*p*. Accordingly, since first image light L1 is converted into S polarized light, first image light L1 is reflected by second polarizing half mirror 16*p*. First image light L1 having been reflected by second polarizing half mirror 16*p* is converted into S+ polarized light by further passing through λ/4 plate 46*p* and is directed toward emitter 22.

In this manner, first image light L1 emitted from first region R1*p* is reflected three times, second image light L2 emitted from second region R2*p* is reflected once, and first image light L1 emitted from fifth region R5*p* is reflected twice. In other words, since the optical path length of first image light L1 emitted from first region R1*p* becomes the longest, image G1*p* (refer to FIG. 23 and the like) formed of first image light L1 is displayed at a farthest position as viewed from the user. Since the optical path length of second image light L2 emitted from second region R2*p* becomes the shortest, images G2*p* (refer to FIG. 23 and the like) formed of second image light L2 are displayed at a nearest position as viewed from the user. Images G5*p* (refer to FIG. 23 and the like) formed of first image light L1 emitted from fifth region R5*p* are displayed at an intermediate position between the farthest position and the nearest position as viewed from the user.

Figure 23:
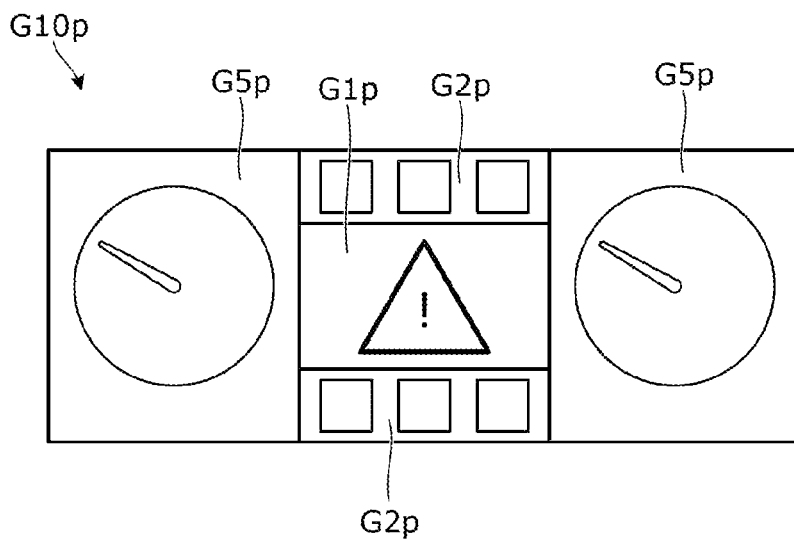
FIG. 23 is a plan view showing a first display mode according to Embodiment 15.
Figure 24:
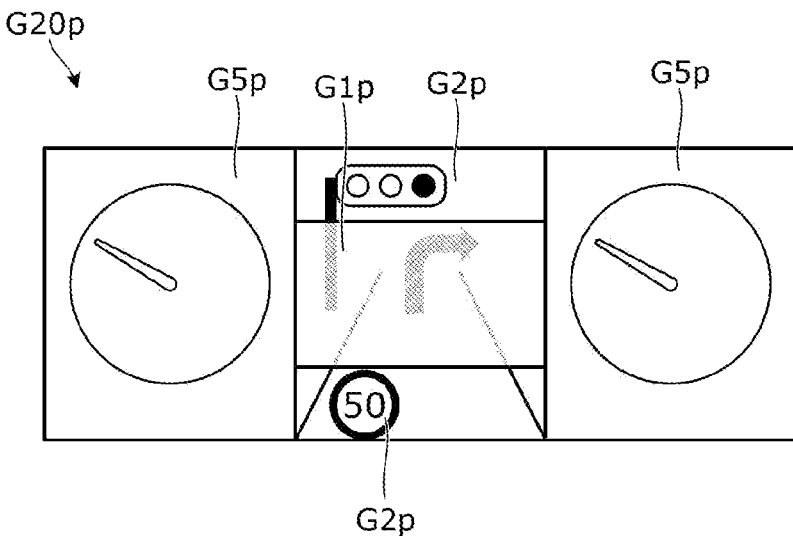
FIG. 24 is a plan view showing a second display mode according to Embodiment 15.

In display device 10P, a first display mode and a second display mode can be switchably displayed. FIG. 23 is a plan view showing first display mode G10*p* according to Embodiment 15. FIG. 24 is a plan view showing second display mode G20*p* according to Embodiment 15. In both first display mode G10*p* and second display mode G20*p*, image G1*p* and image G2*p* are disposed at center in the width direction and image G5*p* is disposed at both ends in the width direction. Images G2*p* are disposed so as to sandwich image G1*p* from above and below. Image G1*p* is disposed at a farthest position as viewed from the user, images G2*p* are disposed at a nearest position as viewed from the user, and images G5*p* are disposed at an intermediate position as viewed from the user.

As shown in FIG. 23, in first display mode G10*p*, image G1*p* mainly performs a warning display. A warning display refers to a display including a warning with respect to the user. Images G2*p* mainly perform an alert display. An alert display refers to a display including an alert with respect to the user. Images G5*p* mainly perform a meter display. A meter display refers to a display including instruments such as a speedometer and a tachometer.

As shown in FIG. 24, in second display mode G20*p*, image G1*p* mainly performs a navigation display. A navigation display is a display including map information, guidance information to a destination, or the like. Images G2*p* mainly perform a road information display. A road information display refers to a display including road conditions (including traffic lights and road signs) and traffic conditions. Images G5*p* mainly perform a meter display.

In this case, first display mode G10*p* and second display mode G20*p* are switched based on a predetermined condition. Specifically, the controller which controls display element 30 of first display unit 12*p* switches between first display mode G10*p* and second display mode G20*p* based on whether or not a predetermined condition has been satisfied. For example, the controller may switch between first display mode G10$p$ and second display mode G20$p$ when the user operates a switch for switching display. In addition, the controller may switch from second display mode G20$p$ to first display mode G10$p$ when the controller determines that a warning needs to be issued based on an output signal from various sensors included in vehicle 1. The controller may switch from first display mode G10$p$ to second display mode G20$p$ when the controller determines after switching to first display mode G10$p$ that a warning need not be issued.

As described above, since first image light L1 emitted from fifth region R5$p$ and having passed through second polarizing half mirror 16$p$ is reflected by first reflective mirror 14$p$ and further reflected by second polarizing half mirror 16$p$, first image light L1 emitted from fifth region R5$p$ has an optical path length that differs from both that of first image light L1 emitted from first region R1$p$ and that of second image light L2 emitted from second region R2$p$. Therefore, a wider variety of stereoscopic displays can be performed.

In addition, first image light L1 emitted from first region R1$p$ can be displayed at the farthest position, second image light L2 emitted from second region R2$p$ can be displayed at the nearest position, and first image light L1 emitted from fifth region R5$p$ can be displayed at the intermediate position.

In addition, since at least one of first display mode G10$p$ or second display mode G20$p$ can be displayed by display device 10P, a wider variety of expressions can be performed.

In addition, since first display mode G10$p$ and second display mode G20$p$ are switched based on a predetermined condition, a display mode in accordance with each condition can be adopted.

Variation in First Configuration

While Embodiments 1 to 15 are specific aspects of the display device including only the first configuration according to the present disclosure, various variations may be applied without deviating from the purport of the first configuration according to the present disclosure.

For example, in display surface 31 of display element 30, a plurality of first regions R1 and a plurality of second regions R2 may be finely arrayed in an alternating manner. Specifically, each of first regions R1 may have a width of at least one pixel and at most five pixels and each of second regions R2 may have a width of at least one pixel and at most five pixels. In this manner, since first region R1 and second region R2 which are alternately arranged each have a width of at least one pixel and at most five pixels, the entirety of the display image can be duplexed. As a result, a wide variety of image expressions can be performed.

In addition, in the embodiments described above, cases have been exemplified in which first region R1 that emits first image light L1 and second region R2 that emits second image light L2 are realized by stacking a retardation plate on display surface 31 of display element 30. However, even without stacking a retardation plate on the display surface, the display element itself may include a first region that emits the first image light and a second region that emits the second image light.

Embodiment 16

In recent years, stereoscopic display with a greater depth feel is in demand. Improving performance of a display device also includes enabling stereoscopic display with a greater depth feel. Display devices designed to perform stereoscopic display with a greater depth feel will be described in Embodiments 16 to 20.

Figure 25:
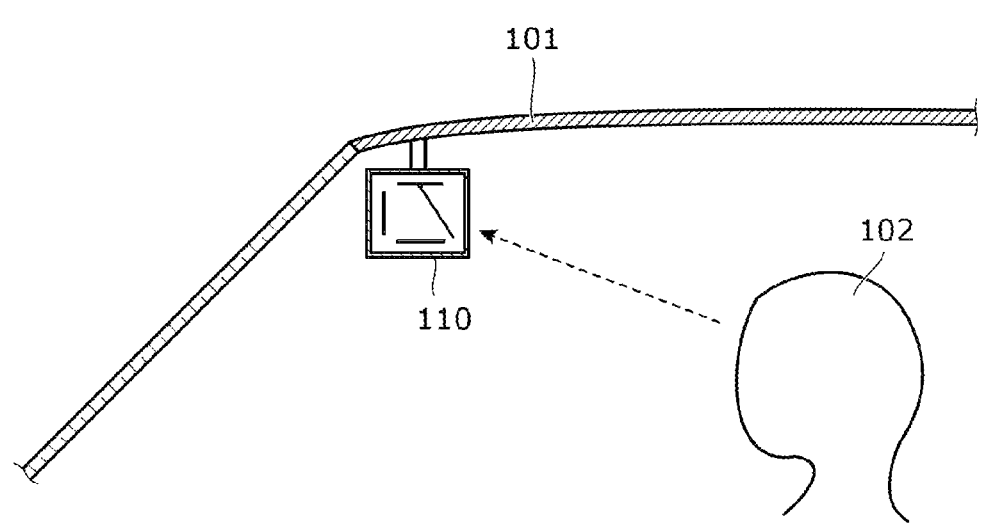
FIG. 25 is a schematic view showing a state where a display device according to Embodiment 16 is provided in a vehicle.

FIG. 25 is a schematic view showing a state where display device 110 according to Embodiment 16 is provided in vehicle 101. In FIG. 25, cross sections of vehicle 101 and enclosure 120 are shown.

As shown in FIG. 25, display device 110 is a device for displaying images. In the present embodiment, display device 110 is provided inside a cabin of vehicle 101. For example, display device 110 displays vehicle information related to vehicle 101. User 102 who is a driver of vehicle 101 can visually recognize the vehicle information by looking at display device 110 (refer to a dashed arrow in FIG. 25). Examples of vehicle information include a vehicle speed of vehicle 101, the total number of revolutions of an engine, a detection result of an object in proximity of vehicle 101, navigation information from a current position to a destination of vehicle 101, and information on an image taken by a camera for imaging the rear of vehicle 101. While FIG. 25 shows an example where display device 110 is disposed in the vicinity of an upper end of a windshield of vehicle 101, display device 110 is not limited to this position and, for example, display device 110 may be disposed in a portion of a dashboard where meters are disposed or on a center console.

Figure 26:
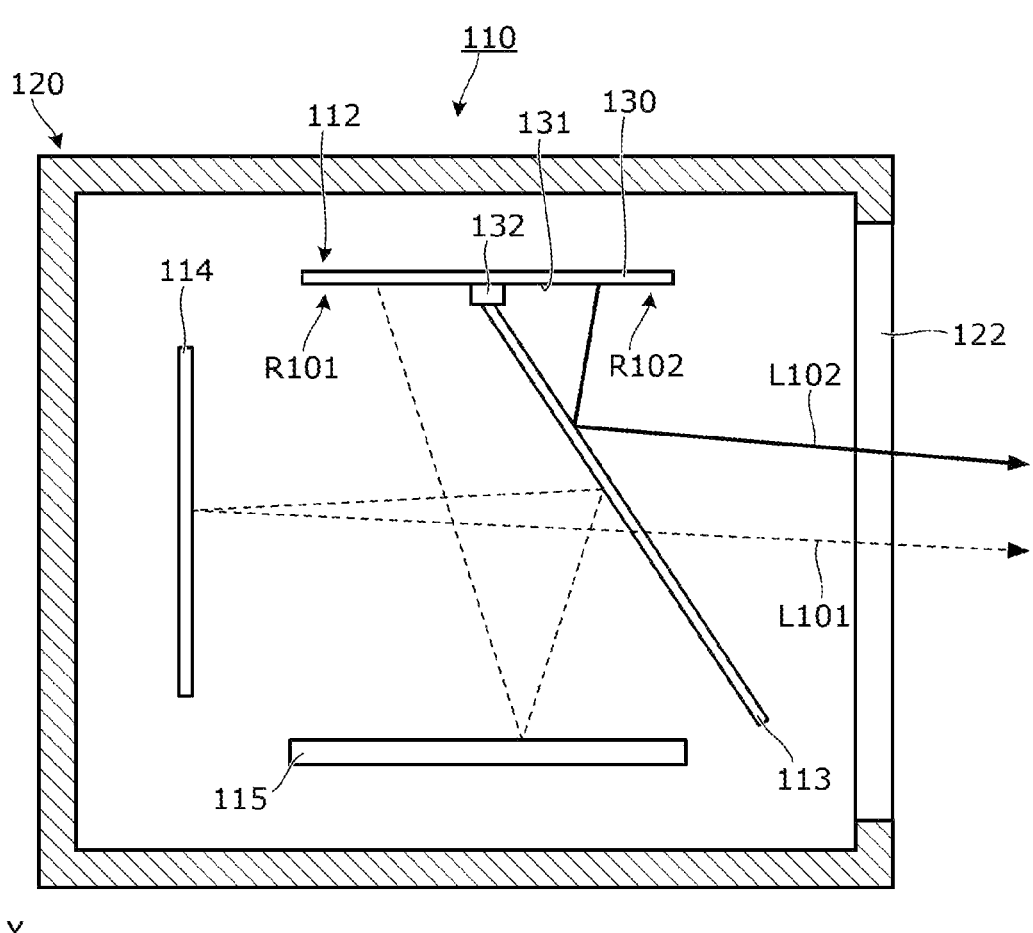
FIG. 26 is a schematic view showing a schematic configuration of the display device according to Embodiment 16.
Figure 26:
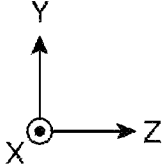

FIG. 26 is a schematic view showing a schematic configuration of display device 110 according to Embodiment 16. In FIG. 26, a cross section of enclosure 120 is shown. As shown in FIG. 26, display device 110 includes enclosure 120, second display unit 112, half mirror 113, third reflective mirror 114, and fourth reflective mirror 115.

Enclosure 120 houses second display unit 112, half mirror 113, third reflective mirror 114, and fourth reflective mirror 115. In the present embodiment, enclosure 120 is suspended from a ceiling of vehicle 101. Enclosure 120 includes emitter 122 for emitting light generated from second display unit 112 to the outside of enclosure 120. Emitter 122 is provided on a wall section in the positive Z-axis direction in enclosure 120. Emitter 122 is a through-hole which communicates an internal space and an external space of enclosure 120. A transparent plate for dust protection may be disposed in emitter 122. In enclosure 120, second display unit 112 is disposed in the vicinity of an inside surface (inside top surface) in the positive Y-axis direction. In enclosure 120, third reflective mirror 114 is disposed in the vicinity of an inside surface in the negative Z-axis direction. In enclosure 120, fourth reflective mirror 115 is disposed in the vicinity of an inside surface (inside bottom surface) in the negative Y-axis direction. In enclosure 120, half mirror 113 is disposed in a central part. Fourth reflective mirror 115, half mirror 113, and second display unit 112 are disposed side by side in this order from the negative Y-axis direction toward the positive Y-axis direction. Third reflective mirror 114, half mirror 113, and emitter 122 are disposed side by side in this order from the negative Z-axis direction toward the positive Z-axis direction.

Figure 27:
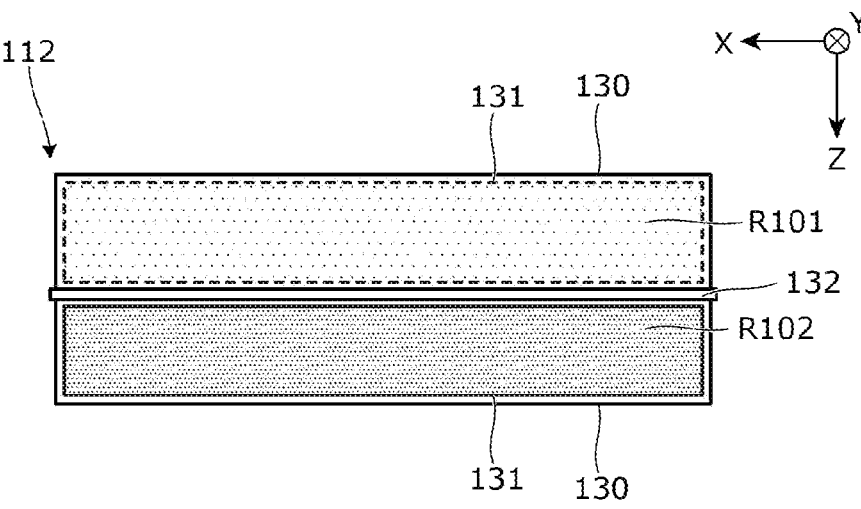
FIG. 27 is a plan view showing a second display unit according to Embodiment 16.

FIG. 27 is a plan view showing second display unit 112 according to Embodiment 16. As shown in FIGS. 26 and 27, second display unit 112 is disposed in an attitude along an XZ plane. Second display unit 112 has display element 130 including display surface 131. Display element 130 emits light representing an image from display surface 131. For example, display element 130 is realized by including an LCD (Liquid Crystal Display), an organic EL (Electroluminescent) display, a micro LED (Light Emitting Diode) display, or the like. Display element 130 is formed so that display surface 131 assumes a flat shape as a whole.

Light-shielding plate 132 is disposed in a central part in the Z-axis direction on display surface 131. Light-shielding plate 132 is continuously provided along an entire length in the X-axis direction in display surface 131. In display surface 131, a region more toward the negative Z-axis direction than light-shielding plate 132 is third region R101 and a region more toward the positive Z-axis direction than light-shielding plate 132 is fourth region R102. Third image light L101 is emitted from third region R101 and fourth image light L102 is emitted from fourth region R102. In FIG. 26, an optical path of third image light L101 is depicted by a dashed arrow and an optical path of fourth image light L102 is depicted by a bold arrow.

Light-shielding plate 132 has a width corresponding to a predetermined number of pixels (for example, several pixels to around a dozen pixels) including the boundary between third region R101 and fourth region R102. Due to light-shielding plate 132, third image light L101 and fourth image light L102 emitted from regions including the boundary can be shielded and a decline in image quality at the boundary can be inhibited. Other methods include a method of controlling display element 130 so that image light is not emitted from the boundary between third region R101 and fourth region R102.

Half mirror 113 is, for example, an optical member in which a metal film is deposited on a glass base material by vapor deposition. Half mirror 113 reflects light with a surface facing emitter 122 and reflects and transmits light with a surface on an opposite side. One end of half mirror 113 is disposed on light-shielding plate 132. In other words, one end of half mirror 113 is disposed on the boundary between third region R101 and fourth region R102. Half mirror 113 is disposed in an attitude in which fourth image light L102 emitted from second display unit 112 is reflected toward emitter 122. Therefore, another end of half mirror 113 is disposed more toward the positive Z-axis direction than the one end.

Third reflective mirror 114 is a plane mirror. Third reflective mirror 114 is disposed at a position opposing half mirror 113 in the negative Z-axis direction of half mirror 113. Third reflective mirror 114 is disposed in an attitude in which third image light L101 having been reflected by half mirror 113 is reflected and the reflected light passes through half mirror 113 and is directed toward emitter 122. In other words, third reflective mirror 114 is disposed on a reflective optical path of third image light L101 having been reflected by half mirror 113.

Fourth reflective mirror 115 is a plane mirror. Fourth reflective mirror 115 is disposed at a position opposing half mirror 113 in the negative Y-axis direction of half mirror 113. Fourth reflective mirror 115 is disposed in an attitude in which third image light L101 from second display unit 112 is reflected and the reflected light is directed toward half mirror 113.

Since half mirror 113, third reflective mirror 114, and fourth reflective mirror 115 are disposed as described above, third image light L101 and fourth image light L102 are directed toward emitter 122 along optical paths described below. Third image light L101 emitted from second display unit 112 is reflected by fourth reflective mirror 115 and reflected by half mirror 113, and subsequently reflected by third reflective mirror 114, passes through half mirror 113, and directed toward emitter 122. On the other hand, fourth image light L102 emitted from second display unit 112 is reflected by half mirror 113 and directed toward emitter 122. As described above, half mirror 113 is disposed in an attitude which transmits third image light L101 from third reflective mirror 114 and which directs third image light L101 and fourth image light L102 in the same direction when reflecting fourth image light L102. In this case, third image light L101 is positioned below (in the negative Y-axis direction) fourth image light L102 when third image light L101 and fourth image light L102 pass through emitter 122.

Figure 28:
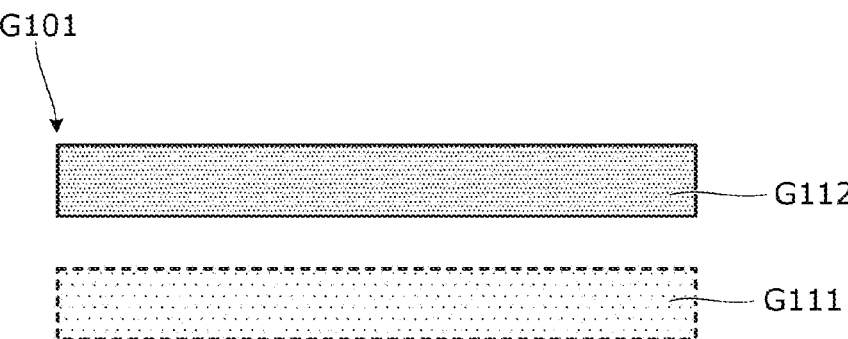
FIG. 28 is a plan view showing a display image displayed by the display device according to Embodiment 16.
Figure 28:
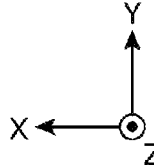

FIG. 28 is a plan view showing display image G101 displayed by display device 110 according to Embodiment 16. FIG. 28 represents a state as viewed from user 102. As shown in FIG. 28, in display image G101 from display device 110, image G111 formed of third image light L101 and image G112 formed of fourth image light L102 are arranged side by side in the Y-axis direction (vertical direction) so that image G111 is at a lower position. At this point, since the optical path length of fourth image light L102 is longer than the optical path length of third image light L101, image G111 is displayed deeper (negative Z-axis direction) than image G112 as viewed from user 102.

As described above, with display device 110 according to the present embodiment, third image light L101 having passed through half mirror 113 and fourth image light L102 having been reflected by half mirror 113 can be directed in the same direction. In this case, third image light L101 passes through half mirror 113 by being once reflected by half mirror 113 and then further reflected by third reflective mirror 114. On the other hand, fourth image light L102 is reflected by half mirror 113 without being reflected by third reflective mirror 114. In this manner, since an optical path length of third image light L101 becomes longer than an optical path length of fourth image light L102, image G111 formed of third image light L101 and image G112 formed of fourth image light L102 can be displayed while being significantly separated from each other in a depth direction. Therefore, a stereoscopic display with a large depth feel can be performed.

In this manner, in order to enable stereoscopic display with a large depth feel, display device 110 has a second configuration which includes second display unit 112, half mirror 113, and third reflective mirror 114.

Since third image light L101 is reflected by fourth reflective mirror 115 before reaching half mirror 113, the optical path length of third image light L101 can be made even longer. As a result, image G111 formed of third image light L101 and image G112 formed of fourth image light L102 can be displayed while being significantly separated from each other in a depth direction.

In addition, since an optical path of third image light L101 becomes folded due to third image light L101 being reflected three times after being emitted from second display unit 112 and before reaching emitter 122, stereoscopic display can be effectively enabled without increasing a depth (width in the Z-axis direction) of enclosure 120 and downsizing of enclosure 120 can be achieved.

In this case, there is a possibility that polarized light is not shaped and image quality may decline at a boundary between third region R101 and fourth region R102. In the present aspect, since third image light L101 and fourth image light L102 are not emitted from the boundary between third region R101 and fourth region R102, a decline in image quality can be inhibited.

Embodiment 17

Display device 110A according to Embodiment 17 will be described. Note that in the following description, the same portions as in Embodiment 16 will be denoted by the same reference signs and descriptions thereof may be omitted.

Figure 29:
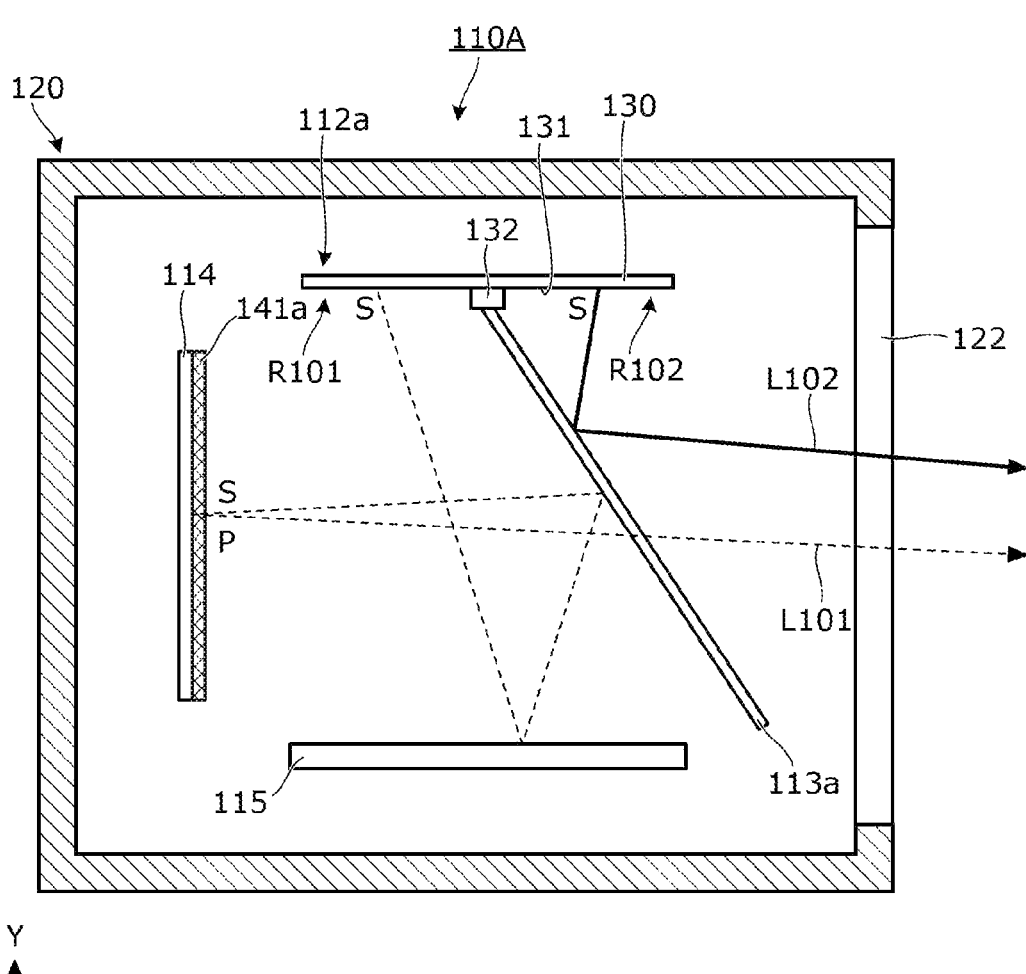
FIG. 29 is a schematic view showing a schematic configuration of a display device according to Embodiment 17.
Figure 29:
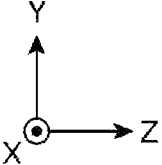

FIG. 29 is a schematic view showing a schematic configuration of display device 110A according to Embodiment 17. FIG. 29 is a diagram corresponding to FIG. 26. While a case where linearly polarized light that is S polarized light is emitted from display surface 131 of display element 130 will be exemplified in second display unit 112*a* included in Embodiment 17, linearly polarized light that is P polarized light may be emitted from display surface 131 instead. In the following description, linearly polarized light that is S polarized light may be simply referred to as "S polarized light" and linearly polarized light that is P polarized light may be simply referred to as "P polarized light". In FIG. 29, each beam of image light is denoted by "S" when the image light is S polarized light and denoted by "P" when the image light is P polarized light. A similar description will apply to the other drawings.

Half mirror 113*a* included in Embodiment 17 is a polarizing half mirror which reflects S polarized light and transmits P polarized light. Specifically, half mirror 113*a* is structured such that a reflective polarizing plate is stacked on a flat plate-shaped glass base material. Fourth image light L102 that is S polarized light emitted from second display unit 112*a* is reflected by half mirror 113*a* and directed toward emitter 122. Third image light L101 that is S polarized light emitted from second display unit 112*a* is reflected by fourth reflective mirror 115, subsequently reflected by half mirror 113*a*, and directed toward third reflective mirror 114.

As shown in FIG. 29, fourth λ/4 plate 141*a* is stacked on an entire surface of third reflective mirror 114. Fourth λ/4 plate 141*a* is a λ/4 retardation plate for converting linearly polarized light incident to fourth λ/4 plate 141*a* into circularly polarized light and for converting circularly polarized light incident to fourth λ/4 plate 141*a* into linearly polarized light. In other words, third image light L101 having been reflected by half mirror 113*a* is incident to fourth λ/4 plate 141*a* and converted into circularly polarized light, subsequently reflected by third reflective mirror 114, and once again incident to fourth λ/4 plate 141*a* and converted into linearly polarized light. In this manner, third image light L101 acquires a phase difference of ½ by passing through fourth λ/4 plate 141*a* twice. Specifically, third image light L101 of S polarized light having been reflected by half mirror 113*a* is converted into P polarized light by passing through fourth λ/4 plate 141*a* twice. Since third image light L101 has been converted into P polarized light, third image light L101 can pass through half mirror 113*a*. Third image light L101 having passed through half mirror 113*a* is emitted from emitter 122.

In this manner, since fourth λ/4 plate 141*a* is disposed between third reflective mirror 114 and half mirror 113*a* (polarizing half mirror), third image light L101 reflected by half mirror 113*a* passes through fourth λ/4 plate 141*a* before being reflected by third reflective mirror 114 and also passes through fourth λ/4 plate 141*a* after being reflected by third reflective mirror 114. In other words, third image light L101 becomes shifted by half a phase by passing through fourth λ/4 plate 141*a* twice. In this case, by using, as half mirror 113*a*, the polarizing half mirror which reflects third image light L101 before being shifted by half a phase and which transmits the third image light after being shifted by half a phase, escape of third image light L101 when being reflected by half mirror 113*a* can be inhibited. Accordingly, a decline in an amount of light attributable to half mirror 113*a* can be inhibited. While a case where fourth λ/4 plate 141*a* is stacked on third reflective mirror 114 is exemplified in the present embodiment, the fourth λ/4 plate may be separated from the third reflective mirror. In this case, it suffices so long as the fourth λ/4 plate is disposed between the third reflective mirror and the half mirror.

Since third image light L101 is reflected by fourth reflective mirror 115 before reaching half mirror 113*a*, the optical path length of third image light L101 can be made even longer. As a result, image G111 formed of third image light L101 and image G112 formed of fourth image light L102 can be displayed while being significantly separated from each other in a depth direction.

Embodiment 18

Display device 110B according to Embodiment 18 will be described. Note that in the following description, the same portions as in Embodiment 17 will be denoted by the same reference signs and descriptions thereof may be omitted.

Figure 30:
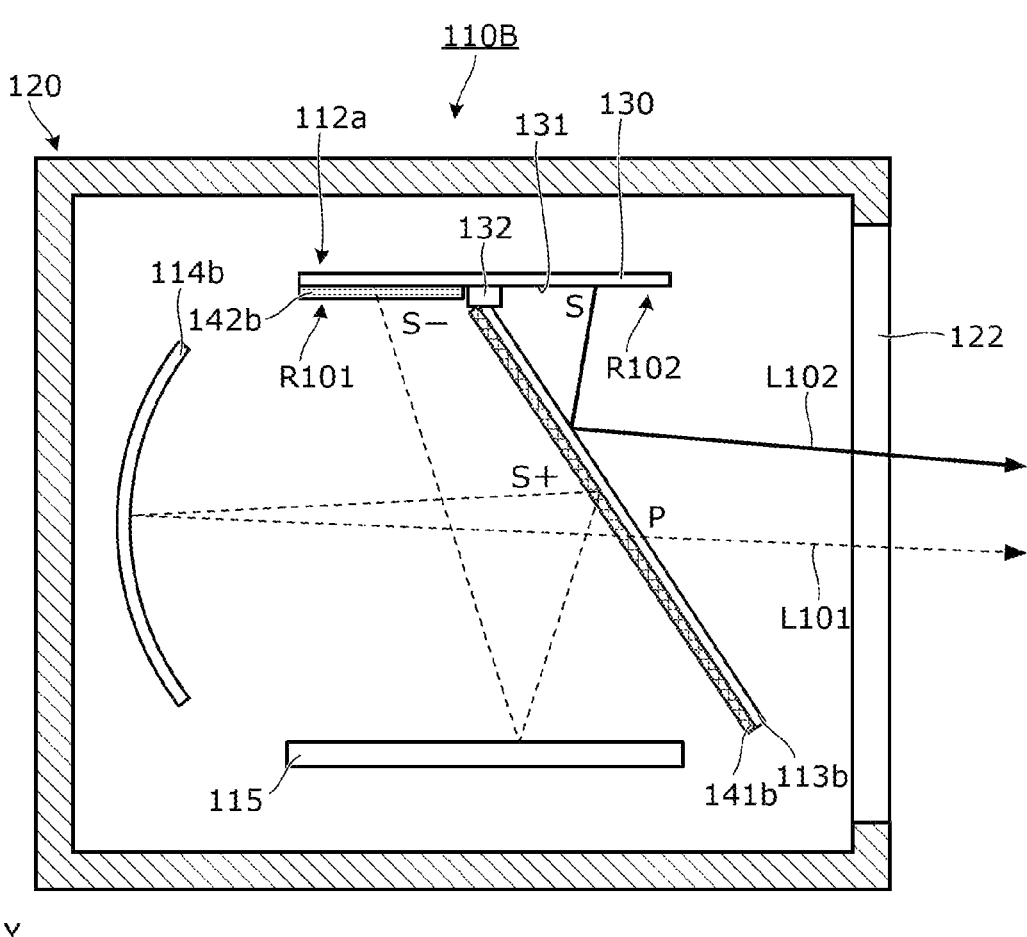
FIG. 30 is a schematic view showing a schematic configuration of a display device according to Embodiment 18.
Figure 30:
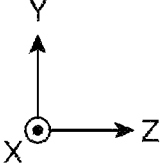

FIG. 30 is a schematic view showing a schematic configuration of display device 110B according to Embodiment 18. FIG. 30 is a diagram corresponding to FIG. 29. As shown in FIG. 30, in display device 110B, while fourth region R102 in display surface 131 is exposed, fifth λ/4 plate 142*b* is stacked on third region R101. Fifth λ/4 plate 142*b* is a λ/4 retardation plate for converting linearly polarized light incident to fifth λ/4 plate 142*b* into circularly polarized light and for converting circularly polarized light incident to fifth λ/4 plate 142*b* into linearly polarized light.

Third reflective mirror 114*b* is a concave mirror. Note that the third reflective mirror may be a convex mirror. The convex mirror and the concave mirror may be a spherical surface or a free curved surface.

A retardation plate is not stacked on a surface opposing emitter 122 in half mirror 113*b* and the surface is exposed. On the other hand, fourth λ/4 plate 141*b* is stacked on a surface opposing third reflective mirror 114*b* in half mirror 113*b*. In this manner, fourth λ/4 plate 141*b* is disposed between third reflective mirror 114*b* and half mirror 113*b*.

In this case, fourth λ/4 plate 141*b* differs from fifth λ/4 plate 142*b* in an orientation of circularly polarized light. For example, the orientation of circularly polarized light of fourth λ/4 plate 141*b* is counterclockwise while the orientation of circularly polarized light of fifth λ/4 plate 142*b* is clockwise. Therefore, fourth λ/4 plate 141*b* is a +λ/4 plate and fifth λ/4 plate 142*b* is a −λ/4 plate. Hereinafter, S polarized light converted into clockwise circularly polarized light will be referred to as S+ polarized light and S polarized light converted into counterclockwise circularly polarized light will be referred to as S− polarized light. In a similar manner, P polarized light converted into clockwise circularly polarized light will be referred to as P+ polarized light and P polarized light converted into counterclockwise circularly polarized light will be referred to as P−polarized light. Note that S+ polarized light and P−polarized light are the same and S− polarized light and P+ polarized light are the same.

Third image light L101 formed of S polarized light emitted from third region R101 of second display unit 112*a* passes through fifth λ/4 plate 142*b* and is converted into S− polarized light. Third image light L101 having become S− polarized light is reflected by fourth reflective mirror 115. Third image light L101 having been reflected by fourth reflective mirror 115 passes through fourth λ/4 plate 141*b*. Accordingly, since fourth λ/4 plate 141*b* is a +λ/4 plate, the incident third image light L101 that is S− polarized light is converted into S polarized light. As a result, third image light L101 is reflected by half mirror 113*b*. Third image light L101 having been reflected by half mirror 113*b* is converted into S+ polarized light by once again passing through fourth λ/4 plate 141b and is reflected by third reflective mirror 114b. Third image light L101 having been reflected by third reflective mirror 114b is converted into P polarized light by once again passing through fourth λ/4 plate 141b, passes through half mirror 113b, and is directed toward emitter 122.

Figure 31:
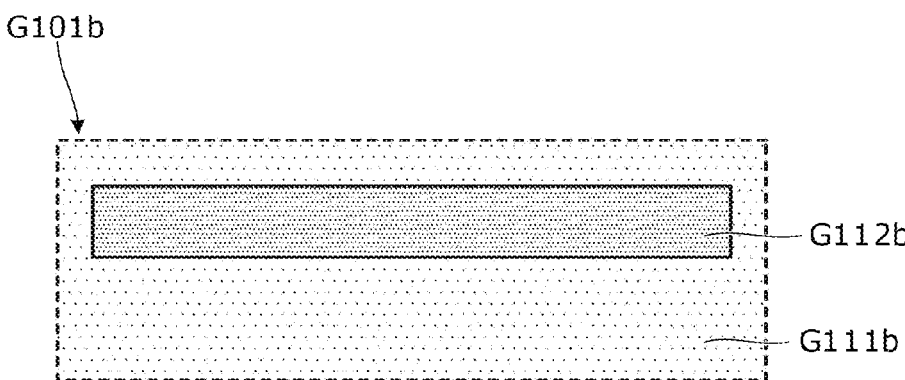
FIG. 31 is a plan view showing a display image displayed by the display device according to Embodiment 18.
Figure 31:
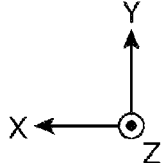

FIG. 31 is a plan view showing display image G101b displayed by display device 110B according to Embodiment 18. FIG. 31 is a diagram corresponding to FIG. 28. As described above, since third reflective mirror 114b is a concave mirror, an image range of third image light L101 is enlarged by being reflected by third reflective mirror 114b. In other words, as shown in FIG. 31, in display image G101b from display device 110B, image G111b formed of third image light L101 is enlarged and image G112b formed of fourth image light L102 is to be included in image G111b.

In this manner, since third reflective mirror 114b is a concave mirror, an image range formed by third image light L101 can be enlarged. As a result, a wide variety of image expressions can be performed. Since it is difficult to stack a retardation plate on a surface of a concave mirror or a convex mirror, a retardation plate can be readily manufactured by stacking fourth λ/4 plate 141b on a surface opposing third reflective mirror 114b of half mirror 113b.

Embodiment 19

Display device 110C according to Embodiment 19 will be described. Note that in the following description, the same portions as in Embodiment 18 will be denoted by the same reference signs and descriptions thereof may be omitted.

Figure 32:
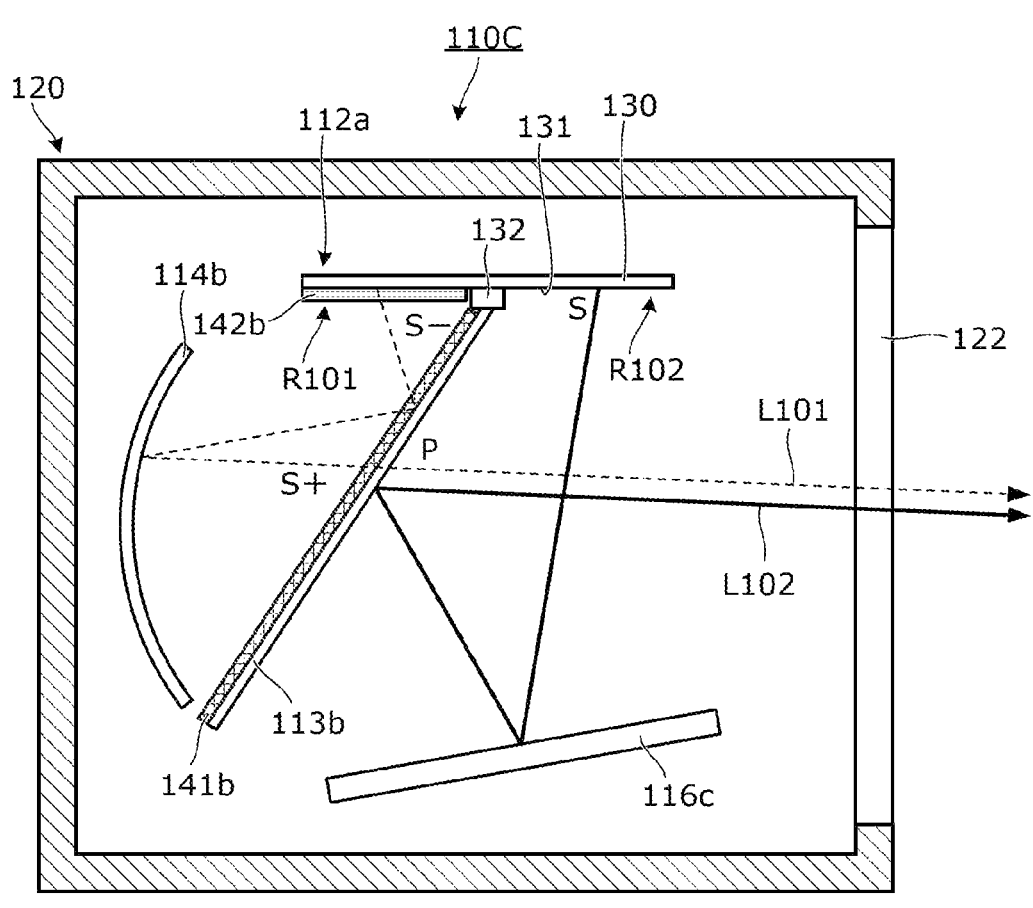
FIG. 32 is a schematic view showing a schematic configuration of a display device according to Embodiment 19.
Figure 32:
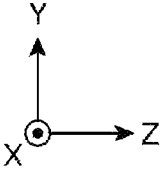

FIG. 32 is a schematic view showing a schematic configuration of display device 110C according to Embodiment 19. FIG. 32 is a diagram corresponding to FIG. 30. As shown in FIG. 32, display device 110C is provided with fifth reflective mirror 116c which reflects fourth image light L102 until fourth image light L102 is reflected by half mirror 113b.

Specifically, another end of half mirror 113b is disposed more toward the negative Z-axis direction than the one end of half mirror 113b. Fifth reflective mirror 116c is a plane mirror and is disposed at a position opposing fourth region R102 in the Y-axis direction. In addition, fourth reflective mirror 115 has been omitted as compared to FIG. 30.

Third image light L101 formed of S polarized light emitted from third region R101 of second display unit 112a passes through fifth λ/4 plate 142b and is converted into S− polarized light. Third image light L101 having become S− polarized light passes through fourth λ/4 plate 141b. Accordingly, since third image light L101 is converted into S polarized light, third image light L101 is reflected by half mirror 113b. Third image light L101 having been reflected by half mirror 113b is converted into S+ polarized light by once again passing through fourth λ/4 plate 141b and is reflected by third reflective mirror 114b. Third image light L101 having been reflected by third reflective mirror 114b is converted into P polarized light by once again passing through fourth λ/4 plate 141b, passes through half mirror 113b, and is directed toward emitter 122.

On the other hand, fourth image light L102 formed of S polarized light emitted from fourth region R102 of second display unit 112a is reflected by fifth reflective mirror 116c, subsequently reflected by half mirror 113b, and is directed toward emitter 122.

In this manner, since fourth image light L102 is reflected by fifth reflective mirror 116c before being reflected by half mirror 113b, the optical path length of fourth image light L102 can be made longer. Accordingly, a focal point can be set at a distant position even in fourth image light L102 and an image formed of fourth image light L102 can be made more readily visible.

Embodiment 20

Display device 110D according to Embodiment 20 will be described. Note that in the following description, the same portions as in Embodiment 17 will be denoted by the same reference signs and descriptions thereof may be omitted.

Figure 33:
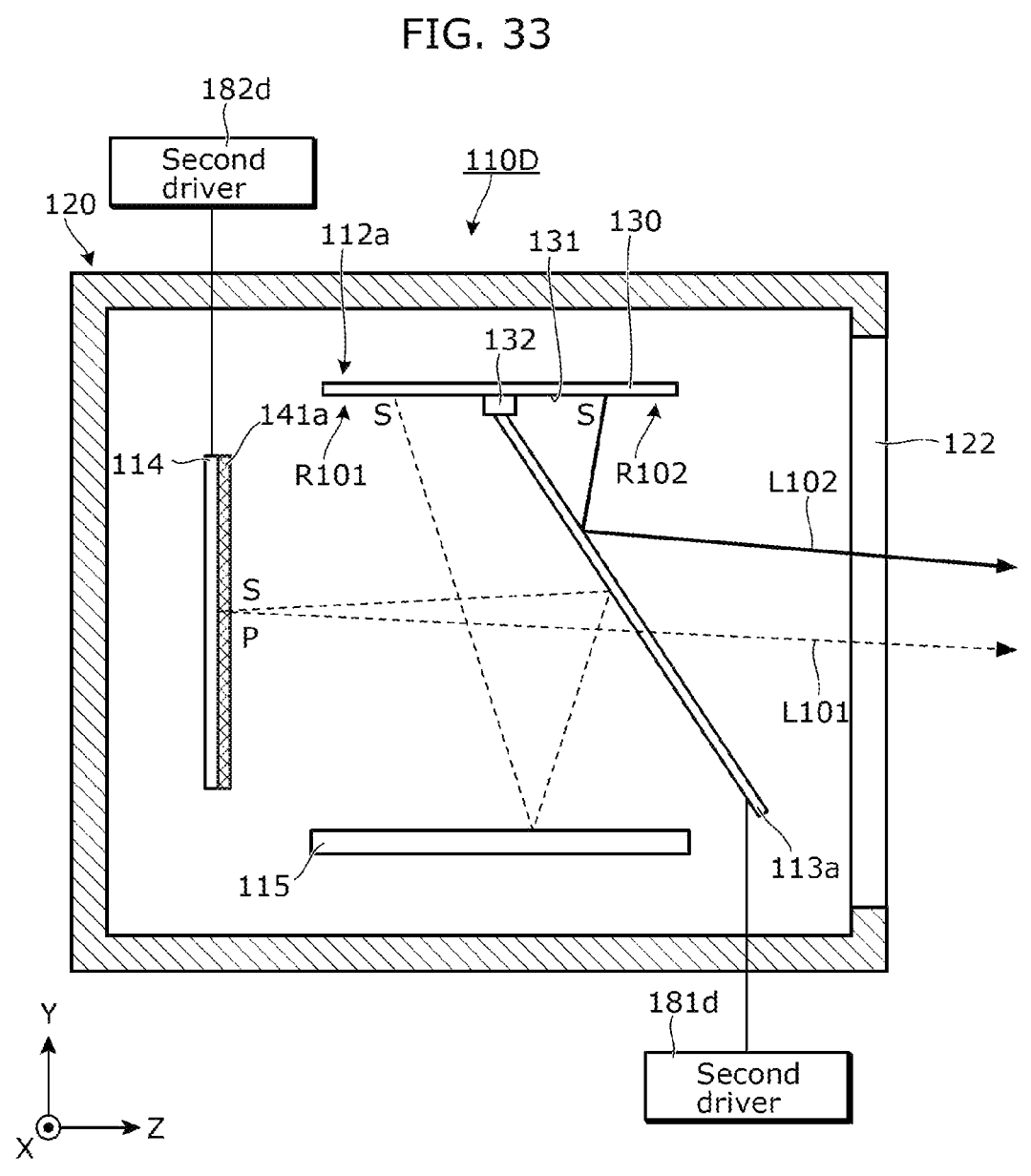

FIG. 33 is a schematic view showing a schematic configuration of display device 110D according to Embodiment 20. FIG. 33 is a diagram corresponding to FIG. 29. As shown in FIG. 33, display device 110D includes second driver 181d and second driver 182d.

Second driver 181d is an example of the second driver which operates half mirror 113a. For example, second driver 181d includes a drive source such as a motor and a power-transmitting mechanism which operates half mirror 113a using power from the drive source. Second driver 181d moves half mirror 113a based on the power from the drive source. At this point, a state where one end of half mirror 113a is disposed on the boundary between third region R101 and fourth region R102 is maintained. In other words, half mirror 113a performs a rotating operation around the one end. Accordingly, orientations of optical paths of third image light L101 and fourth image light L102 which are to be reflected by half mirror 113a can be adjusted.

Second driver 182d is an example of the second driver which operates third reflective mirror 114. For example, second driver 182d includes a drive source such as a motor and a power-transmitting mechanism which operates third reflective mirror 114 using power from the drive source. Based on the power of the drive source, second driver 182d moves third reflective mirror 114 (for example, a slide operation in the Z-axis direction) or changes an attitude of third reflective mirror 114 (for example, a rotation operation in the YZ plane). Accordingly, an orientation of the optical path or an optical path length of third image light L101 which is to be reflected by third reflective mirror 114 can be adjusted. Note that fourth λ/4 plate 141a operates so as to follow third reflective mirror 114.

Accordingly, half mirror 113a and third reflective mirror 114 can be operated by second driver 181d and second driver 182d. As a result, a display position or a viewing distance of image light having been reflected by half mirror 113a can be adjusted by operating half mirror 113a. In a similar manner, a display position or a viewing distance of image light having been reflected by third reflective mirror 114 can be adjusted by operating third reflective mirror 114.

Accordingly, an image display in accordance with a difference in physique and preferences of a user can be performed. Note that it suffices so long as at least one of second driver 181d or second driver 182d is provided. A drive source which operates the fourth reflective mirror and the fifth reflective mirror may be provided.

Embodiment 21

In recent years, the realization of higher dramatic impact is in demand. Improving performance of a display device also includes enabling higher dramatic impact. Display devices designed to enable higher dramatic impact will be described in Embodiments 21 to 38.

Figure 34:
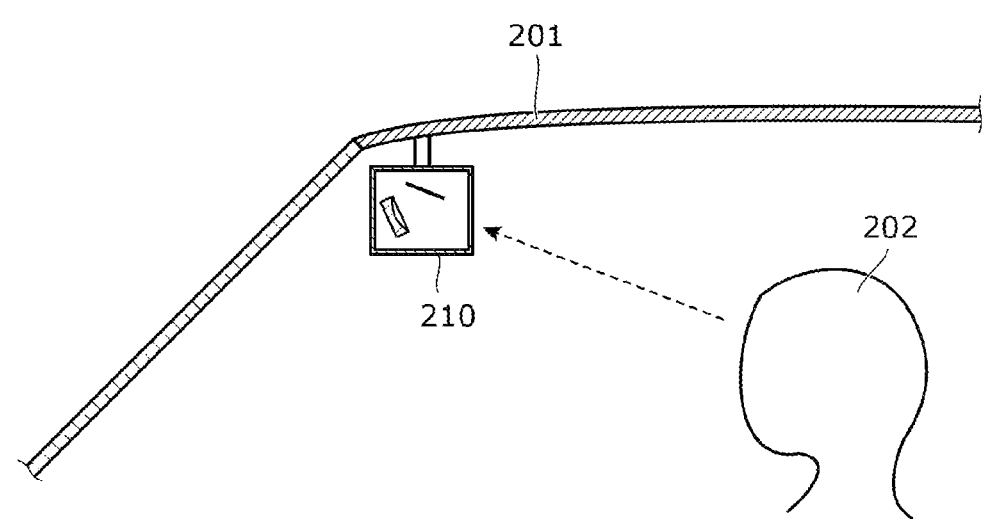
FIG. 34 is a schematic view showing a state where a display device according to Embodiment 21 is provided in a vehicle.

FIG. 34 is a schematic view showing a state where display device 210 according to Embodiment 21 is provided in vehicle 201. In FIG. 34, cross sections of vehicle 201 and enclosure 220 are shown.

As shown in FIG. 34, display device 210 is a device for displaying images. In the present embodiment, display device 210 is provided inside a cabin of vehicle 201. For example, display device 210 displays vehicle information related to vehicle 201. User 202 who is a driver of vehicle 201 can visually recognize the vehicle information by looking at display device 210 (refer to a dashed arrow in FIG. 34). Examples of vehicle information include a vehicle speed of vehicle 201, the total number of revolutions of an engine, a detection result of an object in proximity of vehicle 201, navigation information from a current position to a destination of vehicle 201, and information on an image taken by a camera for imaging the rear of vehicle 201. While FIG. 34 shows an example where display device 210 is disposed in a vicinity of an upper end of a windshield of vehicle 201, display device 210 is not limited to this position and, for example, display device 210 may be disposed in a portion of a dashboard where meters are disposed or on a center console.

Figure 35:
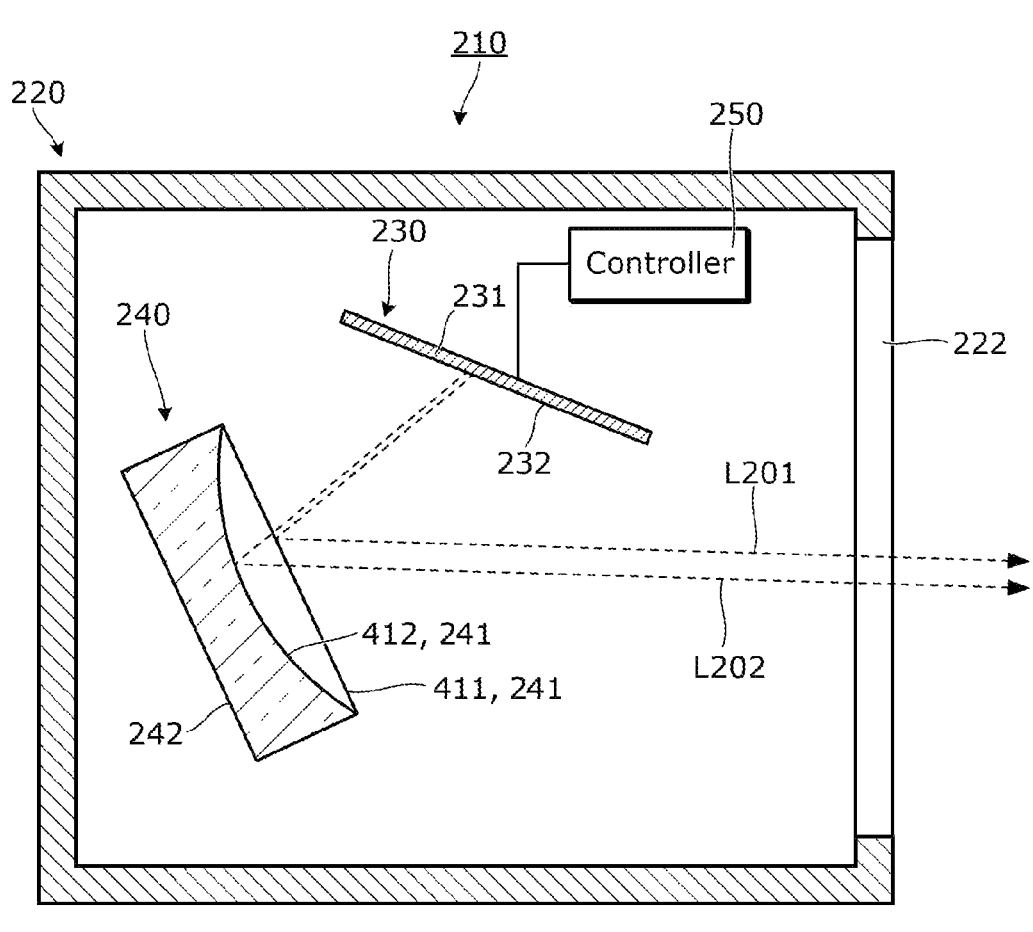
FIG. 35 is a schematic view showing a schematic configuration of a display device according to Embodiment 21.
Figure 35:
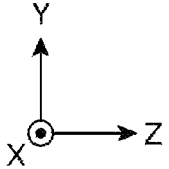

FIG. 35 is a schematic view showing a schematic configuration of display device 210 according to Embodiment 21. In FIG. 35, a cross section of enclosure 220 is shown. As shown in FIG. 35, display device 210 includes enclosure 220, display unit 230, first reflector 240, and controller 250.

Enclosure 220 houses display unit 230, first reflector 240, and controller 250. In the present embodiment, enclosure 220 is suspended from a ceiling of vehicle 201. Enclosure 220 includes emitter 222 for emitting light generated from display unit 230 to the outside of enclosure 220. Emitter 222 is provided on a wall section in the positive Z-axis direction in enclosure 220. Emitter 222 is a through-hole which communicates an internal space and an external space of enclosure 220. A transparent plate for dust protection may be disposed in emitter 222. In enclosure 220, display unit 230 is disposed in a vicinity of an inside surface (inside top surface) in the positive Y-axis direction. In enclosure 220, first reflector 240 is disposed in a vicinity of an inside surface in the negative Z-axis direction.

Display unit 230 has second display element 231 including display surface 232. Second display element 231 emits image light (fifth image light) that forms a display image from display surface 232. For example, second display element 231 is realized by including an LCD (Liquid Crystal Display), an organic EL (Electro Luminescence) display, a micro LED (Light Emitting Diode) display, or the like. Second display element 231 is formed so that display surface 232 assumes a flat shape as a whole. Second display element 231 is formed in a rectangular shape in a plan view and is disposed so that long sides are aligned in the X-axis direction. Second display element 231 is disposed in an attitude which causes one short side to be more toward the positive Z-axis direction and the negative Y-axis direction than the other short side.

First reflector 240 is an optical member which reflects, toward emitter 222, image light having been emitted from second display element 231. For example, first reflector 240 is formed of a translucent material (a translucent resin or glass) or the like. First reflector 240 is formed in a flat rectangular parallelepiped shape that is elongated in the X-axis direction. First reflector 240 is disposed in an attitude in which a thickness direction of first reflector 240 is tilted with respect to the XZ plane. In first main surface 241 which faces second display element 231 in first reflector 240, an upper side (a long side in the positive Y-axis direction) is disposed more toward the negative Z-axis direction than a lower side (a long side in the negative Y-axis direction).

Figure 36:
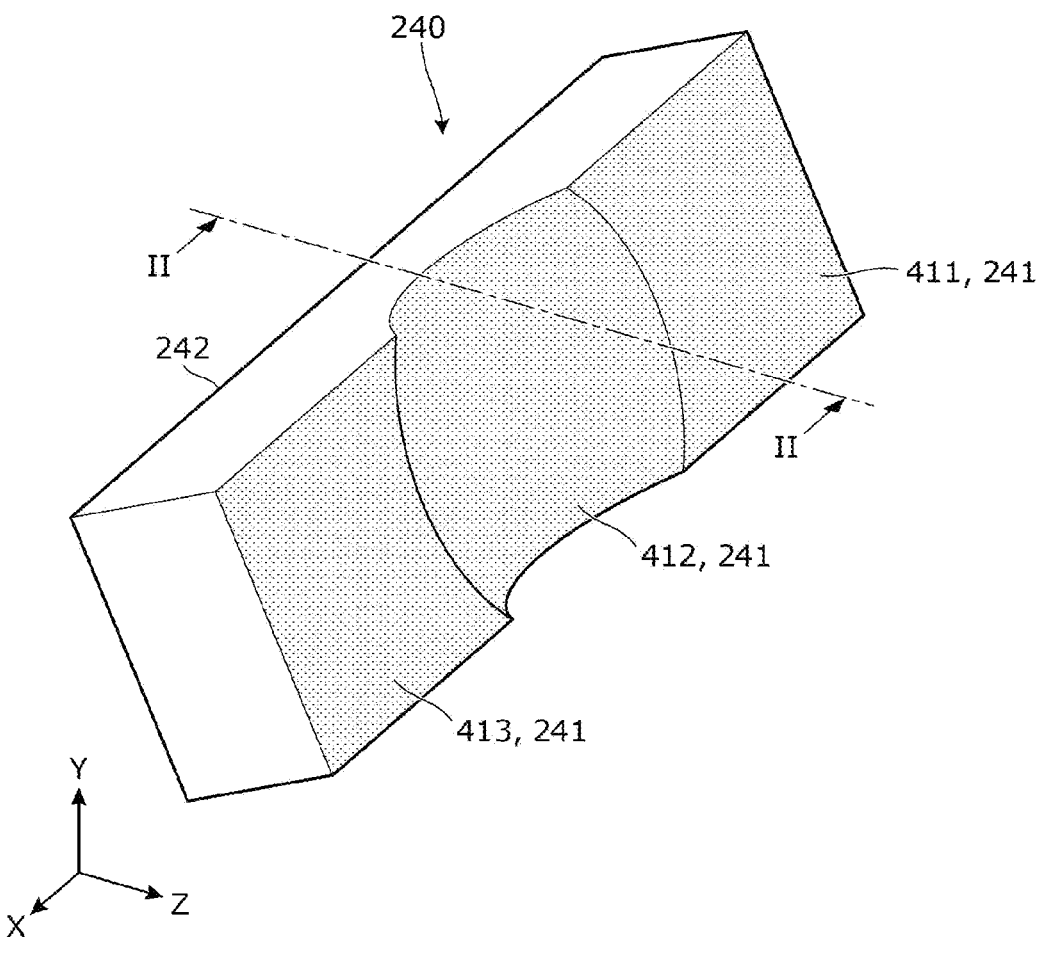
FIG. 36 is a perspective view showing a first reflector according to Embodiment 21.

FIG. 36 is a perspective view showing first reflector 240 according to Embodiment 21. Note that FIG. 35 shows a cross section of first reflector 240 representing a cross sectional view including line II-II in FIG. 36. As shown in FIG. 36, a flat surface and a concave curved surface are formed as first main surface 241 of first reflector 240 while entire second main surface 242 opposite to first main surface 241 is formed as a flat surface.

Specifically, first main surface 241 of first reflector 240 is divided into three parts in the X-axis direction which constitute first reflective surface 411, second reflective surface 412, and third reflective surface 413 from the negative X-axis direction toward the positive X-axis direction. A reflective film for reflecting light is stacked on first reflective surface 411, second reflective surface 412, and third reflective surface 413. In this manner, first reflector 240 can be described as a support body which collectively supports all of a plurality of reflective surfaces. Note that in the perspective views to be described hereinafter, a surface that reflects light will be depicted with hatchings as shown in FIG. 36.

First reflective surface 411 and third reflective surface 413 are flat surfaces and are disposed to be flush with each other. Second reflective surface 412 is a concave curved surface that is depressed inward. Second reflective surface 412 is a spherical surface or a free curved surface. A display image formed of image light (referred to as seventh image light L202 (refer to FIG. 35)) reflected by second reflective surface 412 is to be enlarged larger than, for example, a display image formed of image light (referred to as sixth image light L201 (refer to FIG. 35)) reflected by first reflective surface 411. As shown in FIG. 35, since second reflective surface 412 is a concave curved surface, second reflective surface 412 is disposed at a position farther away from display surface 232 than first reflective surface 411 or third reflective surface 413. In other words, a display image formed of seventh image light L202 has a longer viewing distance than a display image formed of sixth image light L201.

Controller 250 is electrically connected to second display element 231 and controls second display element 231. Specifically, controller 250 includes a CPU, a RAM, a ROM, and the like and executes various steps of processing by having the CPU deploy a program in the ROM onto the RAM and execute the program.

Figure 37:
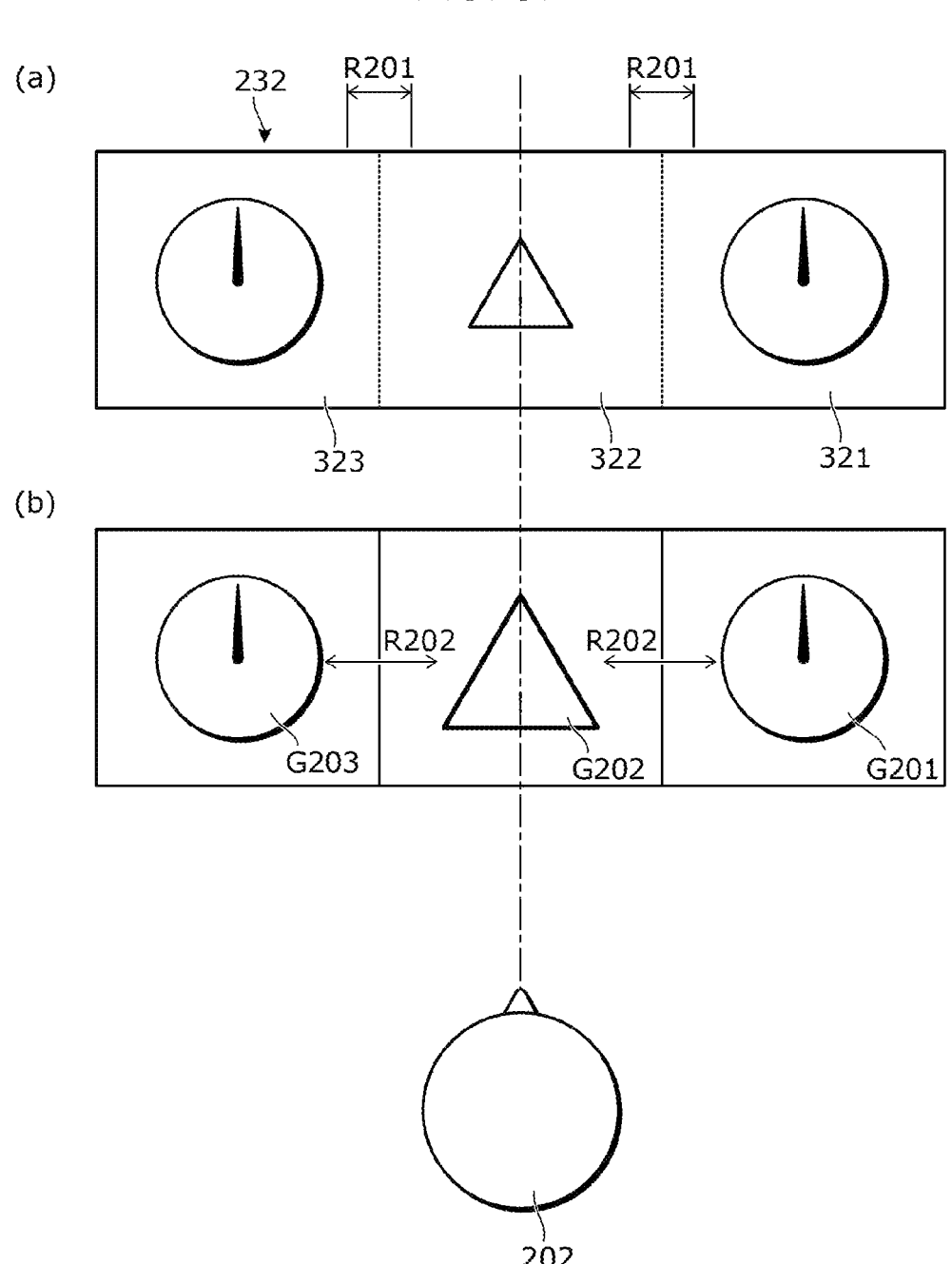
FIG. 37 is an explanatory diagram showing a display example of the display device according to Embodiment 21.

FIG. 37 is an explanatory diagram showing a display example of display device 210 according to Embodiment 21. In FIG. 37, (a) shows display content on display surface 232. In FIG. 37, (b) shows user 202 and display images G201, G202, and G203 as viewed from user 202. As shown in (a) in FIG. 37, controller 250 divides, in advance, display surface 232 into three equal parts in a longitudinal direction (X-axis direction) and executes different control for each of regions 321, 322, and 323. In this case, region 321 corresponds to first reflective surface 411, region 322 corresponds to second reflective surface 412, and region 323 corresponds to third reflective surface 413. Therefore, display content displayed in region 322 forms enlarged display image G202 as image light of the display content is reflected by second reflective surface 412.

Controller 250 determines whether or not to invert display content in second display element 231 according to a total number times image light is reflected. In the present embodiment, since image light is reflected only once by first reflector 240, controller 250 determines that display content is to be displayed by inverting the display content from a normal state. The display image changes to a normal state by having first reflector 240 reflect the image light once. In other words, controller 250 determines that display content is to be inverted when the total number of times image light is reflected is an odd number and determines that display content is not to be inverted when the total number of times image light is reflected is an even number.

Display based on control by controller 250 is performed in each of regions 321, 322, and 323 and image light based on the display is emitted from each of regions 321, 322, and 323. The image light emitted from each of regions 321, 322, and 323 is reflected by each reflective surface (first reflective surface 411, second reflective surface 412, or third reflective surface 413) and becomes three display images G201, G202, and G203 as shown in (b) in FIG. 37. In this manner, since the plurality of display images G201, G202, and G203 are arranged side by side in the horizontal direction as viewed from user 202. Since the plurality of display images G201, G202, and G203 are side by side in the horizontal direction as viewed from user 202, the superposition of display images G201, G202, and G203 can be made less likely to change even if a height of an eye line of user 202 changes.

Controller 250 adopts display content in which display is not performed only in certain range R201 in boundaries of respective regions 321, 322, and 323. Accordingly, at least predetermined spacing R202 is provided between adjacent display images G201 and G202 (or display images G202 and G203).

Figure 38:
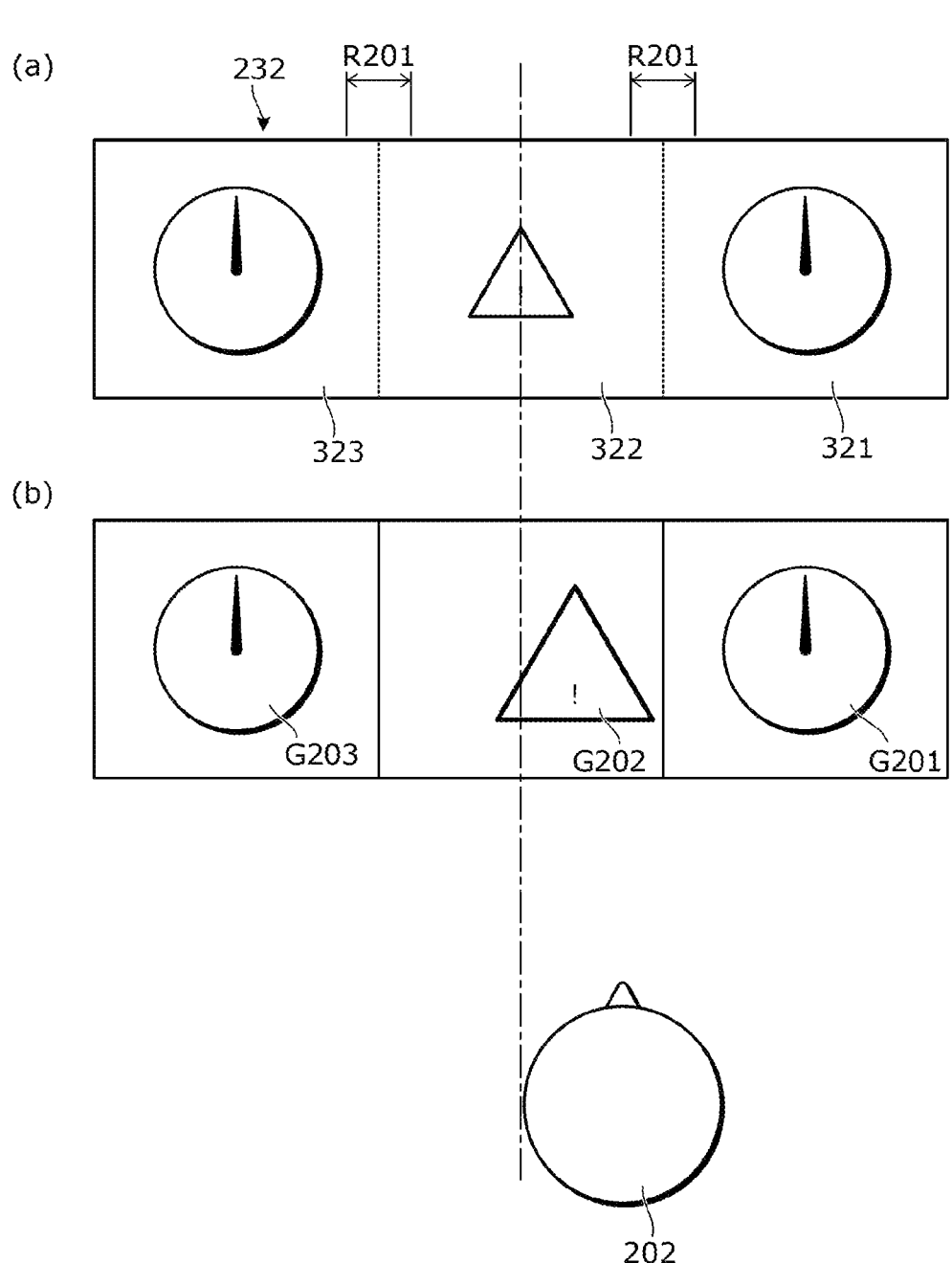
FIG. 38 is an explanatory diagram showing a display example of the display device according to Embodiment 21 in a state where a head position of a user has shifted sideways.

FIG. 38 is an explanatory diagram showing a display example of display device 210 according to Embodiment 21 in a state where a head position of user 202 has shifted sideways. In FIG. 38, (a) shows display content on display surface 232. In FIG. 38, (b) shows user 202 and display images G201, G202, and G203 as viewed from user 202. Since adjacent display images G201 and G202 (or display images G202 and G203) are separated by predetermined spacing R202 or more, adjacent display images G201 and G202 do not overlap with each other and a loss does not occur even if the head position of user 202 is shifted sideways. It suffices so long as a movement range of the head which can be measured by a change in attitude or a shake of the head of user 202 when seated is adopted as predetermined spacing R202. Specifically, predetermined spacing R202 is 5 cm or more and 20 cm or less.

As described above, according to the present embodiment, since first reflector 240 is provided with a plurality of reflective surfaces (first reflective surface 411, second reflective surface 412, and third reflective surface 413) for dividing image light emitted by second display element 231 and forming a plurality of display images G201, G202, and G203 with different viewing distances, an image expression which differentiates the viewing distance (depth) of respective display images (G201, G202, and G203) can be performed. In particular, since second reflective surface 412 is a curved surface, other image expressions (enlarged expressions) can also be performed due to second reflective surface 412. Combining such image expressions enables a dramatic impact to be enhanced.

In this manner, in order to enable a greater dramatic impact, display device 210 has a third configuration which includes second display element 231 and first reflector 240.

In addition, since first reflector 240 being a support body collectively supports the plurality of reflective surfaces (first reflective surface 411, second reflective surface 412, and third reflective surface 413), all of the plurality of reflective surfaces are integrated by the support body. As a result, in addition to making positioning of all reflective surfaces easier, the total number of components can also be reduced and downsizing can be achieved.

Since first reflective surface 411 and third reflective surface 413 are flat surfaces, display image G202 via second reflective surface 412 being a curved surface can be subjected to an image expression that differs from that of display images G201 and G203 via first reflective surface 411 and third reflective surface 413 being flat surfaces. As a result, a dramatic impact can be further enhanced.

Since the plurality of display images G201, G202, and G203 are side by side in the horizontal direction as viewed from user 202, the superposition of display images G201, G202, and G203 can be made less likely to change even if a height of an eye line of the user changes.

Since at least predetermined spacing R202 is provided between adjacent display images G201 and G202 (or display images G202 and G203), overlapping of the adjacent display images caused by a change in the eye line of the user can be inhibited.

Since controller 250 determines whether or not to invert display content of second display element 231 according to the total number of times image light forming each of the plurality of display images G201, G202, and G203 is reflected, appropriate display images G201, G202, and G203 as viewed from user 202 can be formed regardless of the total number of times the image light is reflected.

Embodiment 22

Embodiment 22 will be described. Note that in the following description, the same portions as in Embodiment 21 will be denoted by the same reference signs and descriptions thereof may be omitted.

Figure 39:
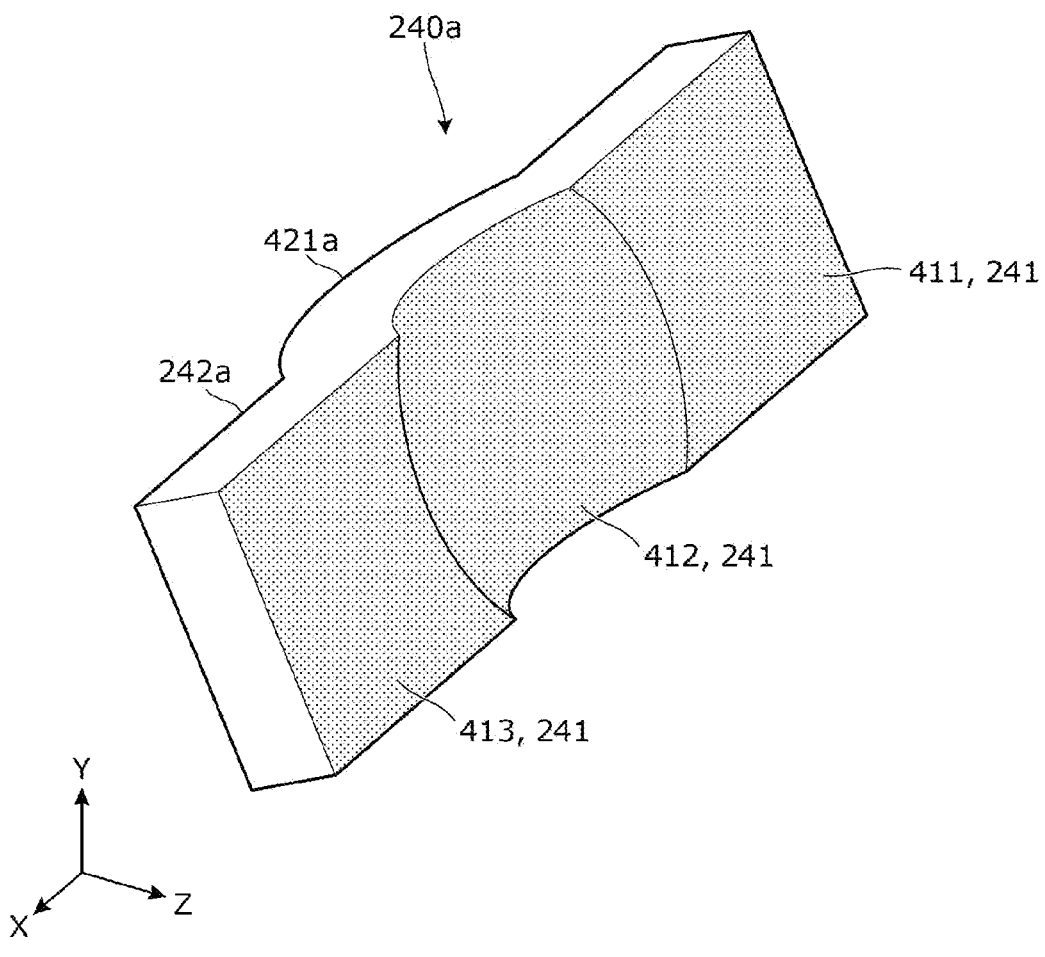
FIG. 39 is a perspective view showing a first reflector according to Embodiment 22.

FIG. 39 is a perspective view showing first reflector 240*a* according to Embodiment 22. First reflector 240 according to Embodiment 21 exemplifies a case where second main surface 242 is a flat surface as a whole. As shown in FIG. 39, in first reflector 240*a* according to Embodiment 22, region 421*a* corresponding to second reflective surface 412 in second main surface 242*a* is a convex curved surface that is convex outward. Region 421*a* is a spherical surface or a free curved surface. In this manner, by giving first reflector 240*a* the shape shown in FIG. 39, even when a depth of a concave surface of second reflective surface 412 becomes greater than a thickness of first reflector 240*a*, second reflective surface 412 can be formed. Note that second main surface 242*a* may assume any shape since each reflective surface is disposed on the side of the first main surface in first reflector 240*a*.

Embodiment 23

Embodiment 23 will now be described. A case where first reflective surface 411 and third reflective surface 413 are flush with each other has been exemplified in Embodiment 21. In other words, in the case of Embodiment 21, first reflective surface 411 and third reflective surface 413 are at the same distance from second display element 231. However, the distance from the second display element may differ for each reflective surface included in the first reflector.

Figure 40:
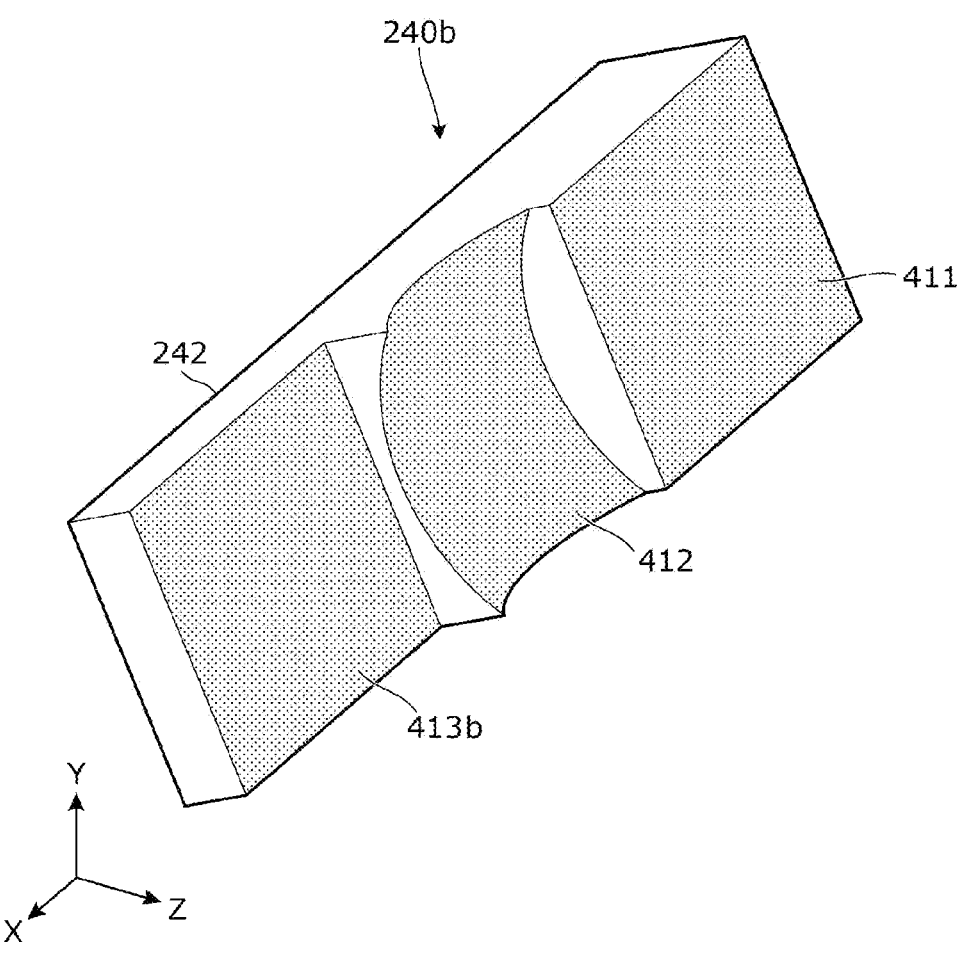
FIG. 40 is a perspective view showing a first reflector according to Embodiment 23.

FIG. 40 is a perspective view showing first reflector 240*b* according to Embodiment 23. As shown in FIG. 40, in first reflector 240*b*, a thickness of a portion corresponding to third reflective surface 413*b* is formed thinner than other portions. In other words, third reflective surface 413*b* is disposed at a position more separated from second display element 231 than first reflective surface 411 and second reflective surface 412.

In this manner, since first reflective surface 411, second reflective surface 412, and third reflective surface 413*b* have different distances from second display element 231, viewing distances of display images G201, G202, and G203 via each reflective surface can be differentiated. Therefore, a wider variety of image expressions can be performed and a dramatic impact can be further enhanced.

Embodiment 24

Embodiment 24 will now be described. First reflector 240 in which first reflective surface 411, second reflective surface 412, and third reflective surface 413 are integrated has been exemplified in Embodiment 21 described above. In Embodiment 24, a first reflector in which reflective surfaces are separate bodies will be described.

Figure 41:
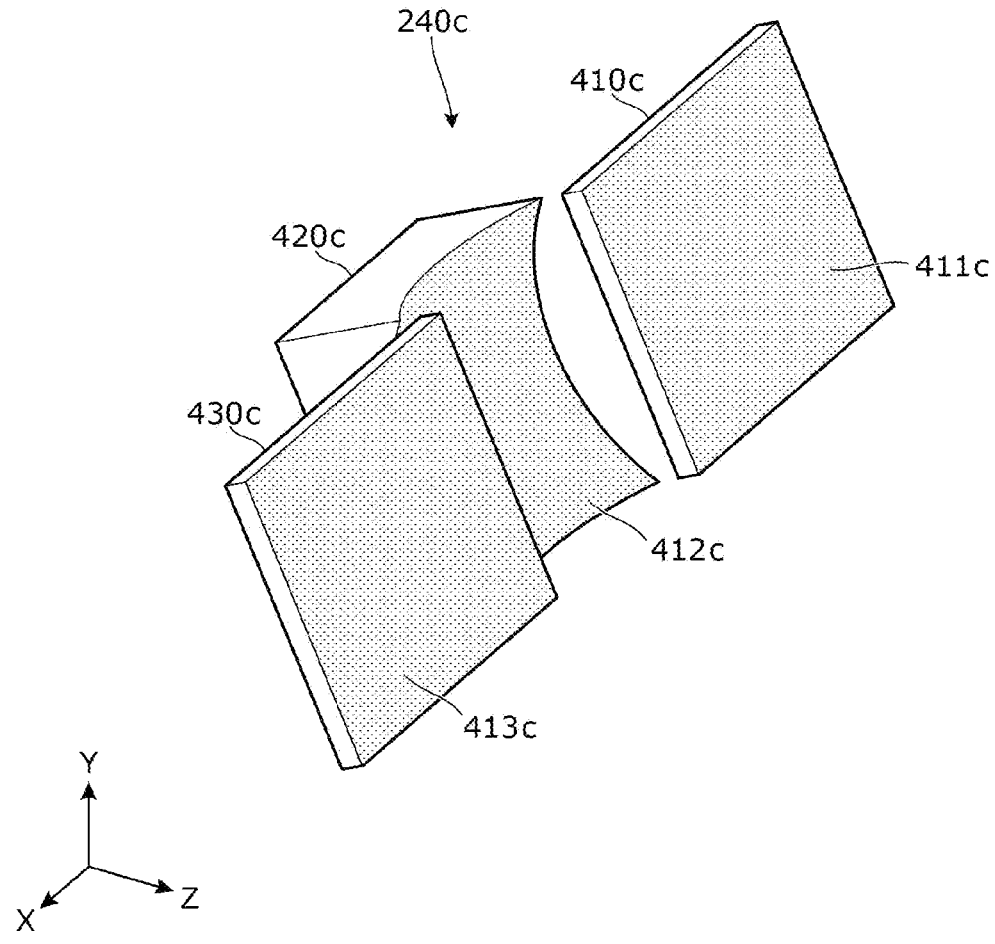
FIG. 41 is a perspective view showing a first reflector according to a first example of Embodiment 24.

FIG. 41 is a perspective view showing first reflector 240*c* according to a first example of Embodiment 24. As shown in FIG. 41, first reflector 240*c* includes three pieces 410*c*, 420*c*, and 430*c* which are side by side in the X-axis direction. Pieces 410*c* and 430*c* at both ends are formed in a flat plate shape and main surfaces which face second display element 231 constitute first reflective surface 411*c* and third reflective surface 413*c*. Piece 410*c* is an example of a support body which supports first reflective surface 411*c* and piece 430*c* is an example of a support body which supports third reflective surface 413*c*. Intermediate piece 420*c* is formed in a block shape, and a main surface which faces second display element 231 constitutes second reflective surface 412*c* that is a concave curved surface. Piece 420*c* is an example of a support body which supports second reflective surface 412*c*.

Figure 42:
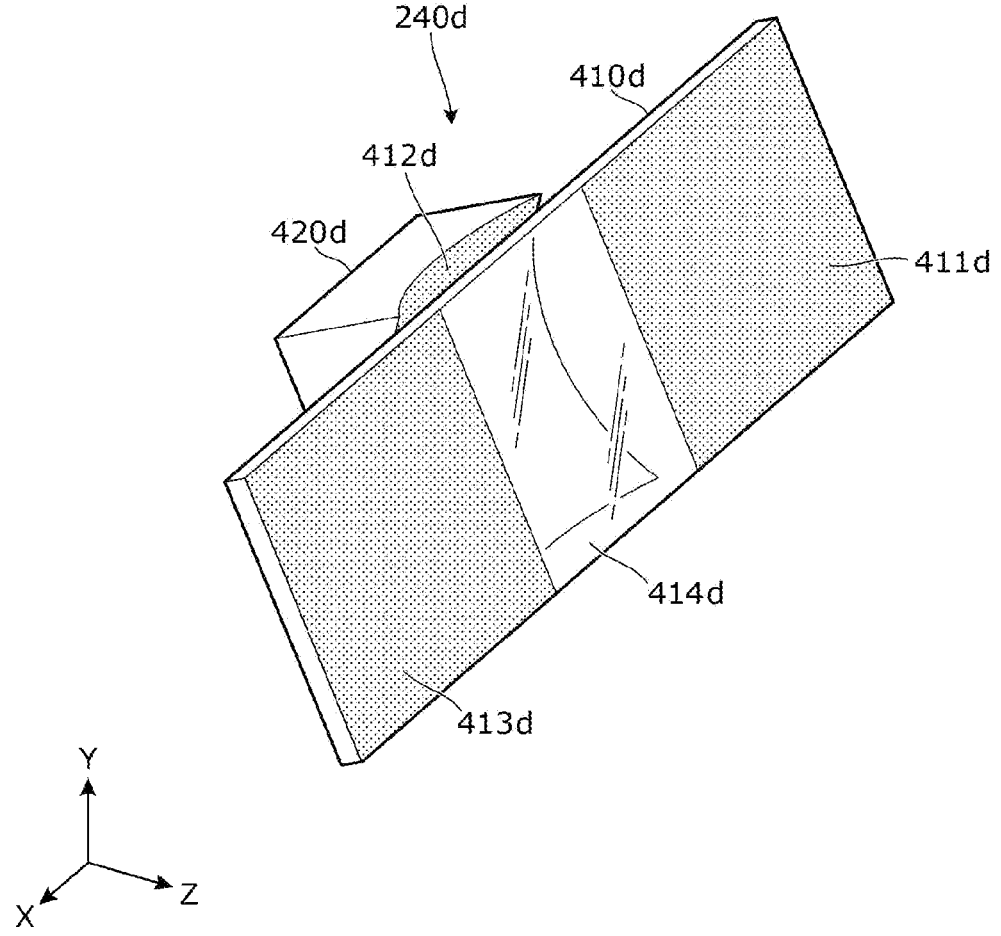
FIG. 42 is a perspective view showing a first reflector according to a second example of Embodiment 24.

FIG. 42 is a perspective view showing first reflector 240*d* according to a second example of Embodiment 24. As shown in FIG. 42, first reflector 240*d* includes two pieces 410*d* and 420*d* which are side by side in the Z-axis direction. Piece 410*d* in the positive Z-axis direction is a plate body that is elongated in the X-axis direction. In piece 410*d*, both ends in the X-axis direction constitute first reflective surface 411*d* and third reflective surface 413*d*, and intermediate portion 414*d* constitutes a translucent portion. Piece 410*d* is an example of a support body which supports first reflective surface 411*d* and third reflective surface 413*d*.

Piece 420*d* in the negative Z-axis direction is disposed at a position opposing intermediate portion 414*d* of piece 410*d*. Piece 420*d* is formed in a block shape, and a main surface which faces second display element 231 via intermediate portion 414*d* constitutes second reflective surface 412*d* that is a concave curved surface. Piece 420*d* is an example of a support body which supports second reflective surface 412*d*. In this manner, in first reflector 240*d*, first reflective surface 411*d* and third reflective surface 413*d* are integrated and second reflective surface 412*d* is a separate body.

Figure 43:
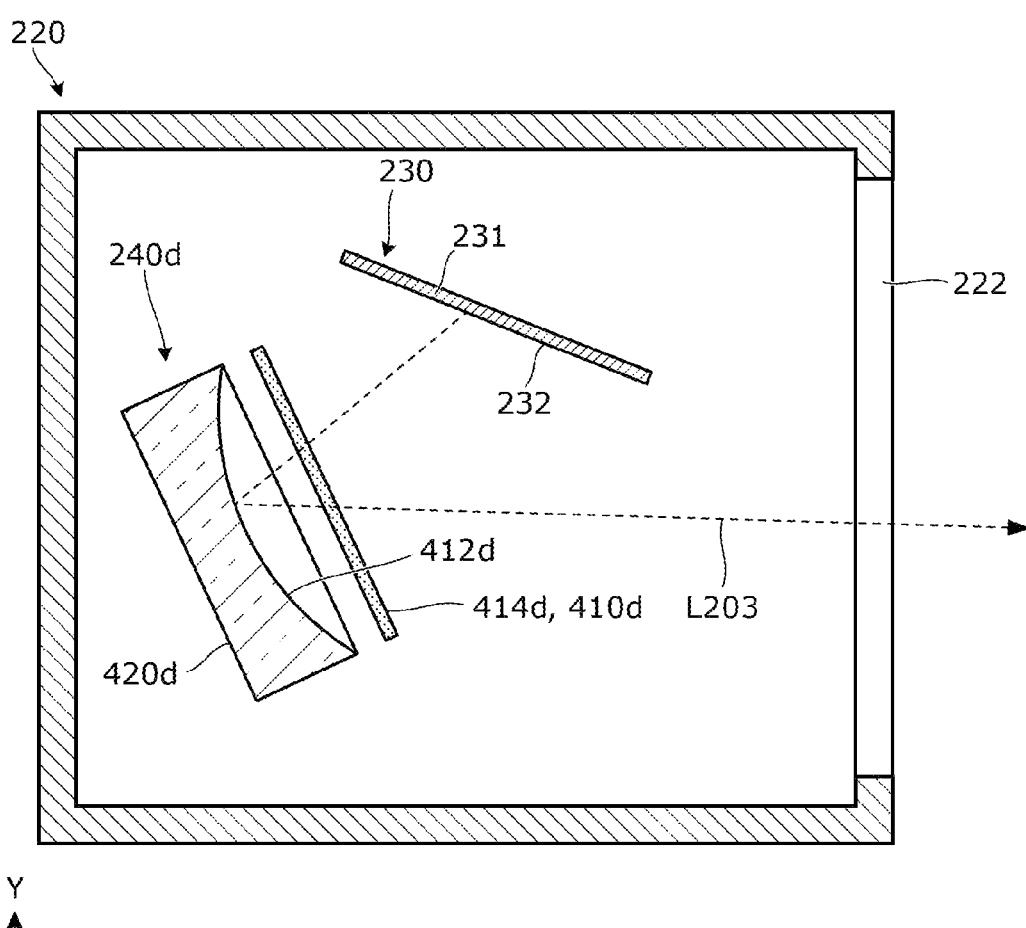
FIG. 43 is a sectional view showing the first reflector according to the second example of Embodiment 24.
Figure 43:
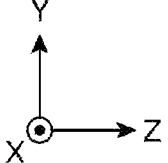

FIG. 43 is a sectional view showing first reflector 240*d* according to the second example of Embodiment 24. FIG. 43 is a sectional view of second reflective surface 412*d* cut along the YZ plane. As shown in FIG. 43, image light L203 emitted from second display element 231 and directed toward second reflective surface 412*d* passes through intermediate portion 414*d* of piece 410*d* and is then reflected by second reflective surface 412*d*. Subsequently, image light L203 once again passes through intermediate portion 414*d* and is directed toward emitter 222.

Figure 44:
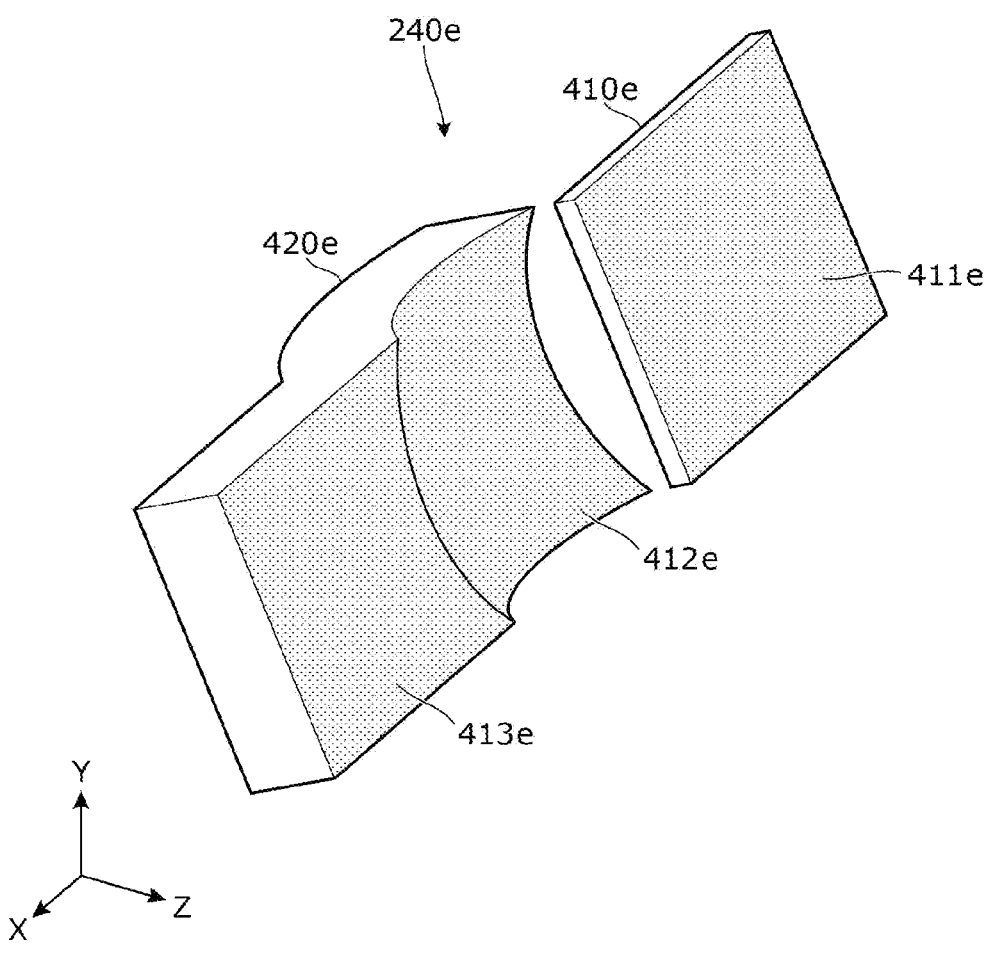
FIG. 44 is a perspective view showing a first reflector according to a third example of Embodiment 24.

FIG. 44 is a perspective view showing first reflector 240*e* according to a third example of Embodiment 24. As shown in FIG. 44, first reflector 240*e* includes two pieces 410*e* and 420*e* which are side by side in the X-axis direction. Piece 410*e* in the positive X-axis direction is a plate body that is elongated in the X-axis direction. A portion in the positive X-axis direction of piece 410*e* is formed in a flat plate shape, and a surface facing second display element 231 of the portion constitutes first reflective surface 411*e*. A portion in the negative X-axis direction of piece 420*e* is formed in a curved plate shape, and a surface facing second display element 231 of the portion constitutes second reflective surface 412*e* which is a concave curved surface. Piece 420*e* is a rectangular plate, and a surface facing second display element 231 of piece 420*e* constitutes third reflective surface 413*e*. Piece 410*e* is an example of a support body which supports first reflective surface 411*e*. Piece 420*e* is an example of a support body which supports second reflective surface 412*e* and third reflective surface 413*e*.

As described above, due to dividing first reflectors 240*c*, 240*d*, and 240*e* into a plurality of pieces, positioning can be readily performed for each piece. In addition, in the second example and the third example, since at least two reflective surfaces are supported by one support body (piece 410*d*, piece 420*e*), the reflective surfaces are integrated by the support body. As a result, positioning of the reflective surfaces can be made easier.

Embodiment 25

Embodiment 25 will now be described. First reflector 240 in which first reflective surface 411, second reflective surface 412, and third reflective surface 413 are arrayed in the X-axis direction has been exemplified in Embodiment 21 described above. In Embodiment 25, a first reflector in which respective reflective surfaces are side by side in an up-down direction will be described.

Figure 45:
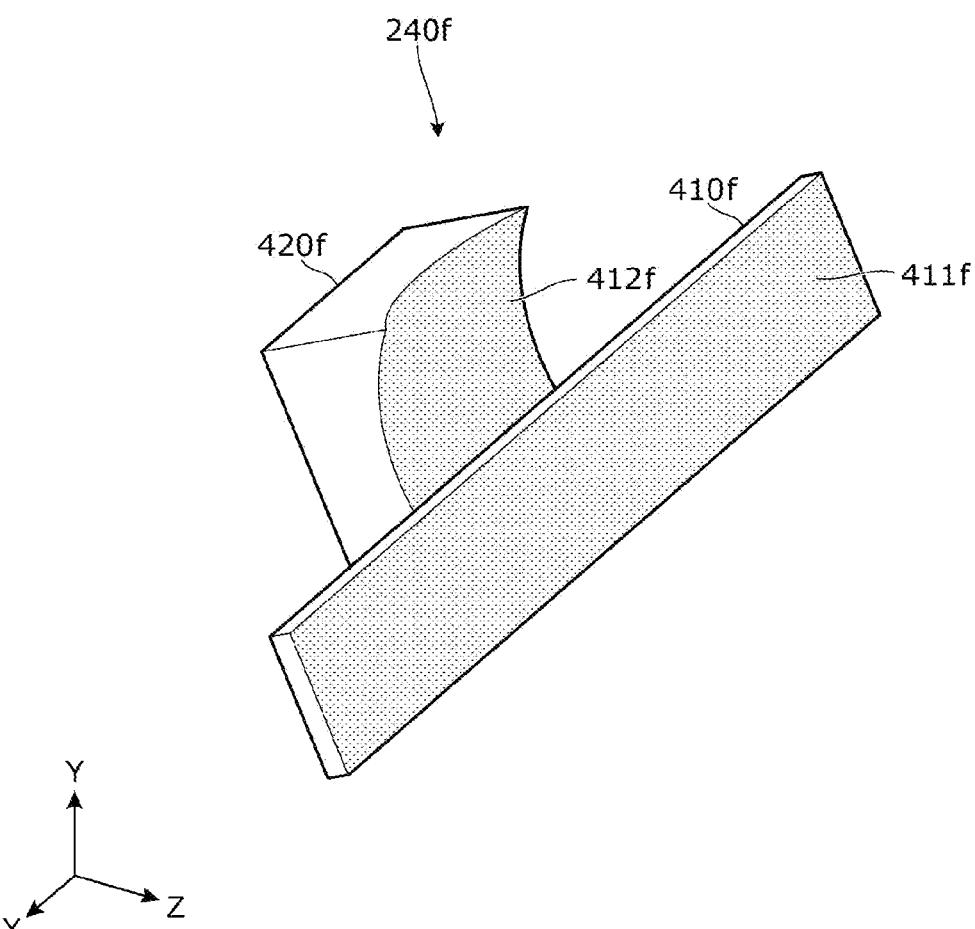
FIG. 45 is a perspective view showing a first reflector according to Embodiment 25.

FIG. 45 is a perspective view showing first reflector 240*f* according to Embodiment 25. As shown in FIG. 45, first reflector 240*f* includes a plurality of pieces 410*f* and 420*f* which are side by side in the up-down direction. Lower piece 410*f* has a flat plate shape, and a main surface which faces second display element 231 constitutes first reflective surface 411*f*. Upper piece 420*f* has a block shape, and a main surface which faces second display element 231 constitutes second reflective surface 412*f* that is a concave curved surface. In this case, even in second display element 231, display content corresponding to first reflective surface 411*f* and second reflective surface 412*f* is formed so as to be side by side in the up-down direction. Image light emitted from second display element 231 is reflected by first reflective surface 411*f* and second reflective surface 412*f* and forms a plurality of display images arranged side by side in the vertical direction.

Accordingly, since a plurality of display images are side by side in the vertical direction as viewed from user 202, superposition of images can be made less likely to change even if the eye line of user 202 changes in a left-right direction.

Embodiment 26

Embodiment 26 will now be described. Display device 210 including only first reflector 240 as a member which reflects image light has been exemplified in Embodiment 21 described above. However, a display device may include two or more reflectors.

Figure 46:
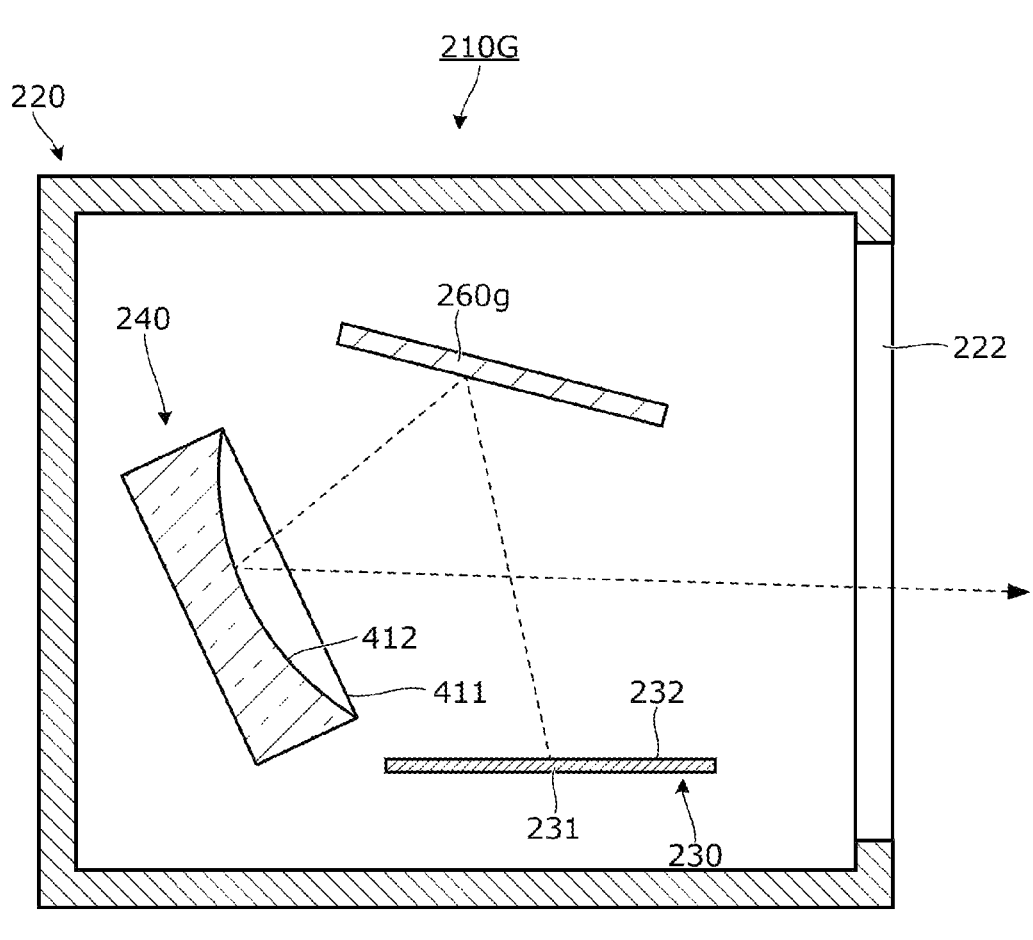
FIG. 46 is a sectional view showing a display device according to Embodiment 26.
Figure 46:
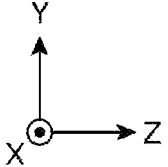

FIG. 46 is a sectional view showing display device 210G according to Embodiment 26. As shown in FIG. 46, display device 210G further includes second reflector 260g that is separate from first reflector 240. Specifically, in display device 210G, second display element 231 is disposed at an end in the negative Y-axis direction in enclosure 220 and display surface 232 faces the positive Y-axis direction. Second reflector 260g is a plane mirror and is disposed at an end in the positive Y-axis direction in enclosure 220. A reflective surface of second reflector 260g faces second display element 231 and first reflector 240. Therefore, image light emitted from second display element 231 is to be reflected by second reflector 260g and directed toward first reflector 240.

In this manner, since second reflector 260g reflects the image light, the optical path length of image light can be increased by the reflection. Accordingly, a depth feel of a display image can be further enhanced.

Embodiment 27

Embodiment 27 will now be described. While a case where image light is reflected by a reflector formed of a curved surface will be exemplified below, a similar description will apply to other reflective surfaces.

Figure 47:
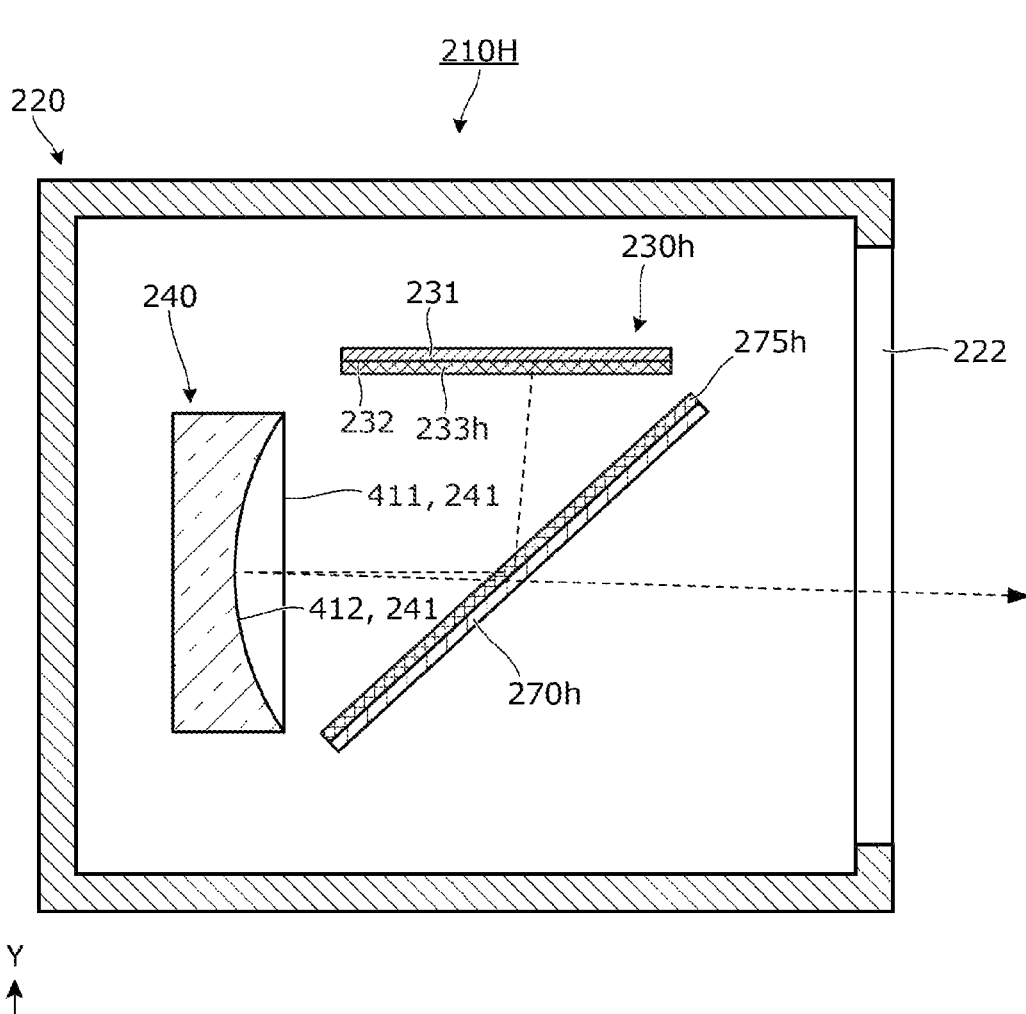
FIG. 47 is a sectional view showing a display device according to Embodiment 27.
Figure 47:
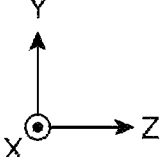

FIG. 47 is a sectional view showing display device 210H according to Embodiment 27. As shown in FIG. 47, display device 210H includes display unit 230h, first reflector 240, third polarizing half mirror 270h, and sixth λ/4 plate 275h.

Display unit 230h includes second display element 231 and λ/4 plate 233h stacked on display surface 232 of second display element 231. Second display element 231 is disposed at an end in the positive Y-axis direction of enclosure 220 in an attitude in which display surface 232 faces the negative Y-axis direction along the XZ plane.

λ/4 plate 233h is a λ/4 retardation plate for converting linearly polarized light incident to λ/4 plate 233h into circularly polarized light and for converting circularly polarized light incident to λ/4 plate 233h into linearly polarized light. In other words, image light emitted from second display element 231 is incident to λ/4 plate 233h and converted into circularly polarized light. For example, when linearly polarized light that is S polarized light is emitted as image light from second display element 231, the image light is converted into S+ polarized light by passing through λ/4 plate 233h. In the following description, linearly polarized light that is S polarized light may be simply referred to as "S polarized light" and linearly polarized light that is P polarized light may be simply referred to as "P polarized light". In addition, S polarized light converted into clockwise circularly polarized light will be referred to as S+ polarized light and S polarized light converted into counterclockwise circularly polarized light will be referred to as S− polarized light. In a similar manner, P polarized light converted into clockwise circularly polarized light will be referred to as P+ polarized light and P polarized light converted into counterclockwise circularly polarized light will be referred to as P− polarized light. Note that S+ polarized light and P− polarized light are the same and S− polarized light and P+ polarized light are the same.

First reflector 240 is disposed at an end in the negative Z-axis direction in enclosure 220 in an attitude in which first main surface 241 faces the positive Z-axis direction.

Third polarizing half mirror 270h is an optical member which reflects image light that is P polarized light and transmits image light that is other polarized light. Specifically, third polarizing half mirror 270h is disposed at a position which opposes display unit 230h in the negative Y-axis direction and opposes first reflector 240 in the positive Z-axis direction. Third polarizing half mirror 270h is disposed in an attitude which causes an end in the positive Z-axis direction to be more toward the positive Y-axis direction than an end in the negative Z-axis direction. Third polarizing half mirror 270h is structured such that a reflective polarizing plate is disposed on a flat plate-shaped glass base material (in this case, the reflective polarizing plate is disposed on a side of display unit 230h in the glass base material).

Sixth λ/4 plate 275h is a λ/4 retardation plate for converting linearly polarized light incident to sixth λ/4 plate 275h into circularly polarized light and for converting circularly polarized light incident to sixth λ/4 plate 275h into linearly polarized light. Sixth λ/4 plate 275h is disposed between third polarizing half mirror 270h and first reflector 240. Specifically, sixth λ/4 plate 275h is stacked on a surface that faces first reflector 240 in third polarizing half mirror 270h. Sixth λ/4 plate 275h has the same orientation of circularly polarized light as λ/4 plate 233h.

Image light that is S polarized light emitted from second display element 231 is converted into S+ polarized light by passing through λ/4 plate 233h. The image light that is S+ polarized light passes through sixth λ/4 plate 275h and is converted into P polarized light. The image light that is P polarized light is reflected by third polarizing half mirror 270h. In this manner, third polarizing half mirror 270h reflects image light having been emitted from second display element 231.

The image light that is P polarized light is reflected by third polarizing half mirror 270h, once again passes through sixth λ/4 plate 275h, and is converted into P+ polarized light. Subsequently, the image light that is P+ polarized light is reflected by first reflector 240, once again passes through sixth λ/4 plate 275h, and is converted into S polarized light. The image light having become S polarized light passes through third polarizing half mirror 270h and is directed toward emitter 222.

As described above, a polarization state of the image light emitted from second display element 231 is converted by passing through the λ/4 plate a plurality of times before passing through third polarizing half mirror 270h and the image light becomes capable of passing through third polarizing half mirror 270h. In addition, since the image light is once reflected by third polarizing half mirror 270h and also reflected by first reflector 240 before passing through third polarizing half mirror 270h, an optical path length of the image light can be increased.

Embodiment 28

Figure 48:
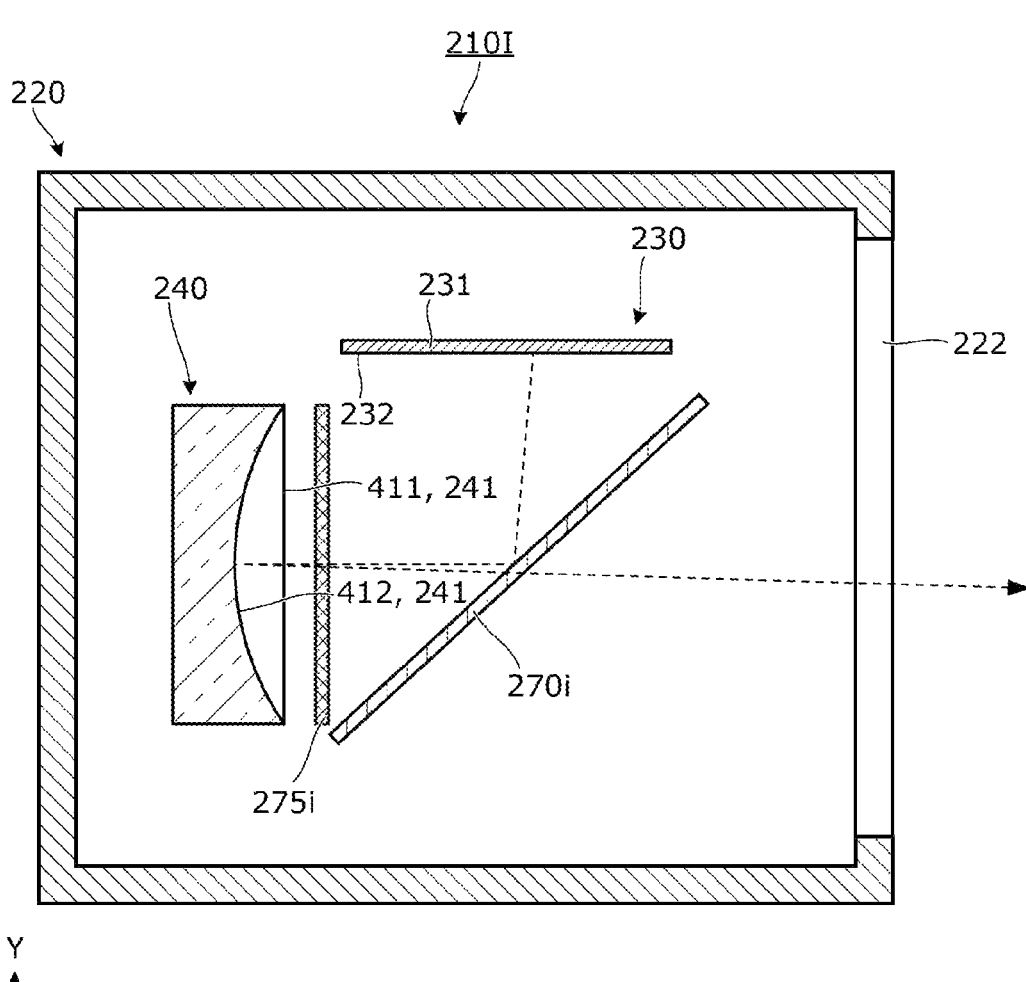
FIG. 48 is a sectional view showing a display device according to Embodiment 28.
Figure 48:
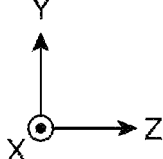

Embodiment 28 will now be described. FIG. 48 is a sectional view showing display device 210I according to Embodiment 28. As shown in FIG. 48, display device 210I includes display unit 230h, first reflector 240, third polarizing half mirror 270i, and sixth λ/4 plate 275i.

Second display element 231 of display unit 230 is disposed at an end in the positive Y-axis direction of enclosure 220 in an attitude in which display surface 232 faces the negative Y-axis direction along the XZ plane. First reflector 240 is disposed at an end in the negative Z-axis direction in enclosure 220 in an attitude in which first main surface 241 faces the positive Z-axis direction.

Third polarizing half mirror 270*i* is an optical member which reflects image light that is S polarized light and transmits image light that is other polarized light. Specifically, third polarizing half mirror 270*i* is disposed at a position which opposes second display element 231 in the negative Y-axis direction and opposes first reflector 240 in the positive Z-axis direction. Third polarizing half mirror 270*i* is disposed in an attitude which causes an end in the positive Z-axis direction to be more toward the positive Y-axis direction than an end in the negative Z-axis direction. Third polarizing half mirror 270*i* is structured such that a reflective polarizing plate is disposed on a flat plate-shaped glass base material (in this case, the reflective polarizing plate is disposed on a side of display unit 230 in the glass base material).

Sixth λ/4 plate 275*i* is a λ/4 retardation plate for converting linearly polarized light incident to sixth λ/4 plate 275*i* into circularly polarized light and for converting circularly polarized light incident to sixth λ/4 plate 275*i* into linearly polarized light. Sixth λ/4 plate 275*i* is disposed between third polarizing half mirror 270*i* and first reflector 240. Specifically, sixth λ/4 plate 275*i* is disposed in an attitude along the XY plane at a position separated from both third polarizing half mirror 270*i* and first reflector 240.

Image light that is S polarized light emitted from second display element 231 is reflected by third polarizing half mirror 270*i*, passes through sixth λ/4 plate 275*i*, and is converted into S+ polarized light. After being reflected by first reflector 240, the image light that is S+ polarized light once again passes through sixth λ/4 plate 275*i* and is converted into P polarized light. The image light that is P polarized light passes through third polarizing half mirror 270*i* and is directed toward emitter 222.

As described above, image light emitted from second display element 231 is converted by passing through the λ/4 plate a plurality of times before passing through third polarizing half mirror 270*i* and the image light becomes capable of passing through third polarizing half mirror 270*i*. In addition, since the image light is once reflected by third polarizing half mirror 270*i* and further reflected by first reflector 240 before passing through third polarizing half mirror 270*i*, an optical path length of the image light can be increased.

Embodiment 29

Figure 49:
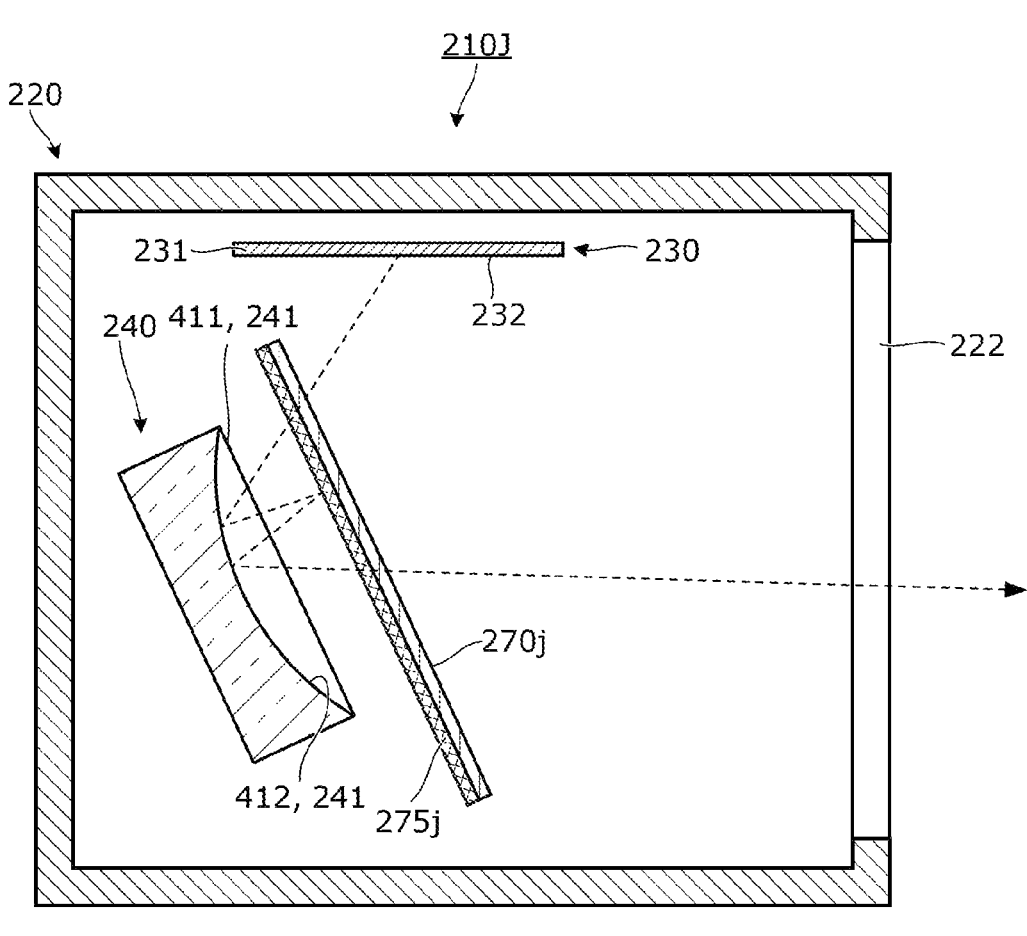
FIG. 49 is a sectional view showing a display device according to Embodiment 29.
Figure 49:
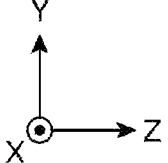

Embodiment 29 will now be described. FIG. 49 is a sectional view showing display device 210J according to Embodiment 29. As shown in FIG. 49, display device 210J includes display unit 230, first reflector 240, third polarizing half mirror 270*j*, and sixth λ/4 plate 275*j*.

Second display element 231 of display unit 230 is disposed at an end in the positive Y-axis direction of enclosure 220 in an attitude in which display surface 232 faces the negative Y-axis direction along the XZ plane. First reflector 240 is disposed in an attitude and at a position similar to those in Embodiment 21.

Third polarizing half mirror 270*j* is an optical member which transmits image light that is S polarized light and reflects image light that is other polarized light. Specifically, third polarizing half mirror 270*j* is disposed at a position which opposes second display element 231 in the negative Y-axis direction and opposes first reflector 240 in the positive Z-axis direction. Third polarizing half mirror 270*j* is disposed in an attitude which causes an end in the positive Z-axis direction to be more toward the negative Y-axis direction than an end in the negative Z-axis direction.

Sixth λ/4 plate 275*j* is a λ/4 retardation plate for converting linearly polarized light incident to sixth λ/4 plate 275*j* into circularly polarized light and for converting circularly polarized light incident to sixth λ/4 plate 275*j* into linearly polarized light. Sixth λ/4 plate 275*j* is disposed between third polarizing half mirror 270*j* and first reflector 240. Specifically, sixth λ/4 plate 275*j* is stacked on a surface that faces first reflector 240 in third polarizing half mirror 270*j*.

Image light that is S polarized light emitted from second display element 231 passes through third polarizing half mirror 270*j*, passes through sixth λ/4 plate 275*j*, and is converted into S+ polarized light. After being reflected by first reflector 240, the image light that is S+ polarized light once again passes through sixth λ/4 plate 275*j* and is converted into P polarized light. The image light having become P polarized light is reflected by third polarizing half mirror 270*j*, once again passes through sixth λ/4 plate 275*j*, and is converted into P+ polarized light. After being reflected by first reflector 240, the image light that is P+ polarized light once again passes through sixth λ/4 plate 275*j* and is converted into S polarized light. The image light that is S polarized light passes through third polarizing half mirror 270*j* and is directed toward emitter 222.

As described above, sixth λ/4 plate 275*j* is disposed between third polarizing half mirror 270*j* which transmits the image light emitted from second display element 231 and first reflector 240. Due to such a layout, the image light formed of a single beam of polarized light passes through sixth λ/4 plate 275*j* a plurality of times after passing through third polarizing half mirror 270*j* once and before reaching third polarizing half mirror 270*j* by being reflected by first reflector 240. Accordingly, the image light becomes capable of being reflected by third polarizing half mirror 270*j*. Next, after being reflected by third polarizing half mirror 270*j*, the image light passes through the λ/4 plate a plurality of times before reaching third polarizing half mirror 270*j* by being reflected by first reflector 240. Accordingly, since the image light becomes capable of passing through third polarizing half mirror 270*j*, the image light passes through third polarizing half mirror 270*j*. Therefore, the optical path length of the image light can be increased.

Embodiment 30

Figure 50:
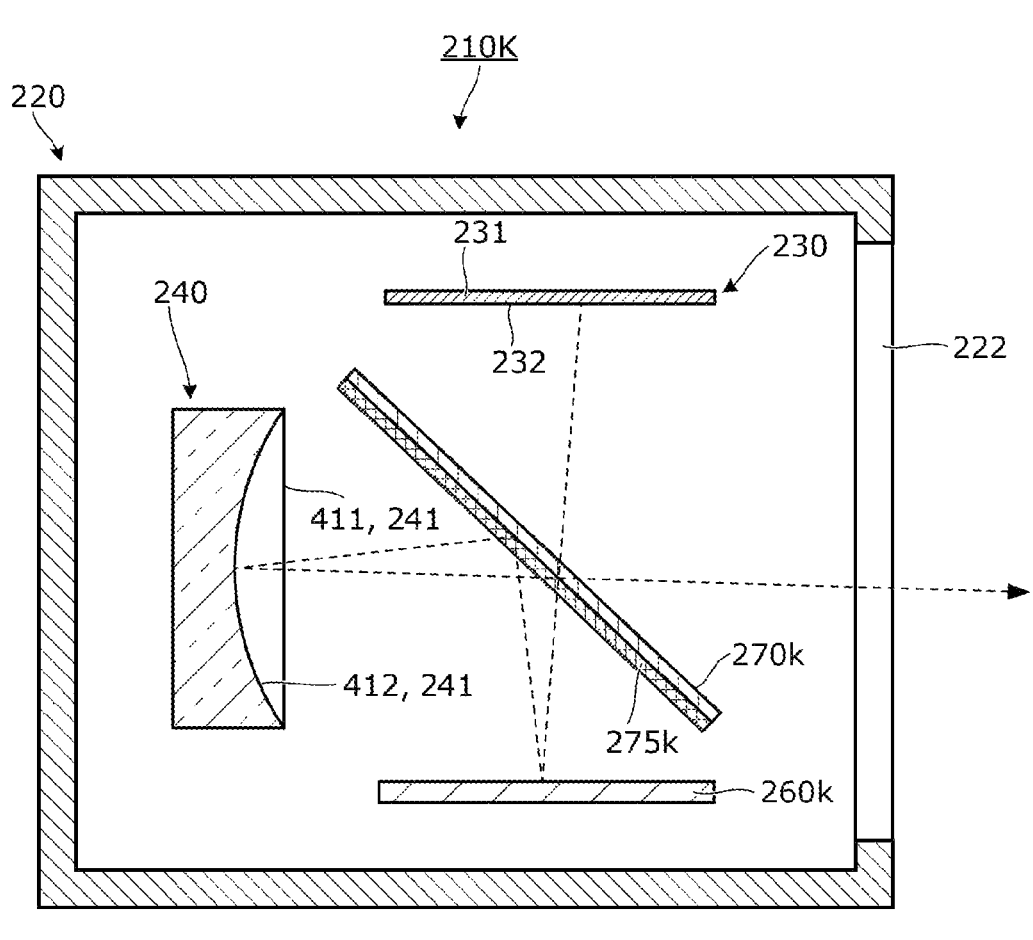
FIG. 50 is a sectional view showing a display device according to Embodiment 30.
Figure 50:
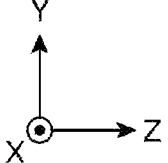

Embodiment 30 will now be described. FIG. 50 is a sectional view showing display device 210K according to Embodiment 30. As shown in FIG. 50, display device 210K includes display unit 230, first reflector 240, second reflector 260*k*, third polarizing half mirror 270*k*, and sixth λ/4 plate 275*k*.

Second display element 231 of display unit 230 is disposed at an end in the positive Y-axis direction of enclosure 220 in an attitude in which display surface 232 faces the negative Y-axis direction along the XZ plane. First reflector 240 is disposed at an end in the negative Z-axis direction in enclosure 220 in an attitude in which first main surface 241 faces the positive Z-axis direction.

Second reflector 260*k* is a plane mirror and is disposed at an end in the negative Y-axis direction in enclosure 220. Second reflector 260*k* opposes second display element 231 via third polarizing half mirror 270*k* and sixth λ/4 plate 275*k* in an attitude where a reflective surface faces the positive Y-axis direction.

Third polarizing half mirror 270*k* is an optical member which transmits image light that is S polarized light and reflects image light that is other polarized light. Specifically, third polarizing half mirror 270k is disposed at a position which is interposed between second display element 231 and second reflector 260k in the Y-axis direction and which opposes first reflector 240 in the positive Z-axis direction. Third polarizing half mirror 270k is disposed in an attitude which causes an end in the positive Z-axis direction to be more toward the negative Y-axis direction than an end in the negative Z-axis direction.

Sixth $\lambda/4$ plate 275k is a $\lambda/4$ retardation plate for converting linearly polarized light incident to sixth $\lambda/4$ plate 275k into circularly polarized light and for converting circularly polarized light incident to sixth $\lambda/4$ plate 275k into linearly polarized light. Sixth $\lambda/4$ plate 275k is disposed between third polarizing half mirror 270k and first reflector 240. Specifically, sixth $\lambda/4$ plate 275k is stacked on a surface that faces first reflector 240 in third polarizing half mirror 270k.

Image light that is S polarized light emitted from second display element 231 passes through third polarizing half mirror 270k, passes through sixth $\lambda/4$ plate 275k, and is converted into S+ polarized light. After being reflected by second reflector 260k, the image light that is S+ polarized light once again passes through sixth $\lambda/4$ plate 275k and is converted into P polarized light. The image light having become P polarized light is reflected by third polarizing half mirror 270k, once again passes through sixth $\lambda/4$ plate 275k, and is converted into P+ polarized light. After being reflected by first reflector 240, the image light that is P+ polarized light once again passes through sixth $\lambda/4$ plate 275k and is converted into S polarized light. The image light that is S polarized light passes through third polarizing half mirror 270k and is directed toward emitter 222.

As described above, since second reflector 260k reflects the image light, the optical path length of the image light can be increased by the reflection. Accordingly, a depth feel of a display image can be further enhanced.

Embodiment 31

Figure 51:
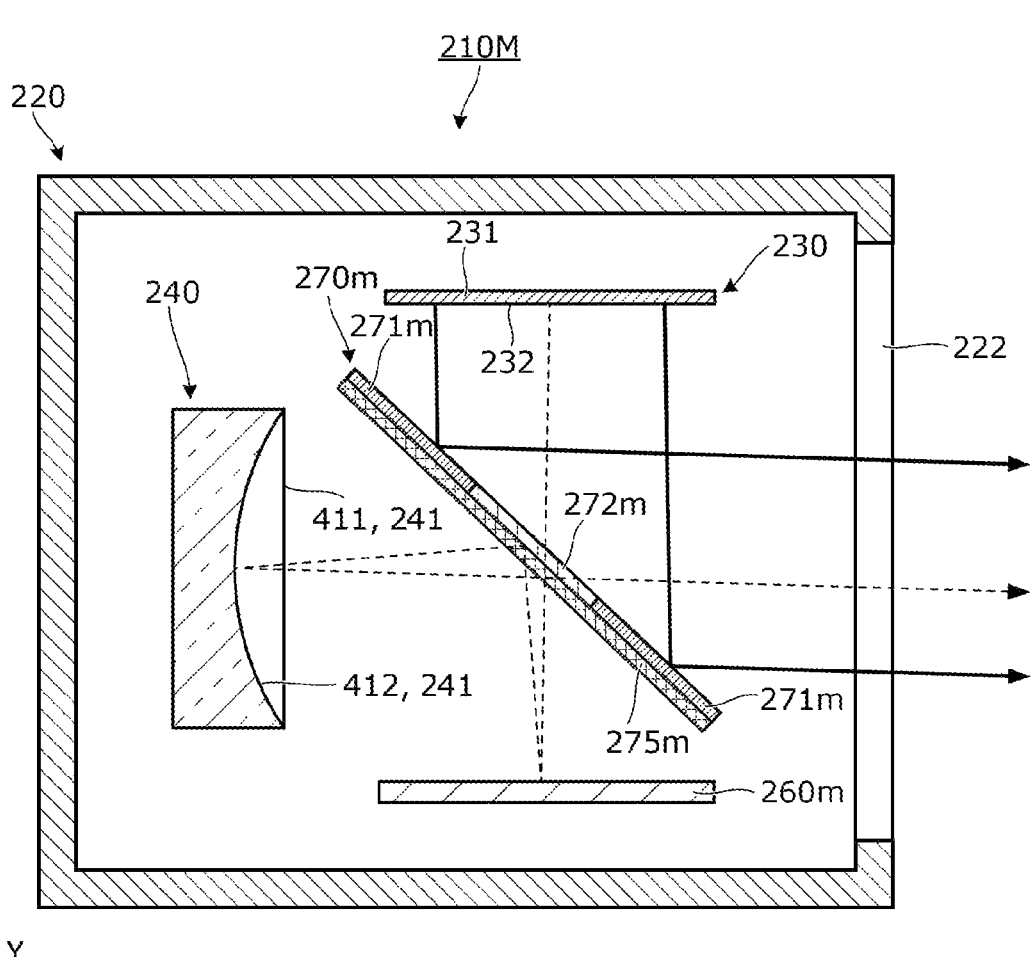
FIG. 51 is a sectional view showing a display device according to Embodiment 31.
Figure 51:
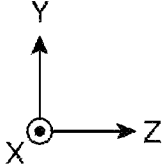

Embodiment 31 will now be described. FIG. 51 is a sectional view showing display device 210M according to Embodiment 31. As shown in FIG. 51, display device 210M includes display unit 230, first reflector 240, second reflector 260m, third polarizing half mirror 270m, and sixth $\lambda/4$ plate 275m.

Second display element 231 of display unit 230 is disposed at an end in the positive Y-axis direction of enclosure 220 in an attitude in which display surface 232 faces the negative Y-axis direction along the XZ plane. First reflector 240 is disposed at an end in the negative Z-axis direction in enclosure 220 in an attitude in which first main surface 241 faces the positive Z-axis direction.

Second reflector 260m is a plane mirror and is disposed at an end in the negative Y-axis direction in enclosure 220. Second reflector 260m opposes second display element 231 via third polarizing half mirror 270m and sixth $\lambda/4$ plate 275m in an attitude where a reflective surface faces the positive Y-axis direction.

Third polarizing half mirror 270m is disposed at a position which is interposed between second display element 231 and second reflector 260m in the Y-axis direction and which opposes first reflector 240 in the positive Z-axis direction. Third polarizing half mirror 270m is disposed in an attitude which causes an end in the positive Z-axis direction to be more toward the negative Y-axis direction than an end in the negative Z-axis direction. Third polarizing half mirror 270m has polarization properties that differ between both ends 271m and intermediate portion 272m in the Y-axis direction. Specifically, both ends 271m have polarization properties which reflect image light that is S polarized light and transmit image light that is other polarized light. Intermediate portion 272m has polarization properties which transmit image light that is S polarized light and reflect image light that is other polarized light.

Sixth $\lambda/4$ plate 275m is a $\lambda/4$ retardation plate for converting linearly polarized light incident to sixth $\lambda/4$ plate 275m into circularly polarized light and for converting circularly polarized light incident to sixth $\lambda/4$ plate 275m into linearly polarized light. Sixth $\lambda/4$ plate 275m is disposed between third polarizing half mirror 270m and first reflector 240. Specifically, sixth $\lambda/4$ plate 275m is stacked on a surface that faces first reflector 240 in third polarizing half mirror 270m.

In image light that is S polarized light having been emitted from second display element 231, image light (shown by a solid arrow in FIG. 51) which corresponds to both ends 271m of third polarizing half mirror 270m is reflected by both ends 271m and is directed toward emitter 222.

On the other hand, in image light that is S polarized light having been emitted from second display element 231, image light (shown by a dashed arrow in FIG. 51) which corresponds to intermediate portion 272m of third polarizing half mirror 270m passes through intermediate portion 272m, passes through sixth $\lambda/4$ plate 275m, and is converted into S+ polarized light. After being reflected by second reflector 260m, the image light that is S+ polarized light once again passes through sixth $\lambda/4$ plate 275m and is converted into P polarized light. The image light having become P polarized light is reflected by intermediate portion 272m, once again passes through sixth $\lambda/4$ plate 275m, and is converted into P+ polarized light. After being reflected by first reflector 240, the image light that is P+ polarized light once again passes through sixth $\lambda/4$ plate 275m and is converted into S polarized light. The image light that is S polarized light passes through intermediate portion 272m and is directed toward emitter 222.

As described above, since third polarizing half mirror 270m includes a plurality of regions (both ends 271m and intermediate portion 272m) having mutually different polarization properties, an optical path length (viewing distance) of image light which passes through each region can be differentiated. Accordingly, since different depth feels are visually recognized, a wider variety of image expressions can be performed.

Embodiment 32

Figure 52:
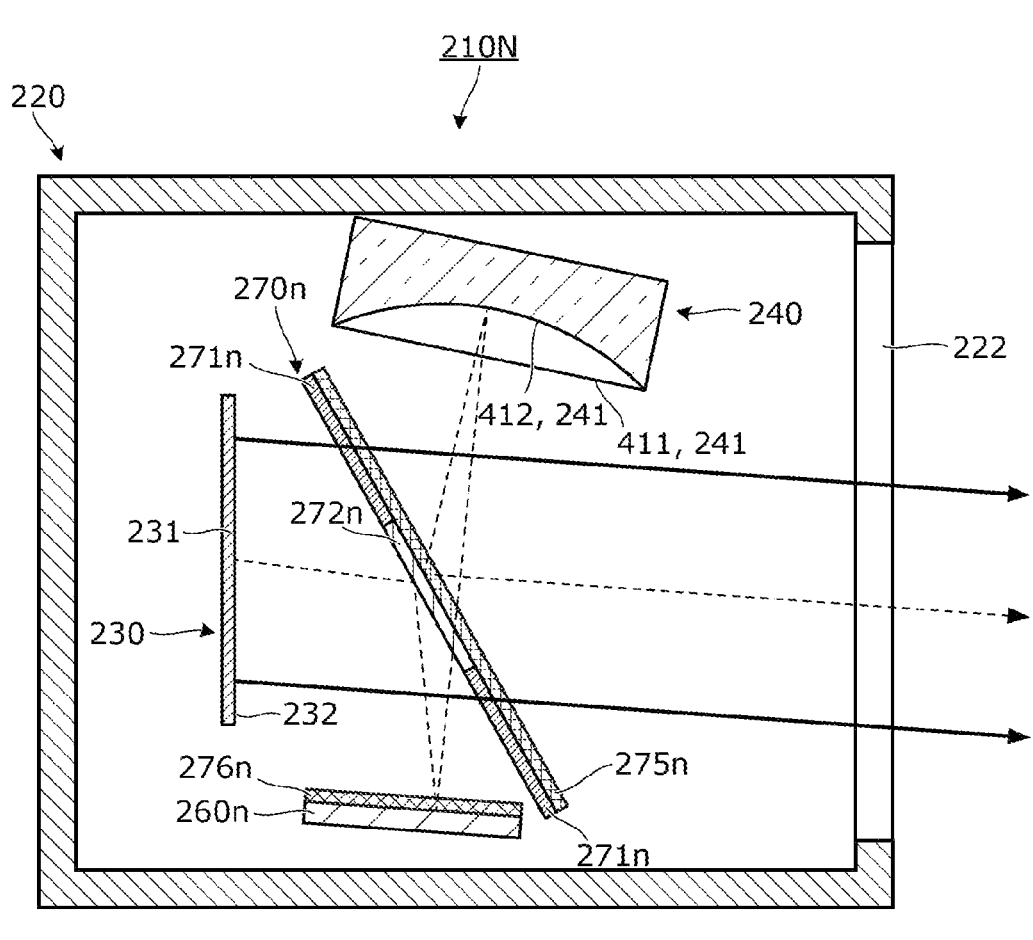
FIG. 52 is a sectional view showing a display device according to Embodiment 32.
Figure 52:
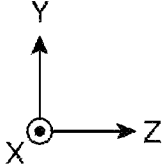

Embodiment 32 will now be described. FIG. 52 is a sectional view showing display device 210N according to Embodiment 32. As shown in FIG. 52, display device 210N includes display unit 230, first reflector 240, second reflector 260n, third polarizing half mirror 270n, sixth $\lambda/4$ plate 275n, and sixth $\lambda/4$ plate 276n.

Second display element 231 of display unit 230 is disposed at an end in the negative Z-axis direction of enclosure 220 in an attitude in which display surface 232 faces the positive Z-axis direction. First reflector 240 is disposed at an end in the positive Y-axis direction in enclosure 220 in an attitude in which first main surface 241 faces the negative Y-axis direction.

Second reflector 260n is a plane mirror and is disposed at an end in the negative Y-axis direction in enclosure 220 in an attitude where a reflective surface faces the positive Y-axis direction. Sixth $\lambda/4$ plate 276n is stacked on second reflector 260n. Sixth $\lambda/4$ plate 276n is a $\lambda/4$ retardation plate for converting linearly polarized light incident to sixth $\lambda/4$ plate 276n into circularly polarized light and for converting circularly polarized light incident to sixth $\lambda/4$ plate 276n into linearly polarized light. Second reflector 260n opposes second display element 231 via third polarizing half mirror 270n and sixth $\lambda/4$ plate 275n in an attitude where a reflective surface faces the positive Y-axis direction.

Third polarizing half mirror 270n is disposed at a position which is interposed between first reflector 240 and second reflector 260n in the Y-axis direction and which opposes second display element 231 in the positive Z-axis direction. Third polarizing half mirror 270n is disposed in an attitude which causes an end in the positive Z-axis direction to be more toward the negative Y-axis direction than an end in the negative Z-axis direction. Third polarizing half mirror 270n has polarization properties that differ between both ends 271n and intermediate position 272n in the Y-axis direction. Specifically, both ends 271n have polarization properties which transmit image light that is S polarized light and reflect image light that is other polarized light. Intermediate position 272n has polarization properties which reflect image light that is S polarized light and transmit image light that is other polarized light.

Sixth $\lambda/4$ plate 275n is a $\lambda/4$ retardation plate for converting linearly polarized light incident to sixth $\lambda/4$ plate 275n into circularly polarized light and for converting circularly polarized light incident to sixth $\lambda/4$ plate 275n into linearly polarized light. Sixth $\lambda/4$ plate 275n is disposed between third polarizing half mirror 270n and first reflector 240. Specifically, sixth $\lambda/4$ plate 275n is stacked on a surface that faces first reflector 240 in third polarizing half mirror 270n.

In image light that is S polarized light having been emitted from second display element 231, image light (shown by a solid arrow in FIG. 52) which corresponds to both ends 271n of third polarizing half mirror 270n passes through both ends 271n and is directed toward emitter 222.

On the other hand, in image light that is S polarized light having been emitted from second display element 231, image light (illustrated by a dashed arrow in FIG. 52) which corresponds to intermediate position 272n of third polarizing half mirror 270n is reflected by intermediate position 272n, passes through sixth $\lambda/4$ plate 276n, and is converted into S+ polarized light. After being reflected by second reflector 260n, the image light that is S+ polarized light once again passes through sixth $\lambda/4$ plate 276n and is converted into P polarized light. The image light having become P polarized light passes through intermediate position 272n, passes through sixth $\lambda/4$ plate 275n, and is converted into P+ polarized light. After being reflected by first reflector 240, the image light that is P+ polarized light once again passes through sixth $\lambda/4$ plate 275n and is converted into S polarized light. After being reflected by intermediate position 272n, the image light that is S polarized light passes through sixth $\lambda/4$ plate 275n, is converted into S+ polarized light, and is directed toward emitter 222.

As described above, since third polarizing half mirror 270n includes a plurality of regions (both ends 271n and intermediate portion 272n) having mutually different polarization properties, an optical path length (viewing distance) of image light which passes through each region can be differentiated. Accordingly, since different depth feels are visually recognized, a wider variety of image expressions can be performed.

Embodiment 33

Figure 53:
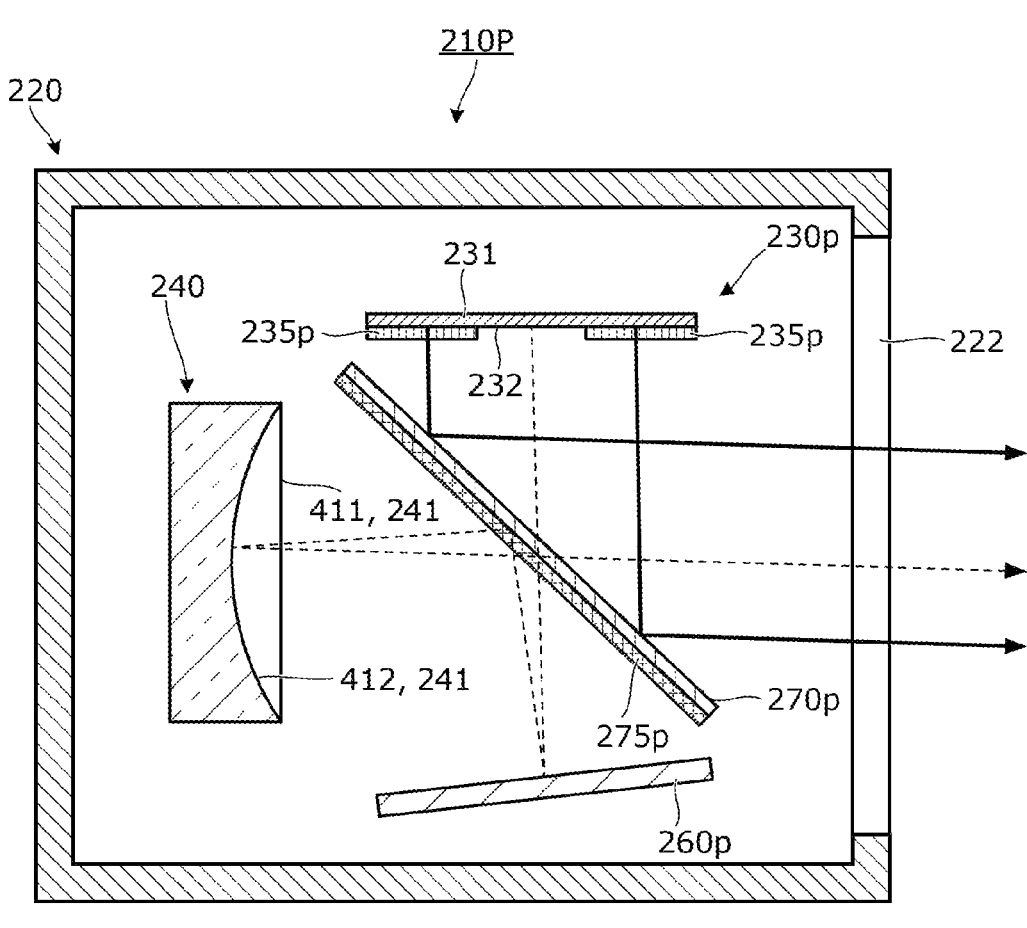
FIG. 53 is a sectional view showing a display device according to Embodiment 33.
Figure 53:
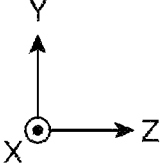

Embodiment 33 will now be described. FIG. 53 is a sectional view showing display device 210P according to Embodiment 33. As shown in FIG. 53, display device 210P includes display unit 230p, first reflector 240, second reflector 260p, third polarizing half mirror 270p, and sixth $\lambda/4$ plate 275p.

Display unit 230p includes second display element 231 and a pair of second $\lambda/2$ plates 235p stacked only on a part of display surface 232 of second display element 231. Second display element 231 is disposed at an end in the positive Y-axis direction of enclosure 220 in an attitude in which display surface 232 faces the negative Y-axis direction along the XZ plane. On display surface 232, second $\lambda/2$ plates 235p are stacked at both ends in the Z-axis direction and display surface 232 is exposed at an intermediate position.

Second $\lambda/2$ plate 235p is a $\lambda/2$ retardation plate which creates a phase difference of ½ of a wavelength $\lambda$ in light incident to second $\lambda/2$ plate 235p. For example, when second display element 231 emits image light that is S polarized light, image light from both ends in the Z-axis direction passes through second $\lambda/2$ plate 235p and is converted into P polarized light while image light from the intermediate position remains S polarized light. First reflector 240 is disposed at an end in the negative Z-axis direction in enclosure 220 in an attitude in which first main surface 241 faces the positive Z-axis direction.

Second reflector 260p is a plane mirror and is disposed at an end in the negative Y-axis direction in enclosure 220 in an attitude where a reflective surface faces the positive Y-axis direction. Second reflector 260p opposes second display element 231 via third polarizing half mirror 270p and sixth $\lambda/4$ plate 275p in an attitude along the XZ plane.

Third polarizing half mirror 270p is disposed at a position which is interposed between second display element 231 and second reflector 260p in the Y-axis direction and which opposes first reflector 240 in the positive Z-axis direction. Third polarizing half mirror 270p is disposed in an attitude which causes an end in the positive Z-axis direction to be more toward the negative Y-axis direction than an end in the negative Z-axis direction.

Sixth $\lambda/4$ plate 275p is a $\lambda/4$ retardation plate for converting linearly polarized light incident to sixth $\lambda/4$ plate 275p into circularly polarized light and for converting circularly polarized light incident to sixth $\lambda/4$ plate 275p into linearly polarized light. Sixth $\lambda/4$ plate 275p is disposed between third polarizing half mirror 270p and first reflector 240. Specifically, sixth $\lambda/4$ plate 275p is stacked on a surface that faces first reflector 240 in third polarizing half mirror 270p.

In image light that is S polarized light emitted from second display element 231, image light having passed through second $\lambda/2$ plate 235p (illustrated by a solid arrow in FIG. 53) is converted into P polarized light due to the transmission. The image light that is P polarized light is reflected by third polarizing half mirror 270p and is directed toward emitter 222.

On the other hand, in image light that is S polarized light having been emitted from second display element 231, image light which does not pass through second $\lambda/2$ plate 235p (illustrated by a dashed arrow in FIG. 53) passes through third polarizing half mirror 270p, passes through sixth $\lambda/4$ plate 275p, and is converted into S+ polarized light. After being reflected by second reflector 260p, the image light that is S+ polarized light once again passes through sixth λ/4 plate 275*p* and is converted into P polarized light. The image light having become P polarized light is reflected by third polarizing half mirror 270*p*, once again passes through sixth λ/4 plate 275*p*, and is converted into P+ polarized light. After being reflected by first reflector 240, the image light that is P+ polarized light once again passes through sixth λ/4 plate 275*p* and is converted into S polarized light. The image light that is S polarized light passes through third polarizing half mirror 270*p* and is directed toward emitter 222.

As described above, since second λ/2 plate 235*p* is stacked only in a part of second display element 231, image light having passed through second λ/2 plate 235*p* is directed toward third polarizing half mirror 270*p* while being shifted by half a phase. For example, when third polarizing half mirror 270*p* transmits image light emitted by second display element 231, image light having been shifted by half a phase by second λ/2 plate 235*p* is reflected by third polarizing half mirror 270*p*. In this manner, image light emitted from second display element 231 can be branched into different optical paths between image light having passed through second λ/2 plate 235*p* and image light not having passed through second λ/2 plate 235*p*. Therefore, since the optical path length of each beam of image light can be differentiated and different depth feels are visually recognized, a wider variety of image expressions can be performed.

Embodiment 34

Figure 54:
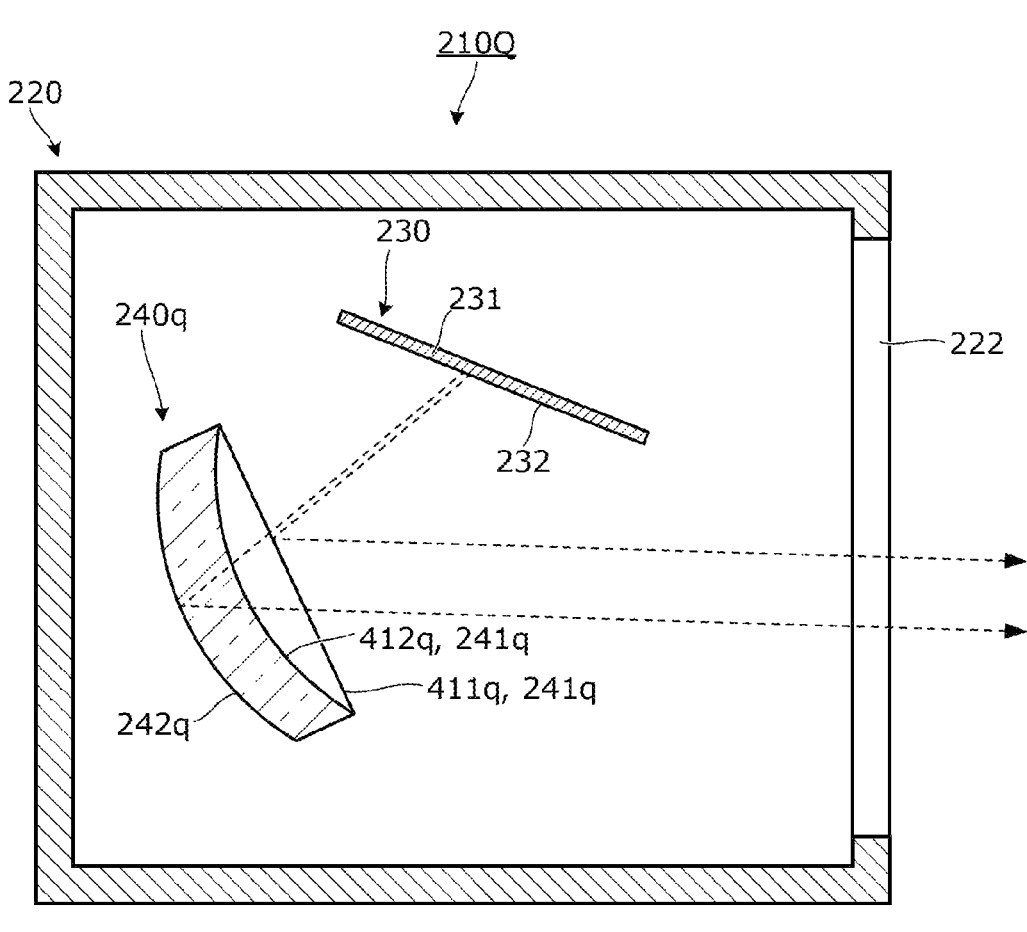
FIG. 54 is a sectional view showing a display device according to Embodiment 34.
Figure 54:
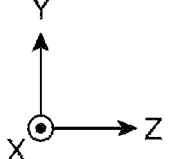
Figure 55:
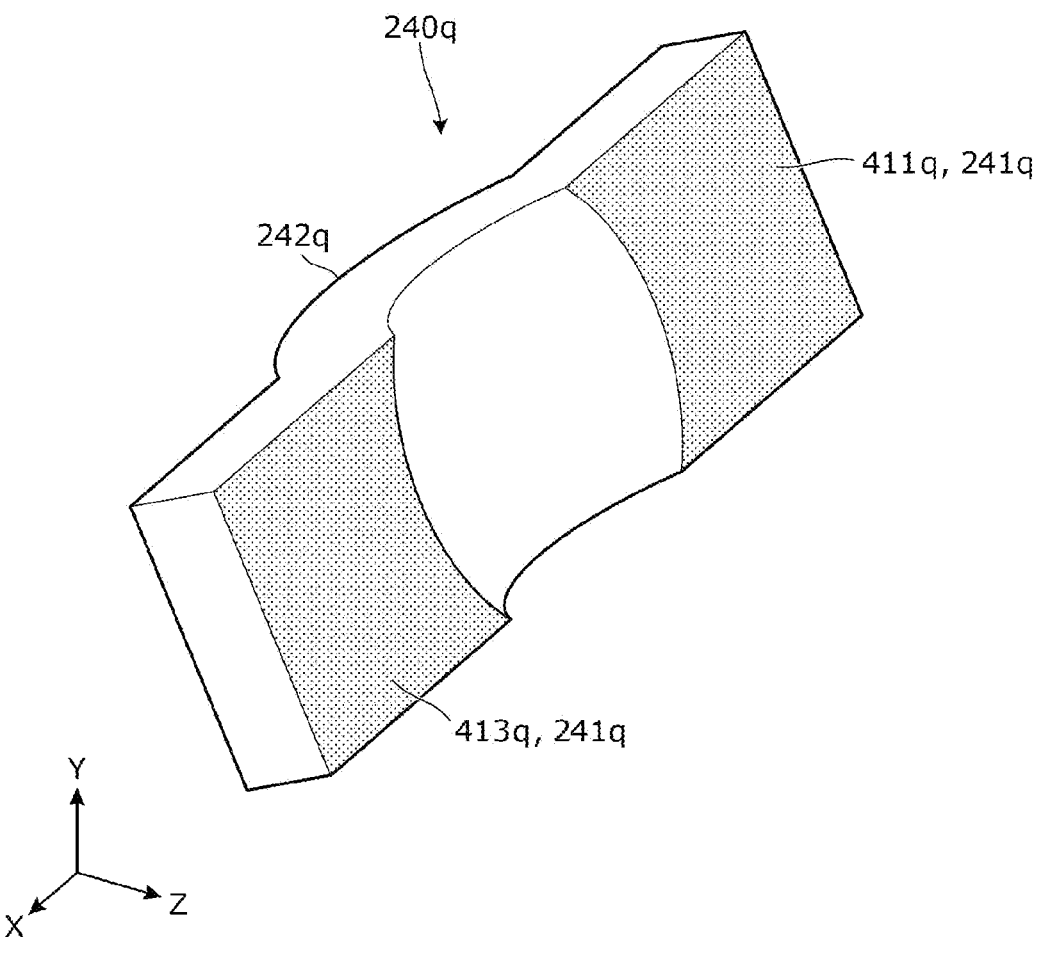
FIG. 55 is a perspective view showing a first reflector included in the display device according to Embodiment 34.

Embodiment 34 will now be described. FIG. 54 is a sectional view showing display device 210Q according to Embodiment 34. FIG. 55 is a perspective view showing first reflector 240*q* included in display device 210Q according to Embodiment 34.

As shown in FIG. 54, display device 210Q includes display unit 230 and first reflector 240*q*. First reflector 240*q* has the same external shape as first reflector 240*a* shown in Embodiment 22. While first reflective surface 411*q* and third reflective surface 413*q* are provided on first main surface 241*q*, second reflective surface 412*q* is provided on second main surface 242*q*. As described, since second reflective surface 412*q* being a curved surface is provided on second main surface 242*q*, image light emitted by second display element 231 is first incident to first main surface 241*q* of first reflector 240*q* and then reflected by second main surface 242*q* and emitted from first main surface 241*q* as shown in FIG. 54. In this manner, since three timings where aberration is correctable can be secured, a display image formed of image light following the path can be made clear.

Embodiment 35

Figure 56:
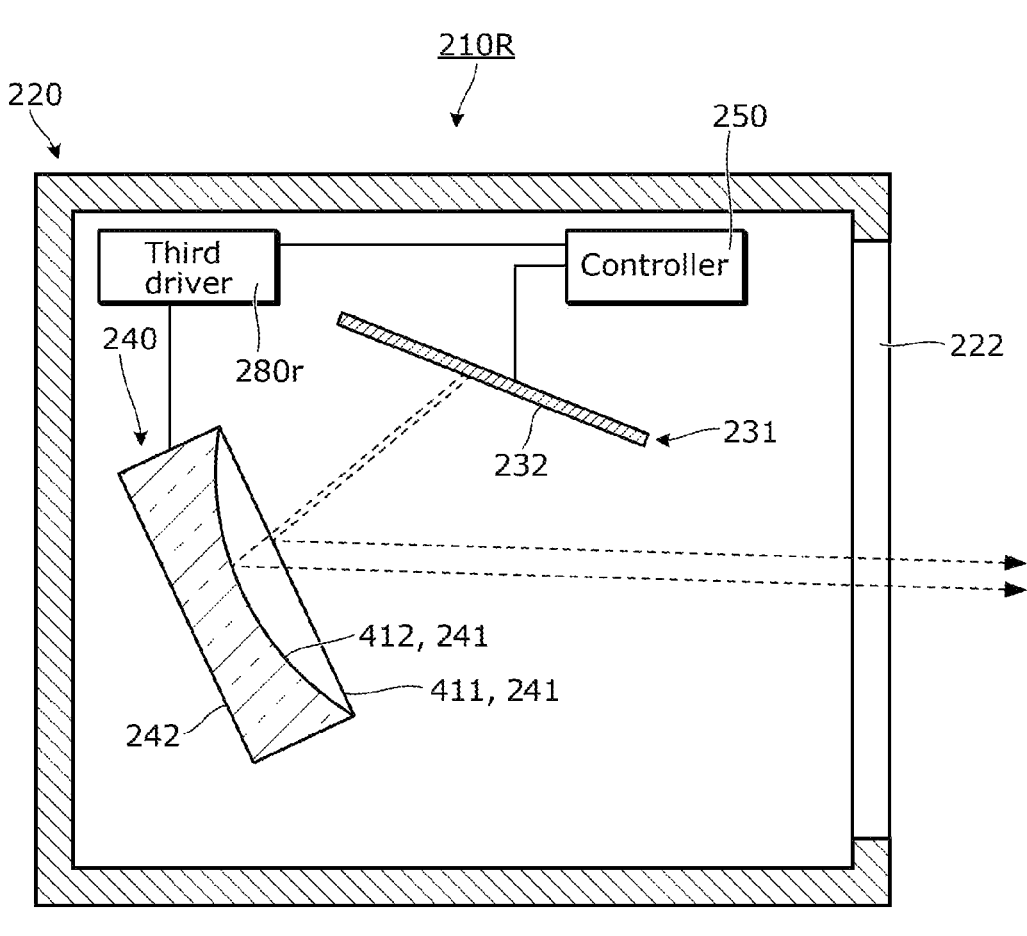
FIG. 56 is a schematic view showing a schematic configuration of a display device according to Embodiment 35.
Figure 56:
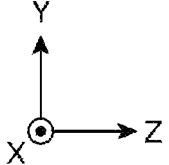

Display device 210R according to Embodiment 35 will be described. FIG. 56 is a schematic view showing a schematic configuration of display device 210R according to Embodiment 35. As shown in FIG. 56, display device 210R includes third driver 280*r* which is controlled by controller 250.

Third driver 280*r* is an example of the third driver which operates first reflector 240. For example, third driver 280*r* includes a drive source such as a motor and a power-transmitting mechanism which operates first reflector 240 using power from the drive source. Based on the power of the drive source, third driver 280*r* moves first reflector 240 (a slide operation in the Y-axis direction or a slide operation in the Z-axis direction) and changes an attitude of first reflector 240 (for example, a rotation operation). Accordingly, the orientation of image light which is to be reflected by first reflector 240 can be adjusted.

Accordingly, first reflector 240 can be operated (slide movement, rotational movement, or the like) by third driver 280*r*. Therefore, a display position or a viewing distance of each display image formed of image light having been reflected by first reflector 240 can be adjusted by operating first reflector 240. Accordingly, an image display in accordance with a difference in physique and preferences of a user can be performed.

Alternatively, the object to be operated by third driver 280*r* may be second display element 231. Even according to the configuration, a same effect as when operating first reflector 240 can be produced. Furthermore, a configuration may be adopted in which both second display element 231 and first reflector 240 are independently operated. Accordingly, a display position or a viewing distance can be more finely adjusted.

According to Embodiment 35 described above, at least one of first reflector 240 or second display element 231 can be operated (slide movement, rotational movement, or the like) by third driver 280*r*. As a result, a display position or a viewing distance of at least one of respective display images formed of image light emitted by second display element 231 and display light reflected by first reflector 240 can be adjusted by an operation of at least one of first reflector 240 or second display element 231. Accordingly, an image display in accordance with a difference in physique and preferences of a user can be performed.

Note that in the case of a display device including a second reflector and a third polarizing half mirror, a driver for operating the second reflector and the third polarizing half mirror may be provided.

Embodiment 36

Figure 57:
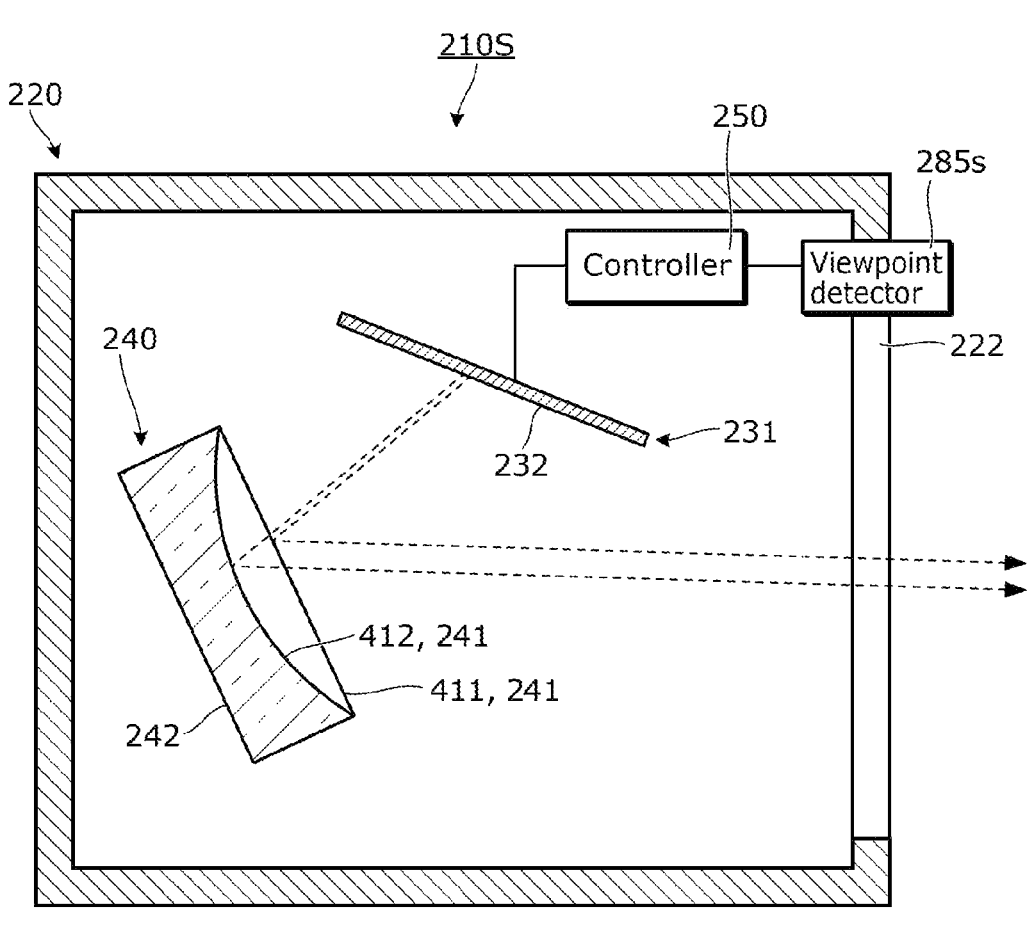
FIG. 57 is a schematic view showing a schematic configuration of a display device according to Embodiment 36.
Figure 57:
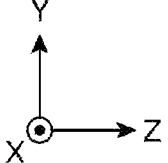

Display device 210S according to Embodiment 36 will be described. FIG. 57 is a schematic view showing a schematic configuration of display device 210S according to Embodiment 36. As shown in FIG. 57, display device 210S includes viewpoint detector 285*s* which is controlled by controller 250.

Viewpoint detector 285*s* includes a camera and is disposed in a vicinity of emitter 222 at an attitude that causes the head of user 202 to be included in a field of view of the camera. Viewpoint detector 285*s* detects a line of sight of user 202 as photographed by the camera and outputs a detection result thereof to controller 250. Controller 250 controls display content of second display element 231 based on a detection result of viewpoint detector 285*s*.

In this manner, since controller 250 controls display content of second display element 231 based on a detection result of viewpoint detector 285*s*, a display image in accordance with the point of view of user 202 can be formed. Therefore, even if the point of view changes, a display image with few defects as viewed from user 202 can be formed.

Embodiment 37

Figure 58:
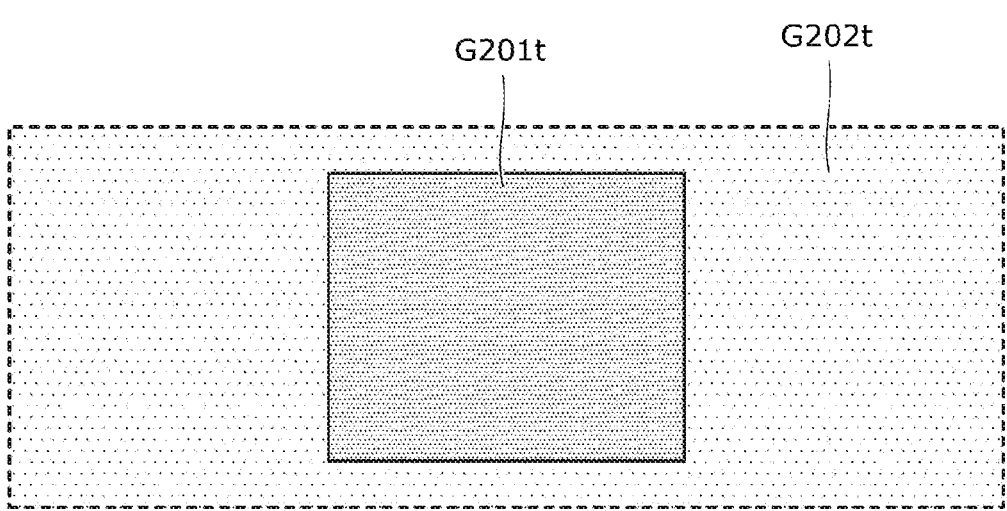
FIG. 58 is an explanatory diagram showing a display example of a display device according to Embodiment 37.

A display image according to Embodiment 37 will be described. FIG. 58 is a plan view showing a plurality of display images G201*t* and G202*t* according to Embodiment 37. As shown in FIG. 58, display image G202*t* is disposed so as to surround display image G201*t* as viewed from the user. In the display device, display content of the second display element is controlled and each reflective surface of the first reflector is formed so as to accommodate the plurality of display images G201*t* and G202*t*.

Accordingly, since one display image G202*t* is disposed so as to surround another display image G201*t* among the plurality of display images G201*t* and G202*t* as viewed from the user, a wider variety of expressions can be performed.

Embodiment 38

Figure 59:
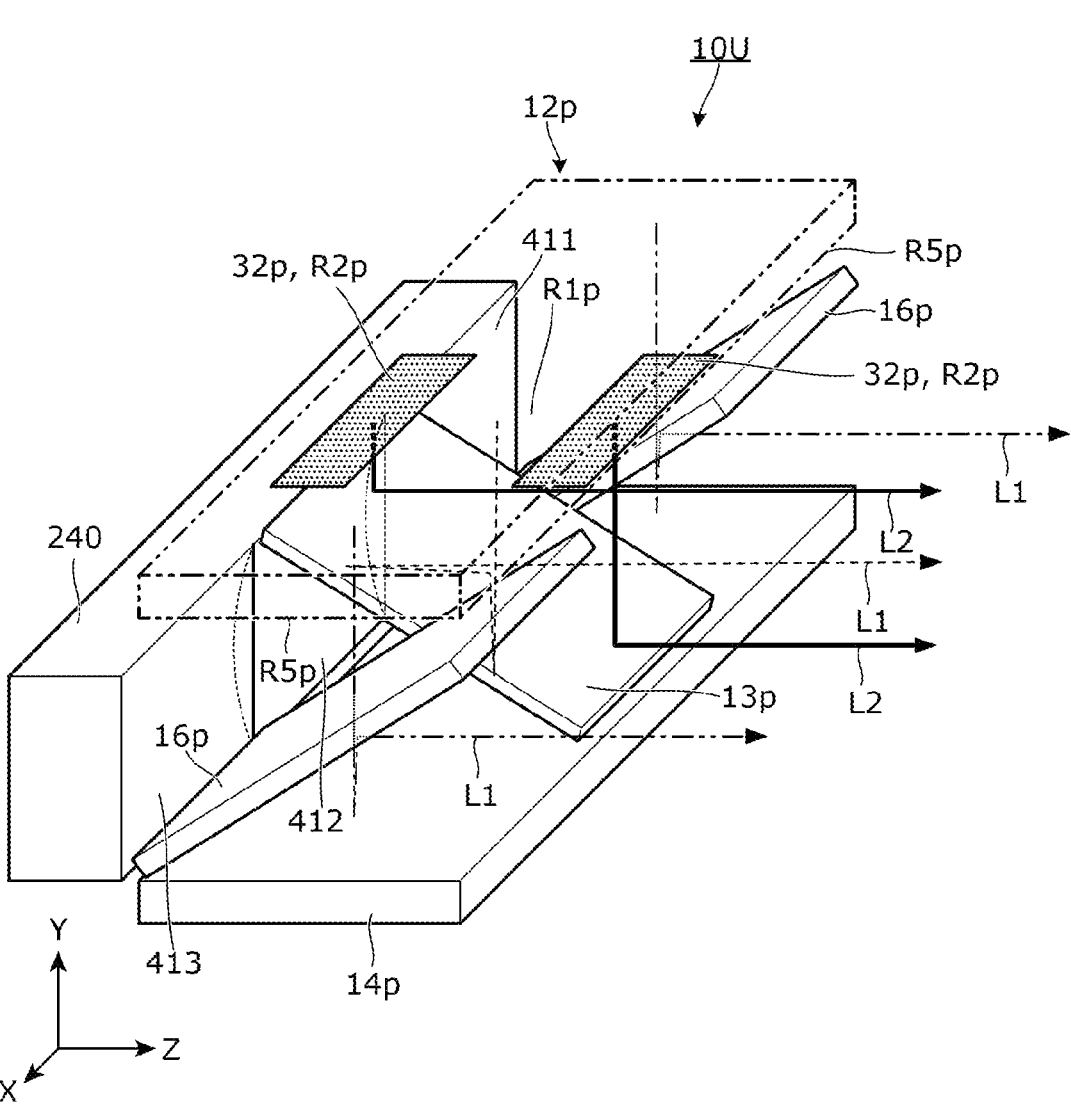
FIG. 59 is a perspective view showing a schematic configuration of a display device according to Embodiment 38.

Display device 10U according to Embodiment 38 will be described. FIG. 59 is a perspective view showing a schematic configuration of display device 10U according to Embodiment 38. In display device 10U according to Embodiment 38, second reflective mirror 15*p* of display device 10P according to Embodiment 15 has been changed to first reflector 240 according to Embodiment 21. Therefore, in first reflector 240, second reflective surface 412 opposes first polarizing half mirror 13*p* and first reflective surface 411 and third reflective surface 413 oppose each second polarizing half mirror 16*p*.

As described above, since second reflective surface 412 is made a concave mirror as compared to the configuration in FIG. 22, first image light L1 emitted from first region R1*p* is visually recognized by the user as a farther point of view. Therefore, a wider variety of expressions can be performed.

Variation in Third Configuration

For example, a case where second reflective surface 412 is a concave curved surface has been exemplified in Embodiment 21 and the like described above. However, the second reflective surface may be a convex curved surface. In addition, the first reflective surface and the third reflective surface may be a concave curved surface or a convex curved surface instead of a flat surface.

In addition, the first reflector may include at least three reflective surfaces, and the at least three reflective surfaces may have different curvatures. When respective curvatures of the at least three reflective surfaces differ from one another, a different image expression can be performed by a display image via each reflective surface. Therefore, a wider variety of image expressions can be performed and a dramatic impact can be further enhanced.

In addition, the controller may control a luminance of each of a plurality of display images based on viewing distances of the display images. The viewing distances of the plurality of display images can be acquired in advance by an experiment, a simulation, actually measured values, and the like. By registering the acquired viewing distance of each display image to the controller, the controller controls a luminance of each pixel of a second display element that creates each display image. Specifically, since a display image may become dark when the viewing distance is large, the larger the viewing distance, the greater the luminance set to a pixel. Accordingly, an appropriate luminance can be set to each display image. In particular, although the luminance of a display image enlarged by a reflective surface can decline, the decline in luminance can be complemented on the side of the second display element due to control by the controller.

Others

Hereinbefore, a display device according to one or more aspects of the present disclosure has been described based on embodiments; however, the present disclosure is not limited to such embodiments. Various modifications of the embodiments as well as other embodiments resulting from combinations of the constituent elements in different embodiments that may be conceived by those skilled in the art may be included within the scope of one or more aspects of the present disclosure as long as these do not depart from the essence of the present disclosure.

Display devices including only the first configuration, display devices including only the second configuration, and display devices including only the third configuration have been individually described in the embodiments presented above. However, a display device may include only two configurations selected from the first configuration, the second configuration, and the third configuration or may include all three configurations. In this manner, a display device can also be downsized by including at least one of the first configuration, the second configuration, or the third configuration.

Additional Remark

The following techniques are disclosed according to the description of the embodiments and the like mentioned above.

Technique 1

A display device including at least one of a first configuration, a second configuration, or a third configuration,
  wherein the first configuration includes:
    a first display unit that emits first image light from a first region and second image light from a second region, the second image light being shifted from the first image light by half a phase;
    a first polarizing half mirror that transmits one of the first image light or the second image light and reflects an other of the first image light or the second image light;
    a first reflective mirror disposed on one of a transmissive optical path along which the one of the first image light or the second image light passes through the first polarizing half mirror or a reflective optical path along which the other of the first image light or the second image light reflects off the first polarizing half mirror; and
    a first λ/4 plate disposed between the first reflective mirror and the first polarizing half mirror on the one of the transmissive optical path or the reflective optical path,
  the second configuration includes:
    a second display unit that emits third image light from a third region and fourth image light from a fourth region;
    a half mirror including one end portion disposed at a boundary between the third region and the fourth region; and
    a third reflective mirror that reflects, toward the half mirror, the third image light emitted from the third region and reflected by the half mirror,
  the half mirror is oriented to direct the third image light and the fourth image light in a same direction when transmitting the third image light from the third reflective mirror and reflecting the fourth image light emitted from the fourth region,
  the third configuration includes:
    a second display element that emits fifth image light which forms a display image; and
    a first reflector that reflects the fifth image light,
  the first reflector includes a plurality of reflective surfaces for forming a plurality of display images having different viewing distances by dividing the fifth image light emitted by the second display element, the plurality of display images each being the display image, and at least one reflective surface among the plurality of reflective surfaces is a curved surface.

Technique 2

The display device according to technique 1, including:

the first configuration, wherein the display device includes:

a second reflective mirror disposed on an other of the transmissive optical path or the reflective optical path.

Technique 3

The display device according to technique 2, wherein at least one of the first reflective mirror or the second reflective mirror is a concave mirror or a convex mirror.

Technique 4

The display device according to technique 2, wherein the display device includes a driver that causes at least one of the first polarizing half mirror, the first reflective mirror, or the second reflective mirror to operate.

Technique 5

The display device according to any one of techniques 1 to 4, including:

the first configuration, wherein the first display unit includes:

a display element including a display surface; and a first λ/2 plate stacked only on part of the display surface.

Technique 6

The display device according to any one of techniques 2 to 4, including:

a second λ/4 plate disposed on the other of the transmissive optical path or the reflective optical path.

Technique 7

The display device according to any one of techniques 1 to 6, including:

the first configuration, wherein the first image light and the second image light emitted by the first display unit are circularly polarized light shifted from each other by half a phase, and the first λ/4 plate is stacked on a first surface of the first polarizing half mirror, the first surface being located on a side of the first polarizing half mirror on which the first display unit is disposed.

Technique 8

The display device according to technique 7, including:

a third λ/4 plate stacked on a second surface of the first polarizing half mirror, the second surface being on an opposite side of the first polarizing half mirror from the first surface.

Technique 9

The display device according to any one of techniques 1 to 8, including:

the first configuration, wherein the first display unit does not allow emission of the first image light and the second image light from a boundary between the first region and the second region.

Technique 10

The display device according to any one of techniques 1 to 9, including:

the first configuration, wherein the first image light and the second image light are arranged side by side in the horizontal direction as viewed from a user.

Technique 11

The display device according to any one of techniques 1 to 10, including:

the first configuration, wherein the first image light and the second image light are arranged side by side in the vertical direction as viewed from the user.

Technique 12

The display device according to any one of techniques 1 to 10, including:

the first configuration, wherein the first region and the second region each have a width of at least one pixel and at most five pixels, and are alternately arranged.

Technique 13

The display device according any one of techniques 1 to 10, including:

the first configuration, wherein one of the first image light or the second image light is disposed surrounding an other of the first image light or the second image light as viewed from a user.

Technique 14

The display device according to any one of techniques 2, 3, 4, and 6, including:

the first configuration; and a second polarizing half mirror disposed facing the first display unit and the first reflective mirror at an angle intersecting the first polarizing half mirror in a side view, wherein the first display unit further emits the first image light from a fifth region different from the first region and the second region, and the first image light emitted from the fifth region passes through the second polarizing half mirror, and is then reflected by the first reflective mirror and further reflected by the second polarizing half mirror.

Technique 15

The display device according to technique 14, wherein the first image light emitted from the first region is displayed at a farthest position as viewed from a user by passing through the first polarizing half mirror, then being reflected by the first reflective mirror and the first polarizing half mirror, and further passing through the first polarizing half mirror, the second image light emitted from the second region is displayed at a nearest position as viewed from the user by being reflected by the first polarizing half mirror, and the first image light emitted from the fifth region is displayed at an intermediate position between the farthest position and the nearest position as viewed from the user by passing through the second polarizing half mirror, then being reflected by the first reflective mirror, and further being reflected by the second polarizing half mirror.

Technique 16

The display device according to technique 15, wherein the display device presents at least one of:

a first display mode in which warning display is presented at the nearest position, meter display is presented at the intermediate position, and alert display is presented at the farthest position; or a second display mode in which road information display is presented at the nearest position, meter display is presented at the intermediate position, and navigation display is presented at the farthest position.

Technique 17

The display device according to technique 16, wherein the first display mode and the second display mode are switched based on a predetermined condition.

Technique 18

The display device according to technique 1, including: the second configuration, wherein the half mirror is a polarizing half mirror, and a fourth λ/4 plate is disposed between the third reflective mirror and the polarizing half mirror.

Technique 19

The display device according to technique 18, including: a fourth reflective mirror that reflects, toward the polarizing half mirror, the third image light emitted from the third region.

Technique 20

The display device according to technique 19, including: a fifth λ/4 plate stacked on the third region, wherein the third reflective mirror is a concave mirror or a convex mirror, and the fourth λ/4 plate is stacked on a surface of the polarizing half mirror, the surface of the polarizing half mirror facing the third reflective mirror.

Technique 21

The display device according to any one of techniques 18 to 20, including: a fifth reflective mirror that reflects the fourth image light before the fourth image light is reflected by the polarizing half mirror.

Technique 22

The display device according to any one of techniques 1, and 18 to 21, including: the second configuration, wherein the display device includes: a driver that causes at least one of the half mirror or the third reflective mirror to operate.

Technique 23

The display device according to any one of techniques 1, and 18 to 22, including: the second configuration, wherein the second display unit does not allow emission of the third image light and the fourth image light from the boundary between the third region and the fourth region.

Technique 24

The display device according to technique 1, including: the third configuration, wherein the first reflector includes a plurality of support bodies that support the plurality of reflective surfaces, and one of the plurality of support bodies supports at least two of the plurality of reflective surfaces.

Technique 25

The display device according to technique 1 or 24, including: the third configuration, wherein the first reflector includes a support body that collectively supports all the plurality of reflective surfaces.

Technique 26

The display device according to technique 24 or 25, wherein the support body that supports the at least one reflective surface which is the curved surface includes a second main surface that is the at least one reflective surface which is the curved surface, the second main surface being on an opposite side of the support body from a first main surface of the support body, the first main surface facing the second display element.

Technique 27

The display device according to any one of techniques 1, and 24 to 26, including: the third configuration, wherein the display device includes: a second reflector that is different from the first reflector and reflects the fifth image light.

Technique 28

The display device according to any one of techniques 1, and 24 to 27, including: the third configuration, wherein the second display element emits the fifth image light including single polarized light, and the display device includes: a third polarizing half mirror that is disposed facing the second display element and the first reflector and reflects the fifth image light; and a sixth λ/4 plate disposed between the third polarizing half mirror and the first reflector.

Technique 29

The display device according to any one of techniques 1, and 24 to 27, including: the third configuration, wherein the second display element emits the fifth image light including single polarized light, and the display device includes: a third polarizing half mirror that is disposed between the second display element and the first reflector and transmits the fifth image light; and a sixth λ/4 plate disposed between the third polarizing half mirror and the first reflector.

Technique 30

The display device according to technique 28 or 29, wherein the third polarizing half mirror includes a plurality of regions having mutually different polarization properties.

Technique 31

The display device according to technique 28 or 29, including: a second λ/2 plate stacked only on part of a display surface of the second display element.

Technique 32

The display device according to any one of techniques 1, and 24 to 31, including: the third configuration, wherein at least one reflective surface among the plurality of reflective surfaces is a flat surface.

Technique 33

The display device according to any one of techniques 1, and 24 to 32, including: the third configuration, wherein the plurality of reflective surfaces include at least three reflective surfaces, and the at least three reflective surfaces have different curvatures.

Technique 34

The display device according to any one of techniques 1, and 24 to 33, including: the third configuration, wherein the plurality of reflective surfaces include at least three reflective surfaces, and the at least three reflective surfaces have different distances from the second display element.

Technique 35

The display device according to any one of techniques 1, and 24 to 34, including:

the third configuration, wherein the plurality of display images are arranged side by side in the horizontal direction as viewed from a user.

Technique 36

The display device according to any one of techniques 1, and 24 to 34, including:

the third configuration, wherein the plurality of display images are arranged side by side in the vertical direction as viewed from a user.

Technique 37

The display device according to any one of techniques 1, and 24 to 36, including:

the third configuration, wherein the second display element emits the fifth image light to provide at least a predetermined spacing between adjacent display images among the plurality of display images.

Technique 38

The display device according to any one of techniques 1, and 24 to 37, including:

the third configuration, wherein the display device includes:

a viewpoint detector that detects a viewpoint of a user; and a controller that controls the second display element, and the controller controls display content displayed by the second display element, based on a detection result of the viewpoint detector.

Technique 39

The display device according to any one of techniques 1, and 24 to 38, including:

the third configuration, wherein the display device includes:

a controller that controls the second display element, and the controller controls a luminance of each of the plurality of display images based on viewing distances of the plurality of display images.

Technique 40

The display device according to any one of techniques 1, 24 to 39, including:

the third configuration, wherein the display device includes:

a controller that controls the second display element, and the controller determines whether or not to invert display content displayed by the second display element, according to a total number of times the fifth image light forming each of the plurality of display images is reflected.

Technique 41

The display device according to any one of techniques 1, 24 to 39, including:

the third configuration, wherein the display device includes:

a third driver that causes at least one of the first reflector or the second display element to operate.

Technique 42

The display device according to any one of techniques 1, 24 to 34, including:

the third configuration, wherein one of the plurality of display images is disposed surrounding an other one of the plurality of display images as viewed from a user.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2023-039053 filed on Mar. 13, 2023, Japanese Patent Application No. 2023-039059 filed on Mar. 13, 2023, Japanese Patent Application No. 2023-039065 filed on Mar. 13, 2023, and Japanese Patent Application No. 2023-186783 filed on Oct. 31, 2023.

INDUSTRIAL APPLICABILITY

The present disclosure is applicable to, for example, display devices for displaying images.

The invention claimed is:

1. A display device comprising:

a second display unit that emits third image light from a third region and fourth image light from a fourth region;

a half mirror including one end portion disposed at a boundary between the third region and the fourth region; and a third reflective mirror that reflects, toward the half mirror, the third image light emitted from the third region and reflected by the half mirror, the half mirror is oriented to direct the third image light and the fourth image light in a same direction when transmitting the third image light from the third reflective mirror and reflecting the fourth image light emitted from the fourth region.

2. The display device according to claim 1, wherein the half mirror is a polarizing half mirror, and a fourth λ/4 plate is disposed between the third reflective mirror and the polarizing half mirror.

3. The display device according to claim 1, wherein the display device further comprises:

a driver that causes at least one of the half mirror or the third reflective mirror to operate.

4. The display device according to claim 1, wherein the second display unit does not allow emission of the third image light and the fourth image light from the boundary between the third region and the fourth region.

* * * * *